US007178095B2

(12) United States Patent
Hachiya et al.

(10) Patent No.: US 7,178,095 B2
(45) Date of Patent: Feb. 13, 2007

(54) METHOD AND APPARATUS FOR SENDING E-MAIL, METHOD AND APPARATUS FOR RECEIVING E-MAIL, SENDING/RECEIVING METHOD AND APPARATUS FOR E-MAIL, SENDING PROGRAM SUPPLYING MEDIUM, RECEIVING PROGRAM SUPPLYING MEDIUM AND SENDING/RECEIVING PROGRAM SUPPLYING MEDIUM

(75) Inventors: Kazuhiko Hachiya, Tokyo (JP); Michio Kitamura, Kanagawa (JP); Takashi Koki, Tokyo (JP); Namie Otaki, Tokyo (JP)

(73) Assignee: So-Net Entertainment Corporation, Tokyo (JP)

( * ) Notice: Subject to any disclaimer, the term of this patent is extended or adjusted under 35 U.S.C. 154(b) by 575 days.

(21) Appl. No.: 10/039,315

(22) Filed: Oct. 22, 2001

(65) Prior Publication Data

US 2002/0095467 A1 Jul. 18, 2002

Related U.S. Application Data

(63) Continuation of application No. 08/993,726, filed on Dec. 17, 1997, now Pat. No. 6,311,195.

(30) Foreign Application Priority Data

Dec. 20, 1996 (JP) ............................... P08-355047
Jul. 9, 1997 (JP) ............................... P09-166639

(51) Int. Cl.
*G06F 17/00* (2006.01)
(52) U.S. Cl. ....................... 715/500; 709/206; 709/202
(58) Field of Classification Search ................ 715/500, 715/512; 709/206, 202; 434/350; 345/473
See application file for complete search history.

(56) References Cited

U.S. PATENT DOCUMENTS 5,008,853 A  4/1991  Bly et al. .................... 715/751
5,107,443 A  4/1992  Smith et al. ................. 715/751
(Continued)

FOREIGN PATENT DOCUMENTS

EP  0 438 017 B1  7/1991
EP  0 562 995 A2  9/1993
(Continued)

OTHER PUBLICATIONS

Bickmore et al.,"Animated Autonomous Personal Represenative",1998, ACM, pp. 8-15.*

(Continued)

*Primary Examiner*—Heather R. Herndon
*Assistant Examiner*—James Blackwell
(74) *Attorney, Agent, or Firm*—Bell, Boyd & Lloyd LLC

(57) ABSTRACT

A method and apparatus for sending or receiving an E-mail using animated representation as if a pet were going out of or coming into a GUI picture simulating the insides of both a sender's room and a receiver's room for letter delivery and dispatch. Moreover, the pet, represented by animation, is virtually kept. Specifically, agent data updated responsive to experiences acquired by the pet is sent as annexed papers to the E-mail, while the receiver returns only pet data. Thus, animation represented on a GUI picture simulating the insides of both a sender's room and a receiver's room for imparting an impression as if a pet were going out of or coming into a GUI picture simulating the insides of both the sender's room and the receiver's room for letter delivery and dispatch. The agent data determining the behavior of the electronic pet are updated responsive to the mouse actuation by the user, such as caressing the pet or serving refreshments to the pet, for varying the behavior of the pet, represented by animation, depending on the maintenance environment. The operating states of the mouse are reflected on representation of a pointing cursor.

82 Claims, 54 Drawing Sheets

U.S. PATENT DOCUMENTS

| | | | |
|---|---|---|---|
| 5,138,653 A | 8/1992 | Le Clercq | 379/93.24 |
| 5,202,828 A | 4/1993 | Vertelney et al. | 715/530 |
| 5,283,887 A | 2/1994 | Zachery | 715/513 |
| 5,303,388 A | 4/1994 | Kreitman et al. | 715/836 |
| 5,347,628 A | 9/1994 | Brewer et al. | 715/775 |
| 5,377,997 A | 1/1995 | Wilden et al. | 463/43 |
| 5,418,908 A | 5/1995 | Keller et al. | 709/206 |
| 5,490,244 A | 2/1996 | Isensee et al. | 715/748 |
| 5,498,003 A | 3/1996 | Gechter | 463/31 |
| 5,548,753 A | 8/1996 | Linstead et al. | 707/1 |
| 5,557,723 A | 9/1996 | Holt et al. | 715/506 |
| 5,579,472 A | 11/1996 | Keyworth, II et al. | 715/751 |
| 5,647,002 A | 7/1997 | Brunson | 709/206 |
| 5,682,469 A * | 10/1997 | Linnett et al. | 345/473 |
| 5,715,416 A | 2/1998 | Baker | 715/839 |
| 5,727,950 A * | 3/1998 | Cook et al. | 434/350 |
| 5,781,901 A | 7/1998 | Kuzma | 707/10 |
| 5,787,440 A | 7/1998 | Bakke et al. | 707/103 R |
| 5,790,639 A | 8/1998 | Ranalli et al. | 379/100.08 |
| 5,793,365 A * | 8/1998 | Tang et al. | 715/758 |
| 5,796,393 A | 8/1998 | MacNaughton et al. | 715/733 |
| 5,826,269 A * | 10/1998 | Hussey | 707/10 |
| 5,845,303 A | 12/1998 | Templeman | 715/517 |
| 5,880,731 A * | 3/1999 | Liles et al. | 715/758 |
| 5,892,909 A | 4/1999 | Grasso et al. | 709/201 |
| 5,903,723 A | 5/1999 | Beck et al. | 709/200 |
| 5,931,907 A | 8/1999 | Davies et al. | 709/218 |
| 6,003,070 A * | 12/1999 | Frantz | 709/206 |
| 6,175,857 B1 * | 1/2001 | Hachiya et al. | 709/206 |
| 6,219,045 B1 * | 4/2001 | Leahy et al. | 715/757 |
| 6,285,380 B1 * | 9/2001 | Perlin et al. | 345/473 |
| 6,311,195 B1 * | 10/2001 | Hachiya et al. | 715/512 |
| 6,434,597 B1 * | 8/2002 | Hachiya et al. | 709/202 |
| 6,535,907 B1 * | 3/2003 | Hachiya et al. | 709/202 |
| 6,559,870 B1 * | 5/2003 | Anabuki et al. | 715/849 |
| 6,731,314 B1 * | 5/2004 | Cheng et al. | 715/848 |
| 6,751,669 B1 * | 6/2004 | Ahuja et al. | 709/228 |
| 6,760,751 B1 * | 7/2004 | Hachiya et al. | 709/206 |
| 6,842,779 B1 * | 1/2005 | Nishizawa | 709/220 |
| 6,922,689 B2 * | 7/2005 | Shtivelman | 707/3 |
| 6,934,747 B1 * | 8/2005 | McGrath et al. | 709/224 |
| 6,976,082 B1 * | 12/2005 | Ostermann et al. | 709/231 |
| 6,990,452 B1 * | 1/2006 | Ostermann et al. | 704/260 |
| 7,006,098 B2 * | 2/2006 | Bickmore et al. | 345/474 |

FOREIGN PATENT DOCUMENTS

| | | |
|---|---|---|
| EP | 0 691 609 A1 | 1/1996 |
| JP | 03-222033 | 10/1991 |
| JP | 05-274233 | 10/1993 |
| JP | 07-066832 | 3/1995 |
| WO | WO 95/14268 | 5/1995 |

OTHER PUBLICATIONS

A. Serenko, "The Development Of An Instrument To Measure Animation Predisposition Of Users Of Animated Agents In MS Office Applications", 2004, McMaster Univ., pp. 1-16.*

Takahashi et al., "TelMeA—Expressive avatars in asynchronous Communications", 2004, Elsevier Ltd. pp. 193-209.*

Bank, David, "General Magic Will Make E-Mail Act 'Intelligent'", San Jose Mercury News, Business Section, p. 1F.

Bates, Joseph et al., "An Architecture for Action, Emotion, and Social Behavior", Carnegie Mellon University, School of Computer Science, CMU-CS-92-144, pp. 1-14.

Bates, Joseph et al., "An Architecture for Action, Emotion, and Social Behavior", Artificial Social Systems—4th European Workshop on Modelling Autonomous Agents in a Multi-Agent World, MAAMAW '92, pp. 55-68.

Bates, Joseph et al., "Broad Agents", Carnegie Mellon University, School of Computer Science, SIGART Bulletin vol. 2, No. 4, pp. 38-40.

Bates, Joseph et al., "Integrating Reactivity, Goals, and Emotion in a Broad Agent", Carnegie Mellon University, School of Computer Science, CMU-CS-92-142, pp. 1-13.

Bates, Joseph, "The Nature of Characters in Interactive Worlds and The Oz Project", Carnegie Mellon University, School of Computer Science, CMU-CS-92-200, pp. 1-7.

D. Comer, "Internet Work With TCP/IP" 1998, Prentice-Hall, ISBN 0-13-1170154-2, 025.

Flynn, Laurie, "It's No Secret: 'Agents' Might Ease Your Life Think of Agents as Digital Super-Secretaries that Perform Mundane but Critical Information Tasks for You", San Jose Mercury News, Computing Section, p. 1F.

IBM Corporation, "Graphic Office Interface", IBM Technical Disclosure Bulletin, vol. 34, Issue 1, pp. 266-269.

Loyall, A. Bryan et al., "Hap A Reactive, Adaptive Architecture for Agents", Carnegie Mellon University, School of Computer Science, CMU-CS-91-147, pp. 1-12.

Reilly, W. Scott et al., "Building Emotional Agents", Carnegie Mellon University, School of Computer Science, CMU-CS-92-143, pp. 1-13.

C.G. Harrison, D.M. Chess, A. Kershenbaum: "Mobile Agents: Are They A Good Idea?", IBM Research Report, IBM T.J. Watson Research Center, Yorktown Heights, NY, U.S.A. Mar. 28, 1995, pp. 1-21.

Chess, D. et al.: "Itinerant Agents for Mobile Computing", IEEE Personal Communications, Oct. 1995, U.S.A., vol. 2, No. 5, Oct. 1995, pp. 34-49.

Bharat, K.A. et al.: "Migratory Applications", Eighth Annual Symposium on User Interface Software and Technology, UIST '95, Pittsburgh, PA, U.S.A. pp. 133-142.

W.S. Reilly, J. Bates: "Building Emotional Agents", School of Computer Science, Carnegie Mellon University, Pittsburgh, PA, U.S.A., Technical Report CMU-CS-92-143, May 1992, pp. 1-13.

Blumberg, B.M. et al.: "Multi-level Direction of Autonomous Creatures for Real-Time Virtual Environments", Computer Graphics Proceedings, Annual Conference Series, SIGGRAPH 95, Los Angeles, CA, U.S.A., Aug. 6-11, 1995, pp. 47-54.

Costa, M. et al.: "Agents With Emotions in Behavioral Animation", Computers & Graphics, May-Jun. 1996, Elsevier, UK, vol. 20, No. 3, pp. 377-384.

Grand, Stephen et al., "Creatures: Artificial Life Autonomous Software Agents For Home Entertainment," Cognitive Science Research Paper 434, University of Suses, Oct. 1996, pp. 1-8.

Kahn, Ken, "ToomTalk™—An Amimated Programming Environment For Children," Journal of Visual Languages and Computing, vol. 7, No. 2, Jun. 1996, pp. 197-217.

Kahn, Kenneth M., "An Actor-Based Computer Animation Language," Design of Interactive Graphics Systems, Oct. 14, 1976, pp. 37-43.

Agha, Gul et al., ActorSpace: An Open Distributed Programming Paradigm, ACM Sigplan Notices, vol. 28, No. 7, Jul. 1993, pp. 23-32.

* cited by examiner

| INNER PARAMETERS | OUTER PARAMETERS |
|---|---|
| (1) MAIL COUNT | (1) POSITION |
| (2) AGE | (2) COMFORTABILITY |
| (3) SEX | (3) USER ACTION-CARESSING |
| (4) INTELLIGENCE | (4) USER ACTION-BLOWING |
| (5) BODILY POWERS | (5) GUEST ACTION-CALLED |
| (6) VIGOR | (6) GUEST ACTION-SHOWN FRIENDSHIP |
| (7) FRIENDSHIP WITH KEEPER | (7) GUEST ACTION-SHOWN HOSTILITY |
| (8) HUNGRY DEGREE | (8) GUEST ACTION-ITEM GIVEN |
| (9) HAPPINESS DEGREE | (9) GUEST ACTION-ITEM REQUESTED |
| (10) CLEANNESS DEGREE | |
| (12) BIO-RYTHM (INDEFINITE) | |
| (13) NOISE (INDEFINITE) | |
| (11) FRIENDSHIP (WITH COUNTERPART) | |
| (12) PARAM 01 | |
| (13) POSITIVE / NEGATIVE (+/−) | |
| (14) CHEERFULNESS / GLOOMINESS (+/−) | |
| (15) HEARTFULNESS / INDIFFERENCE (+/−) | |
| (16) CONCENTRATION / DIFFUSENESS (+/−) | |
| (17) CHIC / AUKWARD (+/−) | |
| (18) PARAM 02 | |
| (19) PARAM 03 | |
| (20) PARAM 04 | |
| (21) PARAM 05 | |
| (22) PARAM 06 | |
| (23) MAKEUP DEGREE | |
| (24) PARAM 07 | |
| (25) PARAM 08 | |
| (26) PARAM 09 | |
| (27) ATTRACTIVENESS | |
| (28) PARAM 10 | |
| (29) PARAM 11 | |
| (30) GOURMET | |

FIG.8

```
Content-Type : application/x-postpet
Content-Transfer-Encoding : Base64
iAEAAgAAAAAAAAAAAAAAAAAAAAAAAAAAAAAAAAAPABQAAAAAAAA8AFAAEADzoH/gf/B/z9NTOIVTIJYVIhWXVNF
ROVMTFFPTk9RTURFSE5MUVBUSO5MSkpRUVIWWV1fXFpZWIFUTk9SUIFRSkRDSIBQTVNUYIFMRVFX
Y4u520Df40DI5eTo5ubn4+Pl4+Lh5OPm4unf5d714t7m4ubi3+fn3t7i5ODf40DI5uXh4+Xn4N/J
40jm4+bm4uPo4Oxe5+jm5d/i6ODj5Ofg6ebm6Obf3ufo2dDO1NP+zxjROM7N1M7LzdPTOtHOz9HM
z9DNOc/U1dfTZ9bPztbNINPOzNPRONPPy9TWO9LMOM7Oos3WONDTOdHPlM7TzdPUO9LPz9LUzdDV
1MrROM3Qzsu4i2RTTU9MSOILUVNQUVVUVk9QTO1FOzk5RkZQSIRPW1hWUIFOTUIMTEPHROZESUZI
/kUUQkBHTO1LTIVMTOhERkZQUIFGREFGAC/+LXsqLTtwLzUyMCMolSsoKSwtLS4pJiknJigsLiow
LSOoJiYsMC4yNzAwMy4xKSwpKIwpKSUmlSYoLCswLCUnJScsKz54sdPK4OPI3uXj4uTh4+Xe3+Th
40Pg3t3j4uXj4d/j4+Dj5d7k5uDj4+XJ5ODI4d/h50Xg3uHe3+Dlbt7g4uLh4+Tn5OLe5OPk40bm
4+f5+jh6N/j4+Xg3+LZztXMIMrTO87NIM/MzszVzdLSz9DTzNTVONHQzNLROtLWONPROM7VO8zS
```

FIG.9

METHOD AND APPARATUS FOR SENDING E-MAIL, METHOD AND APPARATUS FOR RECEIVING E-MAIL, SENDING/RECEIVING METHOD AND APPARATUS FOR E-MAIL, SENDING PROGRAM SUPPLYING MEDIUM, RECEIVING PROGRAM SUPPLYING MEDIUM AND SENDING/RECEIVING PROGRAM SUPPLYING MEDIUM

This application is a Continuation of U.S. patent application Ser. No. 08/993,726 filed Dec. 17, 1997 now U.S. Pat. No. 6,311,195.

BACKGROUND OF THE INVENTION

1. Field of the Invention

This invention relates to a method and apparatus for sending an E-mail, a method and apparatus for receiving an E-mail, a sending/receiving method and apparatus for an E-mail, a sending program supplying medium, a receiving program supplying medium and a sending/receiving program supplying medium, used for exchanging an E-mail between computer terminals of, for example, personal computers, over a communication network.

2. Description of Related Art

As a configuration of utilizing the Internet providing a global-scale communication network environment capable of exchanging the information between mutually spaced-apart computers, an electronic mail (E-mail) is in widespread use.

In an Internet E-mail system, mail servers are provided in a distributed fashion in each domain. The client user sends or receives an E-mail to or from a mail server of a domain to which he or she belongs.

That is, a sender states the contents he or she desires to send and accords a required address and name by a client tool for an E-mail termed a mailer (software for sending/receiving the mail) for sending the mail to the receiver.

The mail server of a domain to which the sender belongs sends the mail for transmission to a representative mail server of an organization. The representative mail server accords an address of the server/node to send the address to the network, which then refers to the address to sequentially transfer the mail to the mail server to which belongs the counterpart of the communication (receiver).

The receiver recognizes the arrival of the E-mail in his or her post by various means such as display of a notice of arrival upon starting the mailer so that he or she can read the received mail.

For delivery of the E-mail, the simple mail transfer protocol (SMTP), which is the upper-order protocol of the transmission control/Internet Protocol (TCP/IP), is used as the communication protocol. Usually, the format is automatically formulated by the mailer. To the leading end of the main text of the mail is appended a header made up of rows stating a date [Date:], a name of mail sender [From:], an address [To:], a title [Subject:] or a carbon copy (blind carbon copy) [Bcc:], in accordance with SMTP.

Although the E-mail system of the Internet is based on the text (letter information: character codes), an extension format, configured to enable handling of languages other than English or multimedia such as pictures or speech, is also defined as multipurpose Internet mail extension (MIME). That is, the still-picture information, moving picture information or the speech information is compressed and converted to character codes which are assembled in the MIME system into the text and sent in this form. The receiver side automatically interprets the MIME system to check the form in which the information is assembled into the text to start a viewer/player tool for displaying/reproducing the information.

Such an E-mail system in which the picture information is annexed to the E-mail for enabling sending/reception of the E-mail made up of co-existing pictures and letters is known from the Japanese Laying-open Patent Application JP-A-5-274233 proposed by the present Assignee. With this E-mail system, a terminal keyboard or mouse is operated for drawing or writing a main text and a picture on a letter pad displayed on a CRT and the keyboard or the mouse is further operated for issuing a send command for an E-mail. It is then judged whether or not the name of the receiver is stated on an uppermost row of the text. If the receiver name is judged to be entered, an E-mail header made up of the receiver's name, sender's name and the current data is formulated. It is then checked whether a picture is drawn on the letter pad. If the picture is found to have been drawn, the picture information data made up of the page information stating the page of the letter pad having the picture, the position information specifying the position of the picture and the picture title is formulated and appended to the E-mail header. The main text is then appended and sent as the E-mail.

Although the above-described E-mail system is highly convenient if one is accustomed to it, the system is unfriendly to a user sending or receiving the E-mail for the first time using a personal computer, because the system is very different from the usual letter delivery system customarily used in everyday life. That is, the E-mail system can be utilized only after the user has learned and fully understood the operating method for the mailer as the E-mail exchanging software with the aid of a manual.

Recently, a set-top box, termed an Internet terminal, having assembled therein the Internet accessing function, is in the market, such that a user not in possession of a personal computer can easily utilize the Internet services by connecting the Internet terminal to the television receiver in his or her home. However, the mailer operating method cannot be intuitively understood even by this Internet terminal user.

As the graphic user interface (GUI) which brings friendliness to the user into account, there is known a desk top metaphor picture imitating the desk top which is implemented by the operating system termed a Magic Cap (trade name) developed by General Magic Inc., US. FIG. 1 shows a typical display of the GUI picture of Magic Cap. This GUI picture displays the metaphor of the every-day tools or daily life environment using a desk top picture 300 simulating a study. On this desk top picture 300 are displayed a timepiece 301 showing the current time, an in-box 302 showing the number of received E-mails, an out-box 303 showing the number of E-mails ready to be sent and a file cabinet 304 for keeping files. In addition, a telephone 305, an address book 306, a postcard 307 for formulating a message sent by the E-mail, a notebook 308, and a schedule memorandum 309, are displayed as being placed on a desk fitted with a drawer so that these can be actuated by a pen touch.

However, although an image simulating an actual postcard is displayed in the GUI picture by Magic Cap, the process of receiving and delivering the postcard 307 or the process of arrival of the postcard from another user is not displayed, such that the user cannot intuitively comprehend the delivery process. Thus, the user cannot surmise the process or the exchanging method of the E-mails or the operating method from the customary letter delivery system.

Meanwhile, there is disclosed in the Japanese laying-Open Patent Application JP-A-3-222033, corresponding to U.S. Pat. No. 5,347,628, a technique concerning GUI which enables intuitive accessing to electronic data of a desk top metaphor picture simulating a room by a moving-picture-like icon, as an interface for a data processing device.

SUMMARY OF THE INVENTION

It is therefore an object of the present invention to provide an E-mail sending/receiving method and apparatus and a sending/receiving program supply medium, according to which, under utilization of the real-world-oriented GUI, a user can entrust his or her mail as an agent acting on his or her half to enable facilitated sending/reception of the E-mail by an intuitively comprehensible operation.

It is another object of the present invention to provide an E-mail sending/receiving method and apparatus and a sending/receiving program supply medium, according to which an imaginary pet displayed on a real-world-oriented GUI picture is used as an agent and a parameter for controlling the agent behavior is appended to the E-mail for sending or receiving the E-mail.

In an E-mail sending method and apparatus and a sending program supplying medium, according to the present invention, an agent is displayed on a screen and the behavior of the agent is managed by agent parameters and, on accepting a send command for commanding the sending of an E-mail, agent parameters determining the behavior of the agent are annexed to the main text of the mail having an appended mail header for sending the E-mail.

In an E-mail receiving method and apparatus and a receiving program supplying medium, according to the present invention, an E-mail is received on accepting a receive command designating the reception of an E-mail and the behavior of the agent is controlled responsive to the agent parameters annexed to the main text of the received mail for displaying the agent on a screen.

In an E-mail sending/receiving method and apparatus and a sending/receiving program supplying medium, according to the present invention, an agent is displayed on a screen and the behavior of the agent is managed by agent parameters. Upon accepting a send command designating the sending of an E-mail, agent parameters determining the behavior of the agent are annexed to the main text of the mail having an appended mail header for sending the E-mail. The E-mail is received upon accepting a receive command designating the reception of the E-mail. The behavior of an agent is controlled responsive to agent parameters annexed to the received main text of the mail for displaying the agent on a screen.

In the E-mail sending/receiving method and apparatus and the sending/receiving program supplying medium, according to the present invention, an agent is displayed on a screen and the behavior of the agent is managed by agent parameters. Upon accepting a sending command for commanding the send of the E-mail, agent parameters determining the behavior of the agent are annexed to the main text of the mail having an appended mail header for sending the E-mail. Thus, an E-mail can be sent/received by an agent acting on the behalf of a user by taking advantage of the real-world oriented GUI by a process which allows for its intuitive comprehension by the user.

That is, according to the present invention, the E-mail exchanging process is represented as the behavior of an agent simulating the behavior of a letter delivery taking place in everyday life thus allowing the user to surmise the function or the operating procedure easily. The operating method can be learned and exploited easily for a user who first uses a computer for exchanging E-mails. Moreover, by sending agent parameters, previously updated according to the experiences of a virtual pet as an agent, as annexed papers to the E-mail, and by automatically returning only the agent parameters from the receiving side, the E-mail can be sent/received with animated representation as if the pet is going out or coming into a GUI picture simulating the insides of the sender's room and the receiver's room for mail dispatch and mail delivery. Also, by updating agent data determining the character or the behavior of the virtual pet responsive to the mouse operation by the user simulating for example, caressing the pet or serving refreshments for the pet for varying the behavior of the pet, represented by animation, responsive to the maintained environment, simulating the maintenance of the virtual pet represented by animation can be achieved.

Thus, by exchanging mails by a virtual pet virtually maintained in the real-world-oriented GUI picture simulating the insides of both the sender's room and the receiver's room, both the sender and the receiver have the common consciousness of maintaining virtual pets, thus enabling mail exchange with an amicable feeling. In addition, a feeling representation function responsive to the new maintained environment can be annexed as communication means.

By storing picture data of the agents representing the animation of the virtual pets in personal computers of both the sender and the receiver, and by actually sending agent parameters controlling the agent's behavior, the results as if the picture data of the agents were being sent are obtained. By sending the agent parameters instead of picture data, the user connection time can be reduced to a minimum. If the user uses dial-up IP connection, the connection charges for the provider and the telephone charges can be reduced. Since the exchanged data may be reduced in volume, saving in the resources of the Internet in its entirety can be achieved.

Additional features and advantages of the present invention are described in, and will be apparent from, the following Detailed Description of the Invention and the figures.

BRIEF DESCRIPTION OF THE FIGURES

FIG. 8 shows the type of agent parameter annexed to the main text of an E-mail sent by the PostPet;

FIG. 9 shows an example of an agent parameter annexed to the main text of an E-mail sent by the PostPet;

DESCRIPTION OF PREFERRED EMBODIMENTS

Figure 1:
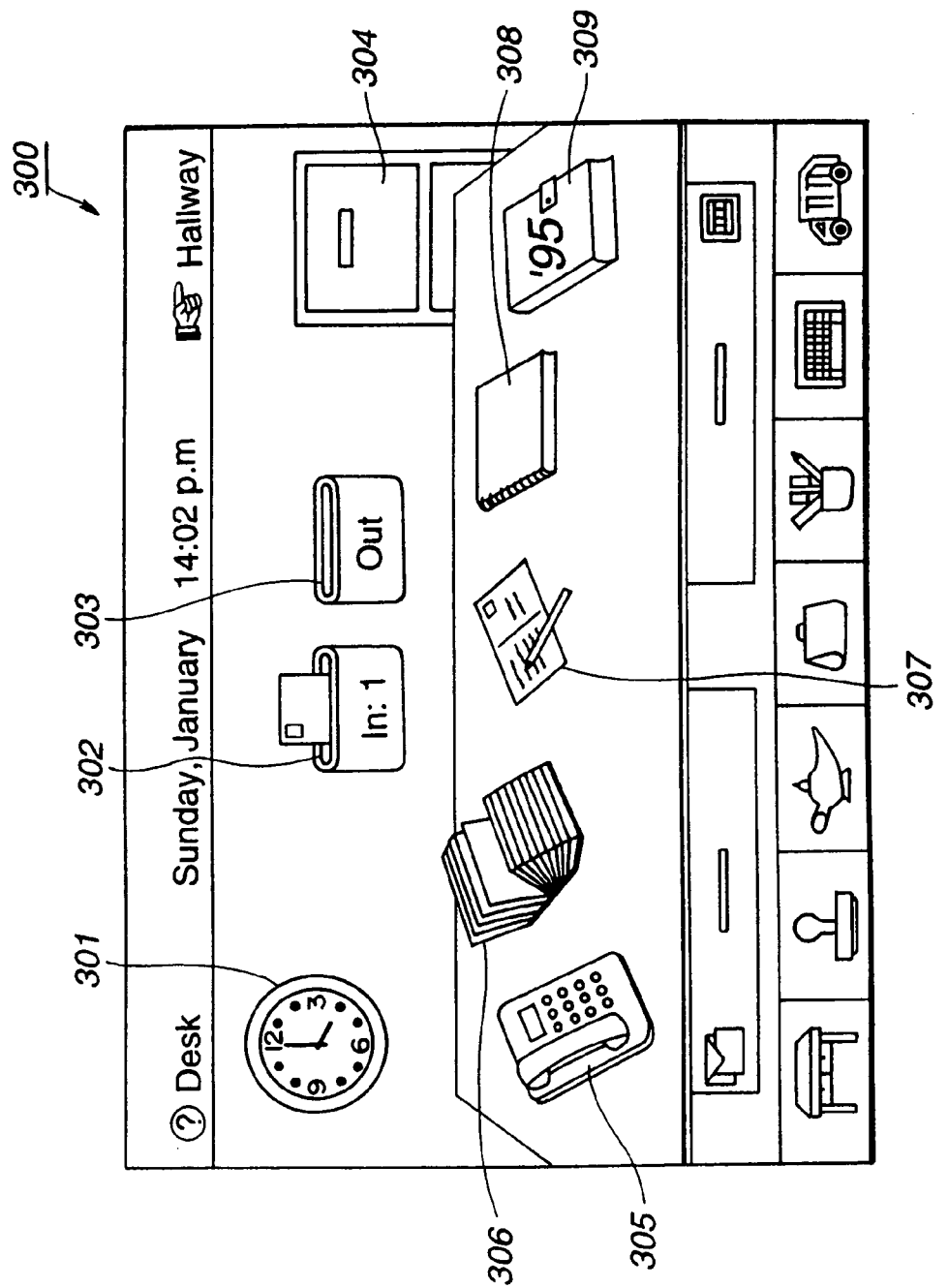
FIG. 1 shows a display example of GUI picture of Magic Cap.
Figure 2:
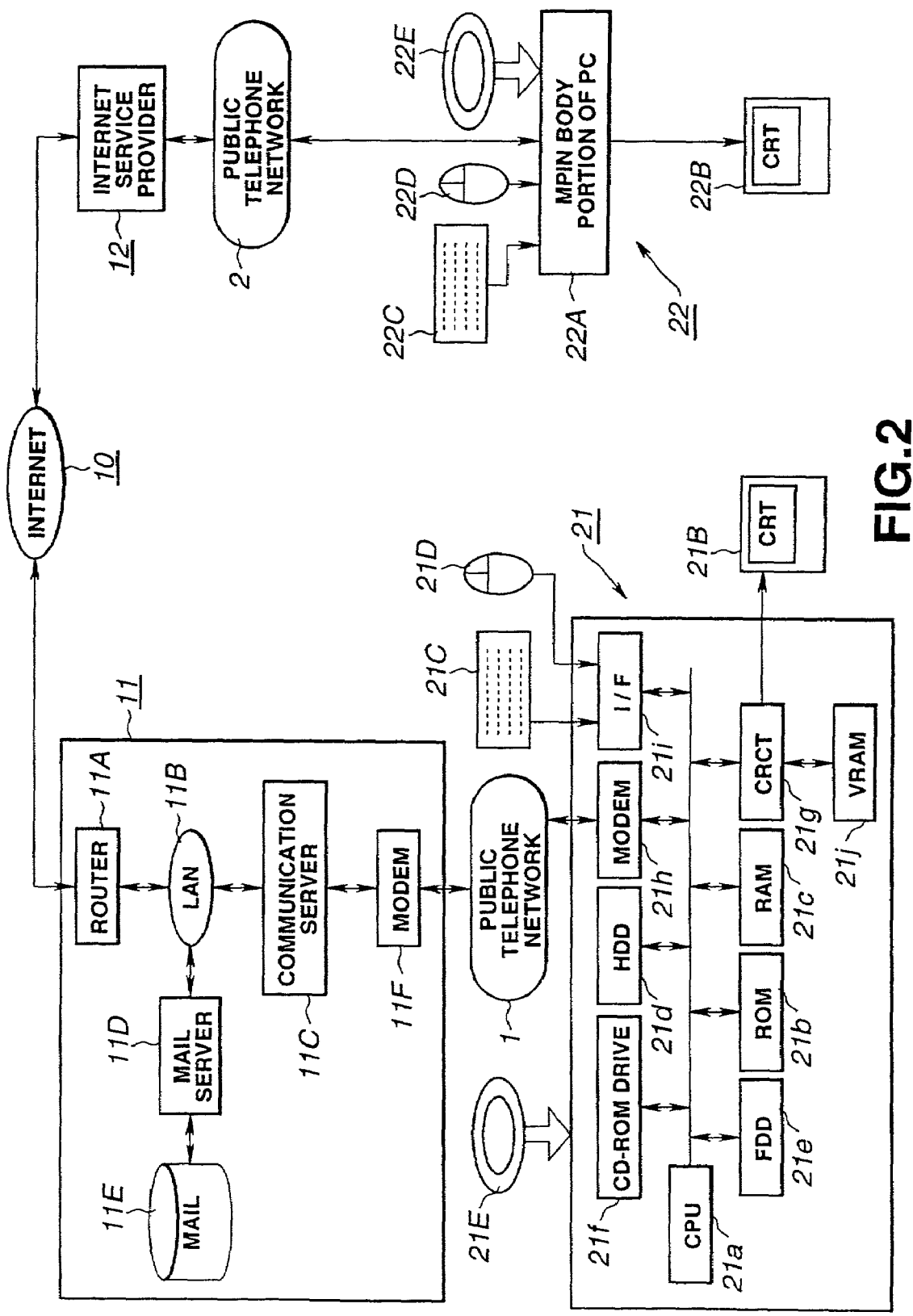
FIG. 2 is a schematic block diagram showing an E-mail system according to the present invention.

Referring to the drawings, preferred embodiments of the present invention will be explained in detail.

The present invention is applied to an electronic mail (E-mail) system in which an E-mail is exchanged between plural personal computers 21, 22 connected respectively to an Internet 10 via public telephone networks 1, 2 and via Internet service providers 11, 12.

The Internet service provider 11 is constituted by a router 11A, a communication server 11C and a mail server 11D interconnected by the Local Area Network (LAN) 11B.

There is provided in the mail server 11D a mail spool 11E constituted by a hard disc drive for transient storage of the E-mail. The communication server 11C includes a MODEM 11F for connection over a public telephone network 1 to the personal computer 21. This Internet service provider 11 transfers the E-mail, sent from a personal computer 21 of a client user connected by dial-up IP over the public telephone network 1 to the communication server 11C, to a mail server 11D, which then transfers this transferred E-mail over the Internet 10 to a mail server, not shown, of an Internet service provider 12 of the domain to which belongs the receiver (counterpart of communication). When an E-mail addressed to a client user over the Internet 10 is transferred to the Internet service provider 11, the latter stores the mail in a mail spool 11E to transfer the mail to the client user whenever a transfer request is made from the valid client user. Meanwhile, other Internet service providers 12, . . . also have the E-mail storage and transferring function basically similar to that of the Internet service provider 11.

This personal computer 21 of the client user of the Internet service provider 11 includes a main body portion 21A, a CRT display device 2113, a keyboard 21C and a mouse 21D. The main body portion 21A is provided with a central processing unit (CPU) 21a, a read-only memory (ROM) 21b, a random-access memory (RAM) 21c, a hard disc drive 21d, a floppy-disc drive (FDD) 21e, a CD-ROM drive 21f, a cathode ray tube controller (CRTC) as a display controller 21g, a MODEM 21h, an interfacing (I/F) unit 21i and a video RAM 21j. The CRT display device 21B is connected to the display controller 21g, while the keyboard 21C and the mouse 21D are connected to the interfacing unit 21i.

The personal computer 21 is connected via the main body portion 21A to the public telephone network 1.

The personal computer 21 operates as a mailer by reading out and installing an E-mail sending/receiving program stored in the CD-ROM drive 21E. Meanwhile, the E-mail sending/receiving program may also be downloaded and installed from e.g., http://www.postpet.so-net.ne.jp/ of a World Wide Web (WWW) server on the Internet 10 managed by SONY COMMUNICATION NETWORK KK over the Internet service provider 11 and the public telephone network 1.

Therefore, the program purveying medium within the scope of the present invention means not only the recording medium such as CD-ROM 21E but also a medium in the broad sense of the term including Internet or digital satellite data broadcast.

In the present embodiment, other personal computers 22 also operate as a mailer by having installed therein the same E-mail sending/receiving programs as the above personal computer 21.

Figure 3:
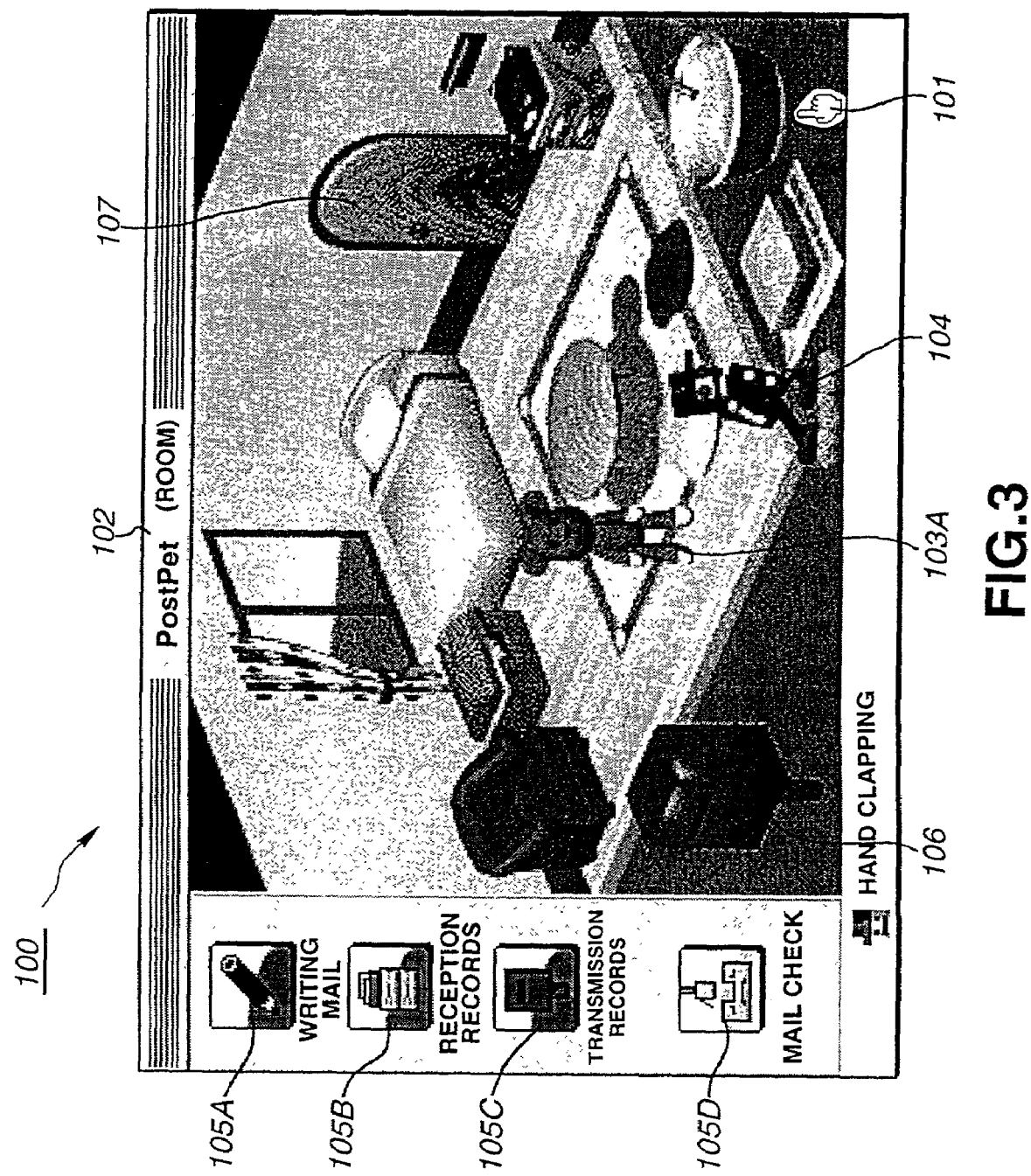
FIG. 3 shows a GUI picture of a 'PostPet (room)' displayed upon starting a mailer installed on a personal computer with the E-mail system.

If, in the personal computer 21, having installed therein the above-mentioned E-mail sending/receiving program, the mailer is started, the CPU 21a generates bit map data corresponding to the graphical user interface (GUI) picture simulating a room to write the bit map data on the video RAM 21j of the display controller 21g for causing the display controller 21g to display the GUI picture 100 of FIG. 3 on the screen of the display device 21B.

For superposed display of a pointing cursor 101 on the GUI picture 100, the CPU 21a writes the bit map data of the pointing cursor 101 at a pre-set position of the video RAM 21j. This displays the pointing cursor 101 at a position specified by the mouse 21D on the GUI picture 100 displayed on the screen of the display device 21B.

On the top of the GUI picture 100 a title 102 is displayed.

On the GUI picture 100 shown in FIG. 3 is displayed 'PostPet (Room)' as a title 102. Meanwhile, the post pet and the post pet are trade marks of a mailer which is an Internet E-mail sending/receiving program purveyed by SONY COMMUNICATION NETWORK KK.

For superposed display on the GUI picture 100 of a post pet 103 simulating a bear doll and a postman 104 simulating a robot doll as agents for performing E-mail sending/ reception, the CPU 21e writes bit map data of the post pet 103 and the postman 104 at pre-set positions on the RAM 21j in superposition on the bit map data corresponding to the GUI picture 100. This displays the post pet 103 and the postman 104 on the GUI screen 100.

Figure 4:
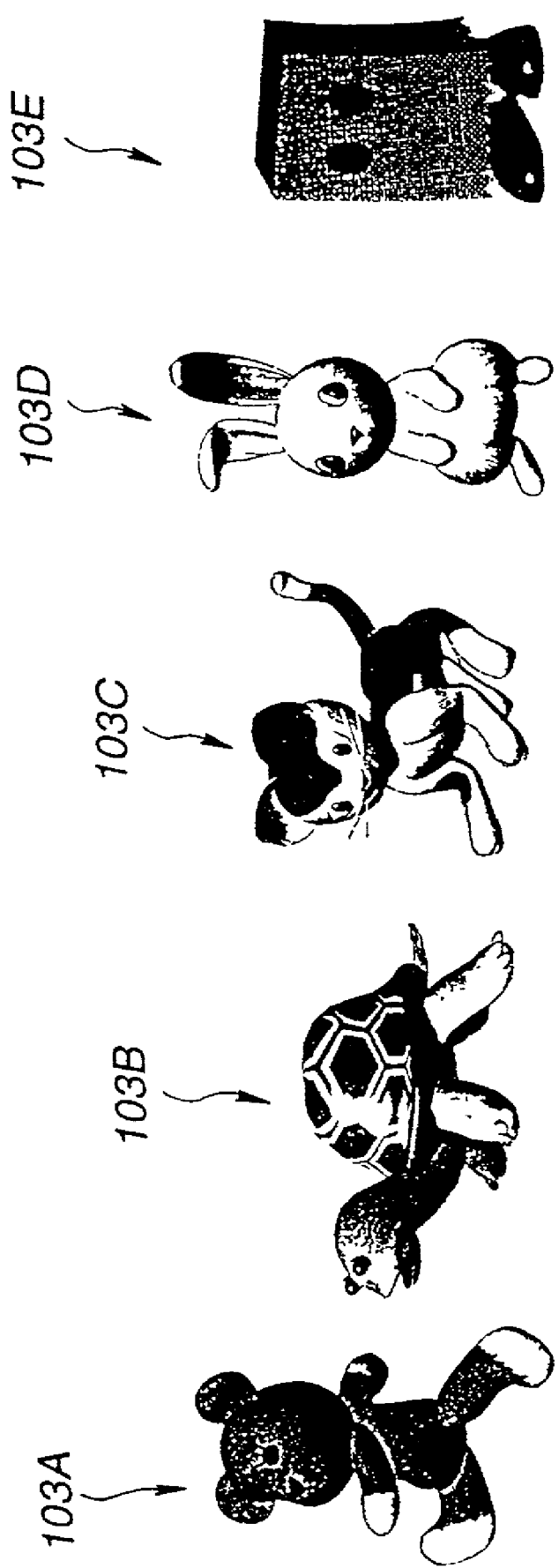
FIG. 4 shows the type of a PostPet prepared in the mailer.

As characters of the post pet 103, there are provided teddy bear (Momo) 103 simulating a bear, a tortoise (Sumiko) 103B, a hybrid cat (Furo) 103C, a mini-rabbit (Mippi) 103D and a Hatena-kun 103E, as shown for example in FIG. 4. One of these excluding Hatena-kun 103E can be registered and used as the post pet 103, that is as an agent. The post pet 103 has its behavior determined by agent parameters varied by the learning function as later explained.

On the left-side portion of the GUI picture 100 of the 'PostPet (Room)' shown in FIG. 3 are displayed a mail writing icon 105A, shown in FIG. 4, a reception list icon 105B, shown in FIG. 4, a sending list icon 105C for commanding display of a GUI picture of a sending list, not shown, and a mail check icon 105D for commanding the connection, also not shown.

The user operates the mouse 21D for moving the pointing cursor 101 on the mail writing icon 105A on the GUI picture of the above-mentioned 'PostPet (Room)' to click the mail writing icon 105A. This causes the CPU 21a to write the bit map data, corresponding to the GUI picture 100 of the 'PostPet (Room)' and a 'Write a Mail' GUI picture 110 superposed thereon, at a pre-set position on the video RAM 21j, such that the GUI picture 100 of the 'PostPet (Room)' and the 'Write a Mail' GUI picture 110 are displayed by multiple window representation on the screen of the display device 21B.

On the top of the GUI picture 110 is displayed 'Write a Mail' as a title 112. The upper and lower halves of the 'Write a Mail' GUI picture 110 represent a first display area 113 for displaying the contents of the mail header and a second display area 114 for displaying the mail contents, respectively. In the first display area 113, there is displayed the header information, such as the address [To:], name of mail sender [From], title [Subject], carbon copy [Color conversion:] or attachment [Attachment], entered by actuation of the keyboard 21C by the user. In the first display area 113, there are displayed an icon 115A for handing over to a pet for instructing mail dispatch by the post pet 103 and an icon 115B for handing over to the postman 104 for instructing mail dispatch by the postman 104.

In the second display area 114 the main text of the mail entered on keyboard actuation by the user is displayed.

If the user actuates the mouse 21D to shift the pointing cursor 101 over the icon 115A of handing over to the pet on the GUI picture 110 of 'Writing a Mail' and clicks a mouse button, the CPU 21a executes processing of steps SP20 to SP27 of the sending subroutine processing to send the pet mail, as will be explained subsequently with reference to FIG. 11.

Figure 7:
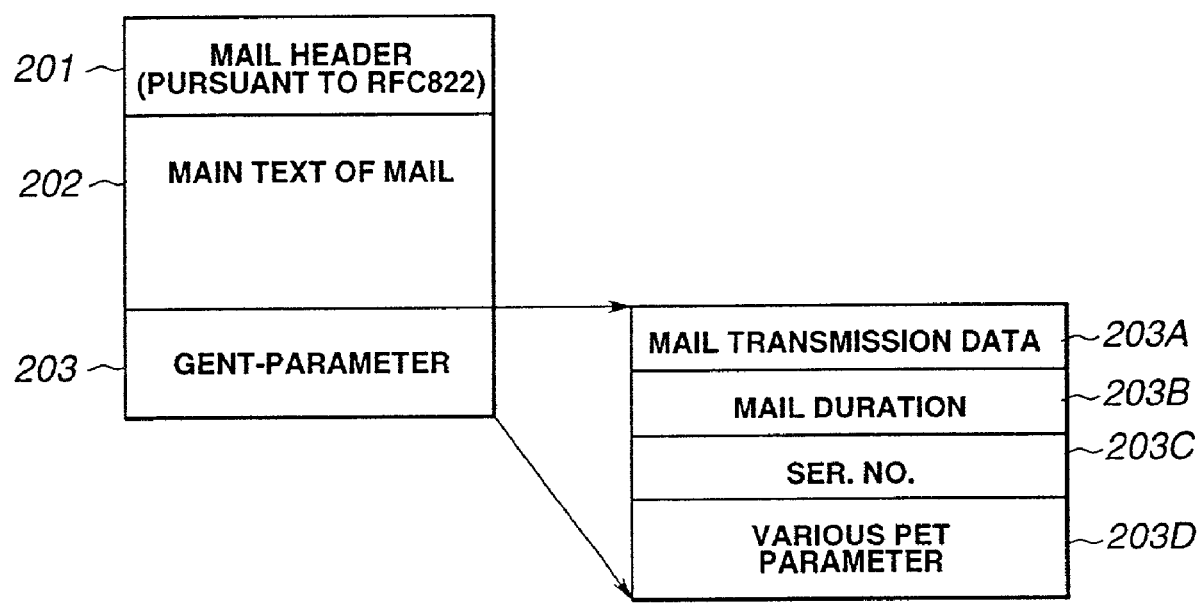
FIG. 7 shows the structure of an E-mail sent by the PostPet.

Specifically, as shown in FIG. 7, the CPU 21a formulates data of an E-mail composed of a main text 202 added thereto with a mail header 201 and an agent parameter 203 determining the behavior of the post pet 103 attached to the main text, and sends the data as pet mail to the receiver. Each of the agent parameter 203 is made up of 4-byte data of the sending data information 203A specifying the mail sending date, mail life information 203B specifying whether or not the receiver has to modify the mail to return it to the sender, serial number information 203C specifying the number of the mails handled so far by the post pet, and the post pet parameter information 203D, such as the information of the environment, stimulus or desire information of the post pet.

The post pet parameter information 203D is made up of inner information and outer information, as shown in FIG. 8. The inner information is made up of, for example, mail count, age, sex, intelligence, vigor, friendship (with the keeper), hunger, happiness, cleanliness, bio-rhythm (indefinite element), noise (indefinite element), friendship (with the counterpart), positiveness/negativeness (+/−), cheerfulness/gloominess (+/−), gentleness/coldness (+/−), concentration/diffuseness (+/−), chich/awkward, fashionability, attractiveness or taste for gourmet. The outer parameters is made up of, for example, position, comfortableness of a room, user action-number of times of hitting, guest action-called, guest action-shown friendship, guest action-shown hostility, guest action-giving items, and guest action-requesting items. These parameters are entered to the feeling unit as later explained to start the behavior unit to determine the behavior of the post pet 103.

The above-mentioned agent parameters 203 are converted into Base 64 format employing letters of A to Z, a to z and 0 to 9 in accordance with the Multipurpose Internet Mail Extension (MIME) of the Internet mail. FIG. 9 shows an example of the agent parameters 203 annexed to the main text of the mail 202. The MIME provides two sorts of the encoding methods. In the Base 64 stated in Request for Comments (RFC) 1512, 3 bytes are divided into four equal parts to narrow the code width to accommodate the values specified by the bytes in 64 numerical figures of from 0 to 63 to which letter codes of A to Z, a to z and 0 to 9 are accorded. Further, details on RFC are stated in D. Comer, "Internet working with TCP/IP" 1988, Prentice-Hall ISBNO-13-470154-2, 025.

If the user actuates the mouse 21D to move the pointing cursor 101 on the icon 115B of handing over the GUI picture 110 of 'Writing a Mail' to the postman to click the mouse button, the CPU 21a executes the processing from SP29 to SP33 in the sending subroutine processing as later explained with reference to FIG. 11 in order to send the usual mail.

That is, the CPU 21a simply formulates data of an E-mail made up of the main text 202 of the mail added to with the mail header 201 and sends it to the counterpart as the usual E-mail.

Referring to FIGS. 10 to 13, the operation of the personal computer 21 having installed therein the above-mentioned E-mail sending/receiving program, is hereinafter explained.

Figure 10:
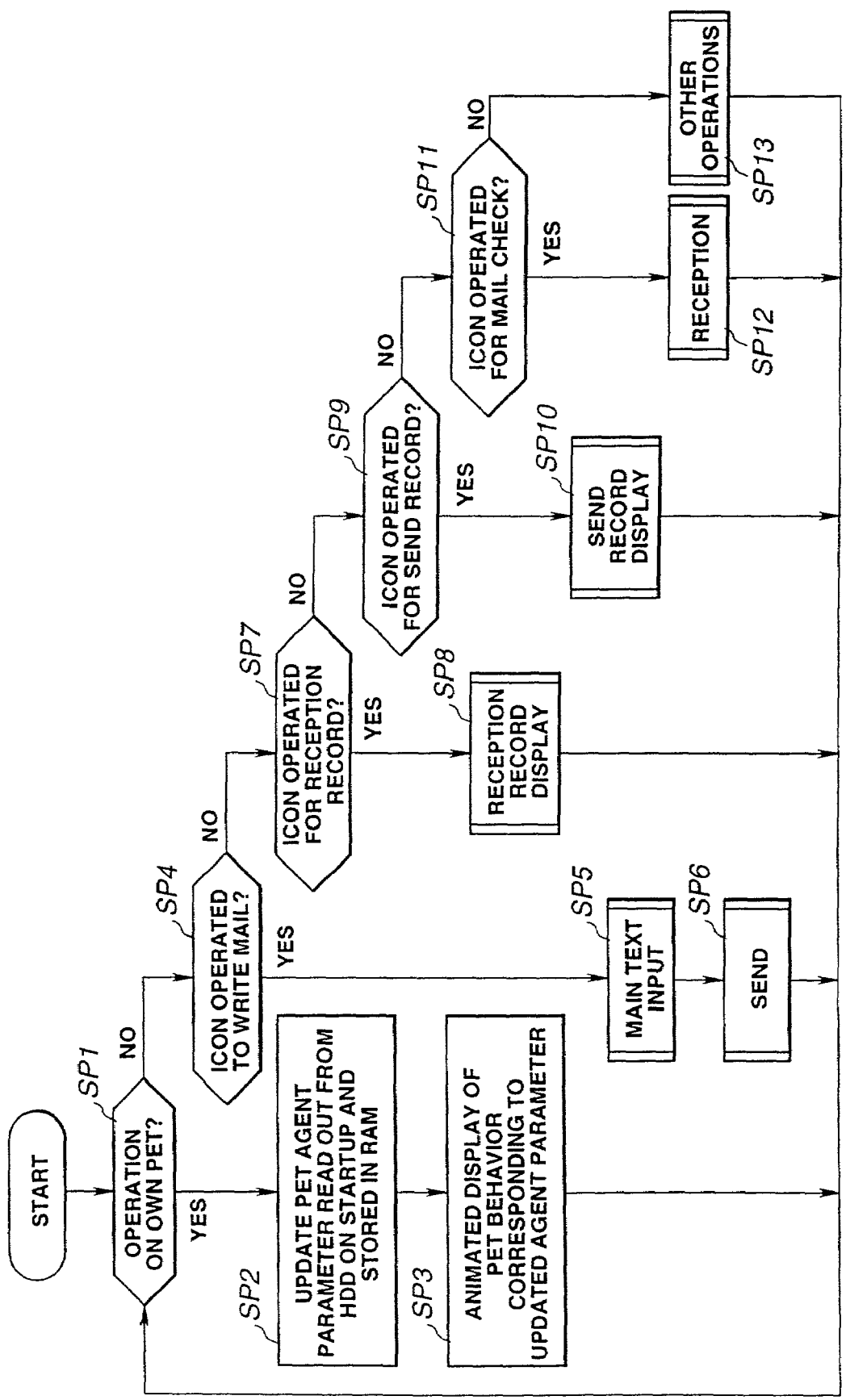
FIG. 10 is a flowchart showing the entire processing function of the mailer.

First, steps SP1 to SP13 of the general flowchart, comprehensively showing the entire operation of FIG. 10, is explained.

Figure 33:
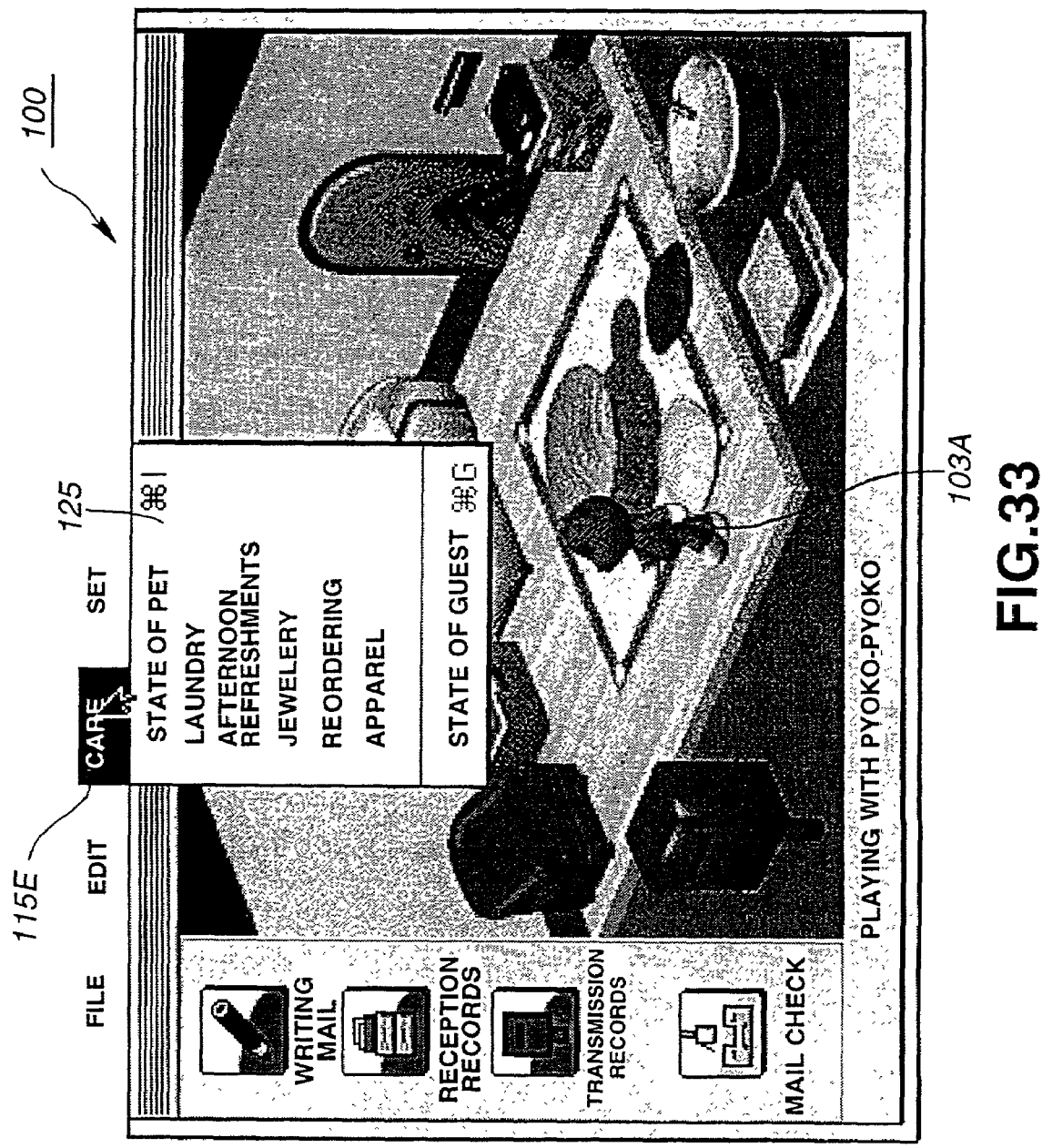
FIG. 33 shows the state of clicking an icon commanding looking after the post pet on the GUT picture of the 'PostPet (Room)' for opening a pulldown menu.

At step SP1 of FIG. 10, it is judged whether or not the operation by the user is an operation on a pet owned by no other than the user. That is, if the mouse 21D is actuated by the user such that the operation of superposing the pointing cursor 101 shown in FIG. 3 on the post pet 103 (on the teddy-bear 103A in the case of FIG. 3), shifting the mouse Z1D left or right or clicking the mouse button is carried out, or if 'wash' or 'refreshments' are selected from the looking-after pulldown menu, as shown in FIG. 33, such that the operation of looking after the post pet 103 is carried out, these operations by the user are judged to be the operation for his or her own pet (the pet owned by the user). In this case, processing transfers to step SP2 and, if otherwise, processing transfers to step SP4.

At step SP2, the agent parameters of the user's own pet, read out on startup of the E-mail sending/receiving program from HDD 21d and stored in RAM 21c, are updated. The processing for updating the agent parameters will be explained later in detail with reference to FIG. 13.

At the next step SP3, the processing for animated representation of the behavior of the user's own pet in association with the updated agent parameters is executed before processing reverts to step SP1.

If, at step SP1, the operations are judged as not being the operations on the user's own pet, such that processing transfers to step SP4, it is judged at this step SP4 whether or not the mail writing icon 105A has been clicked. If the result of judgment is affirmative, processing transfers to step SP5 and, if otherwise, to step SP7.

Figure 5:
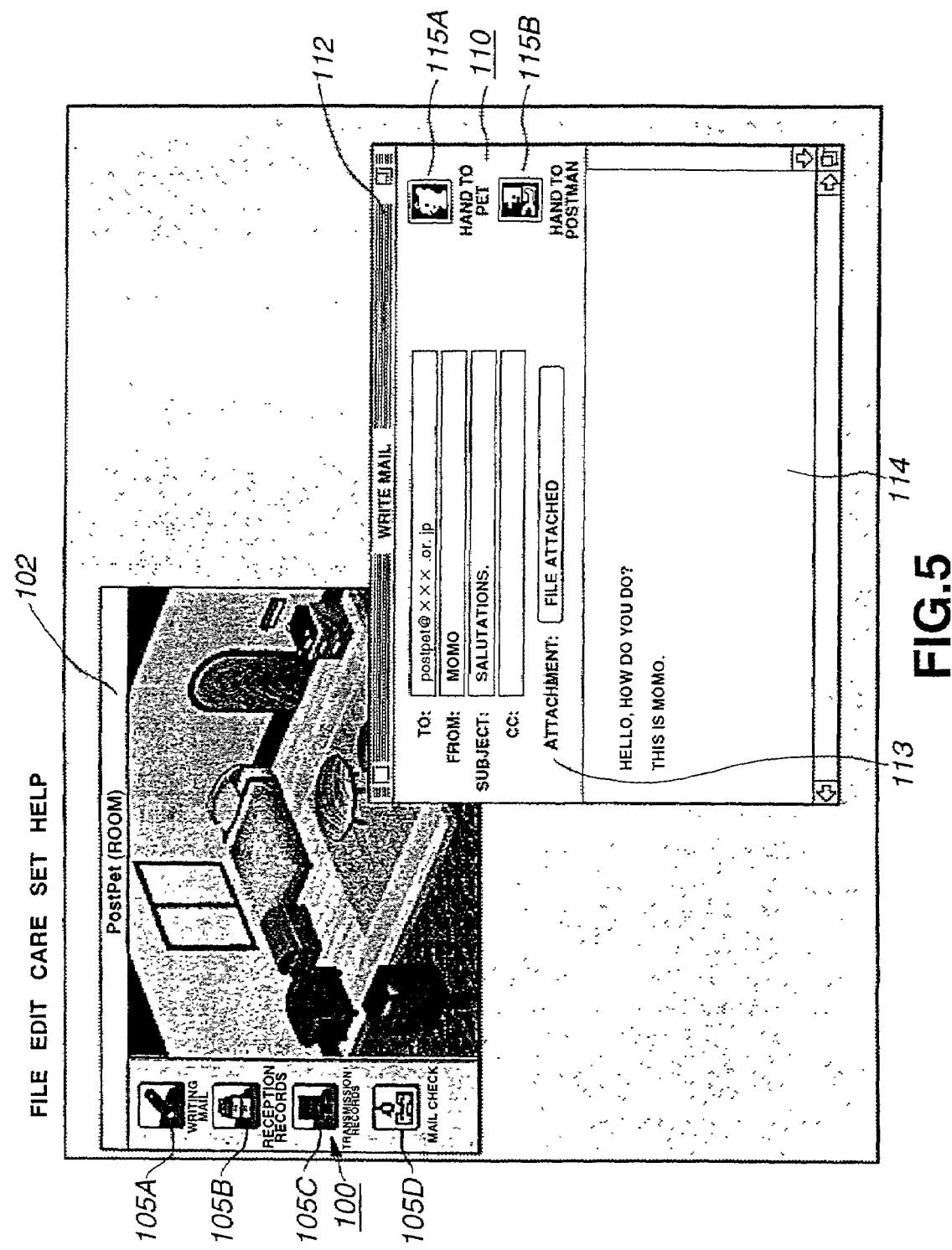
FIG. 5 shows a GUI picture for 'Write a Mail' represented on the mailer.

At step SP5, the sub-routine of entering the header of the E-mail to be sent or the main text is executed. First, the GUI picture 110 of 'Writing a Mail' shown in FIG. 5 is displayed, after which the E-mail header or the main text is formulated in accordance with the text inputting command by the user before processing transfers to step SP6.

Figure 11:
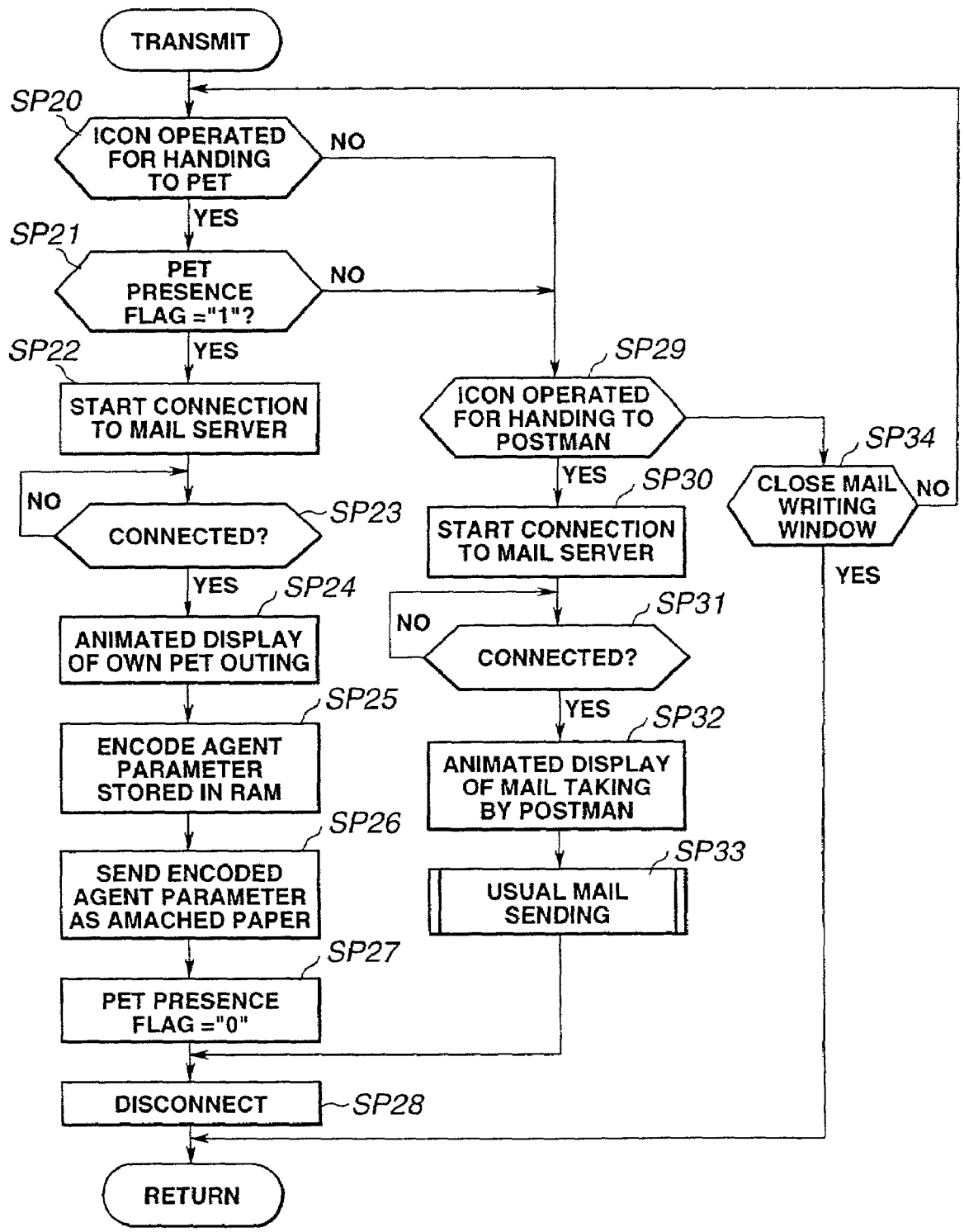
FIG. 11 is a flowchart showing the contents of sending processing by the mailer.

At step SP6, the sending subroutine explained subsequently with reference to FIG. 11 is executed, before processing reverts to step SP1.

Figure 6:
FIG. 6 shows a GUI picture of a 'reception list' represented on the mailer.

At step SP7, it is judged whether or not the reception list icon 105B has been clicked. If the result of judgment is affirmative, processing transfers to step SP8 and, if otherwise, to step SP9. At step SP8, the reception list display subroutine for displaying a GUI picture 120 of the 'reception list' shown in FIG. 6 is executed before processing reverts to step SP1.

At step SP9, it is judged whether or not the sending list 105C has been clicked. If the result of judgment is affirmative, processing transfers to step SP10 and, if otherwise, to step SP11. At step SP10, the reception list displaying subroutine for displaying the 'sending list' GUI picture, not shown, is executed, before processing reverts to step SP1.

Figure 12:
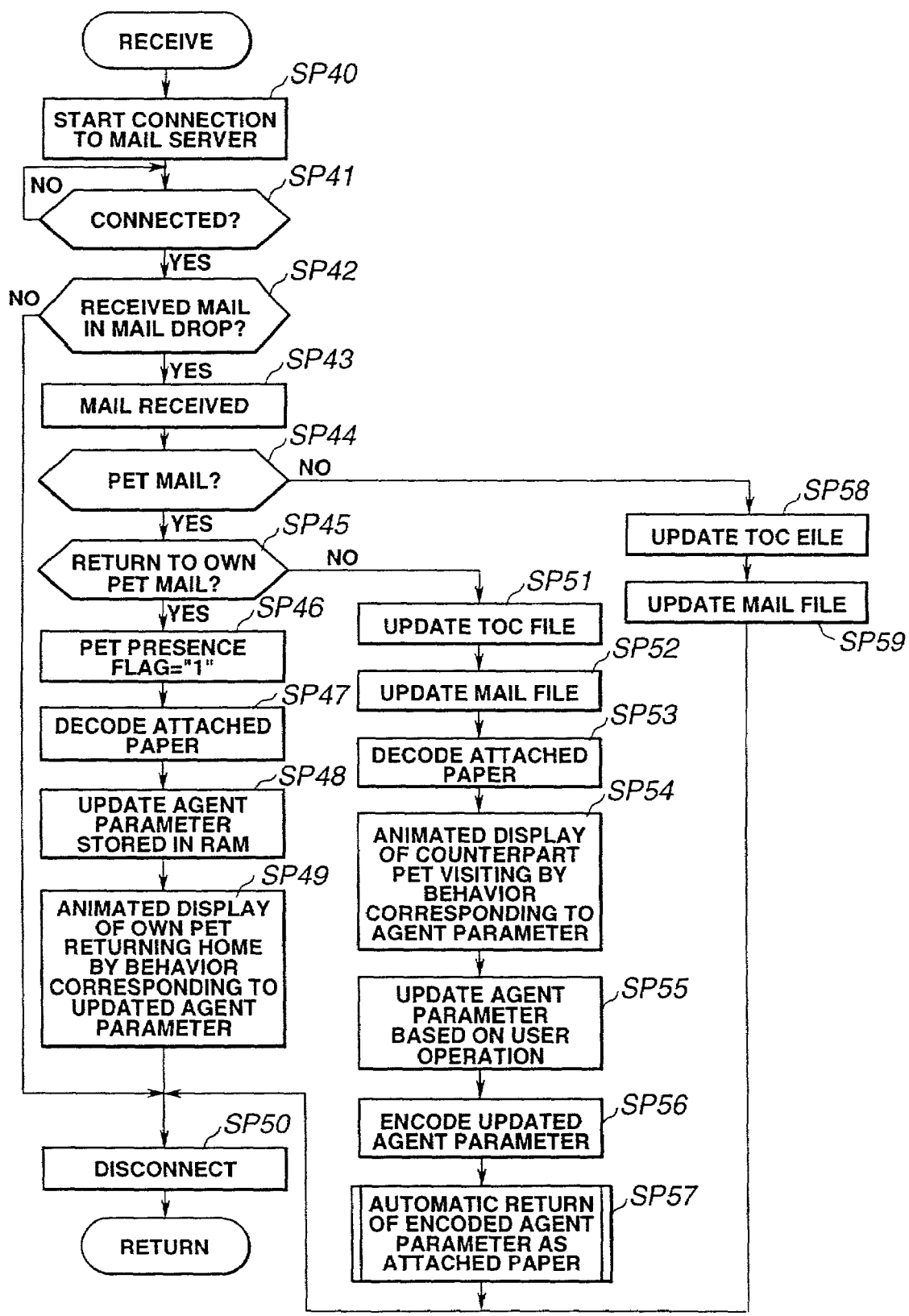
FIG. 12 is a flowchart showing the contents of receive processing by the mailer.

At step SP11, it is judged whether or not the mail check icon 105D has been clicked. If the result of judgment is affirmative, processing transfers to step SP12 and, if otherwise, to step SP13. At step SP12, the reception subroutine explained subsequently with reference to FIG. 12 is executed before processing reverts to step SP1. At step SP13, other processing operations are executed before processing reverts to step SP1.

Next, the steps SP20 to SP34 of the flowchart of the sending subroutine processing of FIG. 11 is explained.

Figure 20:
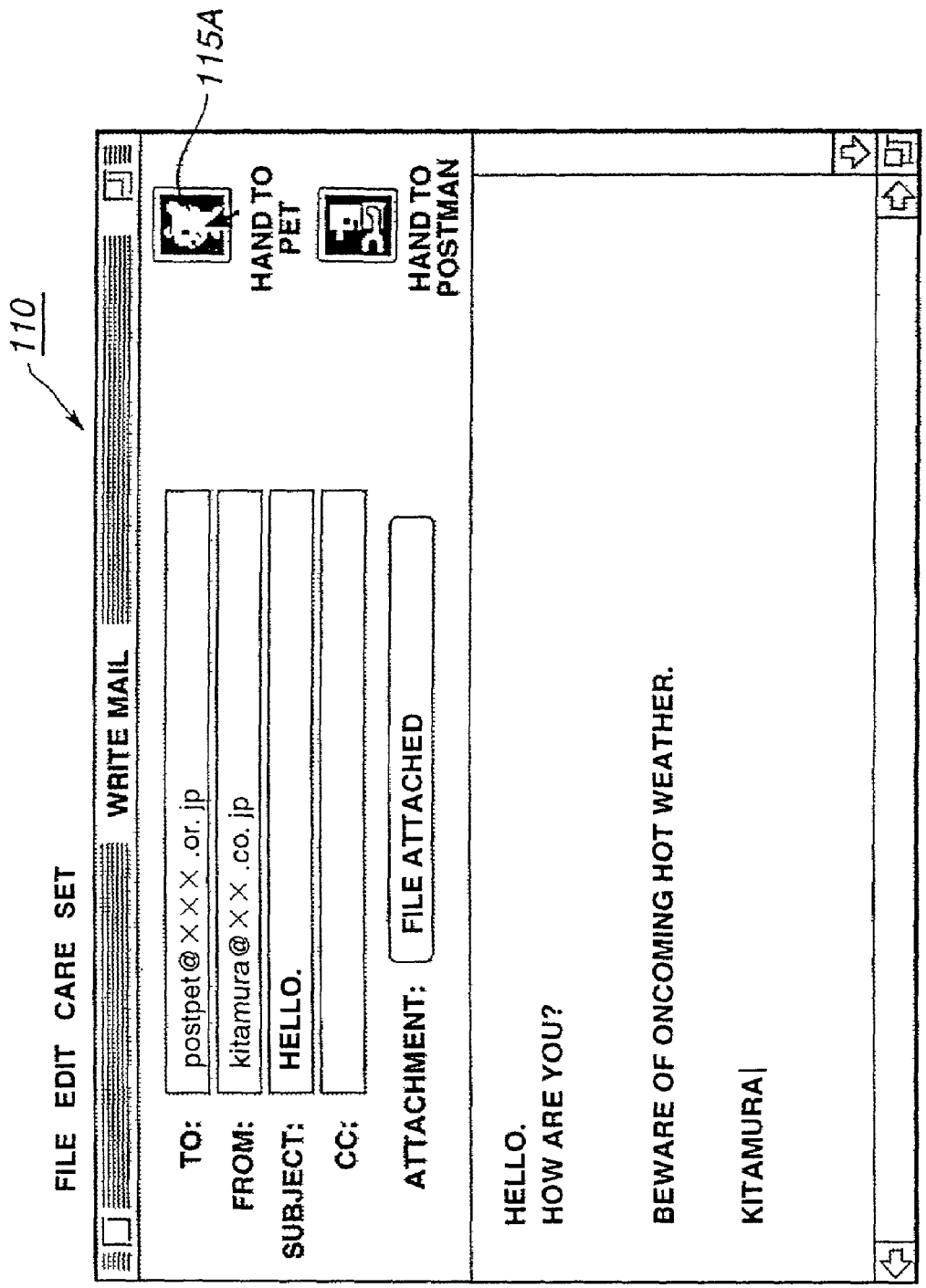
FIG. 20 shows the state of commanding a mail send by the PostPet on the GUI picture 'Write a Mail' represented by the mailer.

If the user actuates the mouse 21D to move the pointing cursor 101 on the icon 115A of handing over to the pet on the GUI picture 110 of 'Write a Mail' and clicks the mouse button, as shown in FIG. 20, it is judged that the icon 115A of handing over to the pet has been operated, such that processing transfers from step SP20 to step SP21 to judge whether or not a pet-at-home flag stored in the RAM 21c is '1'. If the user's pet is at home, that is, if the pet-at-home flag is "1", the subsequent steps SP22 to SP27 are executed to send the pet mail.

That is, E-mail data composed of the main mail text 202 with the mail header 201 appended thereto and the agent parameters 203 determining the behavior of the post pet 103, appended as annexed papers, is formulated, and sent as a pet mail to a counterpart of communication.

In this case, the pet mail can be sent only when the pet-at-home flag is '1', that is, if the user's pet is at home.

First, if connection is made at step SP22 to the mail server 11D) of the service provider 11, for requesting mail transfer in accordance with the transfer protocol of Simple Mail Transfer Protocol (SMTP), and connection is judged at the next step SP23 to have been made, processing transfers to step SP24. At this step SP24, the user's own pet (teddy-bear 103A shown in FIG. 3) deems the E-mail of the keeper as being a letter and animation display is made such that the pet opens a door 107 goes out and recovers the letter posted in a mail post 106 for delivery to the receiver. At the next step SP25, the agent parameters of the user's pet, stored in the RAM 21C, is encoded by the encoding method prescribed in Base 64 of MIME. At the next step SP26, the encoded agent parameters are annexed to the main text 202 as annexed papers. This pet mail is sent to the mail server 11D.

At step SP27, the pet-at-home flag, stored in the RAM 21c, is set to '0', that is, indicating absence, before processing transfers to step SP28 to break the connection to the mail server 11D to complete a series of the sending subroutine processing. Then, processing reverts to step SP1 of FIG. 10.

On the other hand, if the user operates the mouse 21D to move the pointing cursor 101 on the icon 115b of handing over to the postman on the GUI picture 110 of 'Write a Mail' to click the mouse button, it is judged that the icon 115B of handing over to the postman has been actuated. Thus, processing transfers from step SP20 through step SP29 to step SP30 so that the processing from step SP30 to SP33 is executed to send the usual E-mail.

That is, E-mail data composed simply of the main mail text 202 having appended thereto the mail header 201 is formulated and sent to the counterpart as the usual E-mail.

First, at step SP30, connection is made to the mail server 11D) of the service provider 11 for requesting mail transfer based on the SMTP transfer protocol. If, at the next step SP31, the connection is judged to have been completed, processing transfers to step SP32 to display an animation in which the postman 104 deems the E-mail of the keeper as being a letter to recover the letter posted in the mail post 106 to go out for mail delivery, as shown in FIGS. 15 to 19. At the next step SP33, the usual E-mail is sent to the mail server 11D), after which processing transfers to step SP28 to cancel the connection to the mail server 11D to complete a series of the sending subroutine operations to return to the step SP1 of FIG. 10.

If none of the icon 115A of handing over to the pet nor the icon 115B of handing over to the postman has been operated at steps SP20 and SP29, with the closure box on the upper right side of the GUI picture 110 of 'Write a Mail' being clicked, the mail writing window is judged at step SP34 to be closed, such that processing reverts to step SP1 of FIG. 10 without executing the above-mentioned sending subroutine.

Next, the steps SP40 to SP59 of the reception subroutine of FIG. 12 is explained.

First, at step SP40, connection is made to the mail server 11D of the service provider 11, based on the communication protocol of the Post Office Protocol Version 3 (POP3) which is the upper order protocol of TCP/IP. If the connection has been judged at the next step SP41 to have been completed, processing transfers to step SP42 to make inquiry whether or not there is a mail addressed to the user in a mail drop of the mail server 11D. This personal mail directory is an area for arriving mails for personal use, usually termed a mail drop, and has the function similar to the private box of a post office.

If it is judged at step SP42 that there is an arriving mail, processing transfers to step SP43. If it is judged that there is no arriving mail, processing transfers to step SP50 to cancel connection to the mail server 11D to terminate a series of the reception subroutine operations before processing reverts to step SP1 of FIG. 10.

If it has been judged at step SP42 that there is an arriving mail in the mail drop, the E-mail addressed to the user is received at step SP43 from the mail server 11D. At the next step SP44, it is judged, based on data of the mail header 201 of the E-mail addressed to the user, whether or not the E-mail is the pet mail. If the received E-mail is judged at step SP44 to be the pet mail, processing transfers to step SP45 to judge whether or not the mail received is the return mail to the pet mail dispatched by the user.

If the pet mail sent by the user is automatically reception-processed by the receiver, the mail text 202 is deleted and part of the sent pet mail composed of the mail header 201 and the agent parameters annexed thereto as the annexed papers is returned as the return mail.

If the received pet mail is judged at step SP45 to be the return mail to the pet mail dispatched by the user, processing transfers to step SP46 to set the pet-at-home flag stored in the RAM 21c to '1', that is, to 'at home', before processing transfers to step SP47 to decode the annexed papers encoded by the encoding method prescribed by the Base64 of MIME.

At the next step SP48, the agent parameters of the user's pet stored in, the RAM 21c are updated, based on the decoded agent parameters. At the next step SP49, the processing of displaying an animation in which the user's pet opens the door to return home with the behavior corresponding to the updated agent parameters is executed.

Then, processing transfers to step SP50 to cancel the connection to the mail server 11D to complete a series of reception subroutine operations before processing reverts to step SP1 of FIG. 10.

Conversely, if it is judged at step SP45 that the received pet mail is not the return mail to the user's pet mail, processing transfers to step SP51 to execute the updating processing accompanying the addition of new arriving mails to the Table-of-Contents (TOC) file.

The TOC file is a reception list file held on a client's local disc (HDD21d), and is a file composed of an extracted portion of the mail header 201. Specifically, the TOC file is made up of TO, FROM, CC, Subject, priorities, attachment flags indicating the presence or absence of the annexed papers, sort flags indicating whether or not the mail is a pet mail, and addresses in the local disc of the mail main text 202 corresponding to the mail header 201.

When the reception list is first opened, a list of received mails is displayed. This list is formulated from the TOC file. If a mail is designated from the list, the main text 202 of the corresponding address is sliced from the mail file (collective file of the main texts of the mail 202).

For example, if the TOC file reads:

FROM: aaaaaaipd.sony.co.jp, Subject:Patent for POS:Pet, Address (from 1100 to 1120), and the main text of the mail 202 is to be displayed, the text corresponding to addresses 1100 to 1120 of the mail file is sliced and displayed.

Next, at step SP52, the update processing accompanying the addition of new arriving mails of the mail file is executed. After updating the mail file having stored therein the main text 202, processing transfers to step SP53 to decode the annexed papers encoded by the encoding method prescribed by the Base 64 of MIME.

At the next step SP54, the processing of displaying the animation in which the pet of the counterpart of communication (teddy-bear 103A in FIGS. 25 to 28) opens the door 107 to make a call and stays for a pre-set time to then open the door to return home. If, during the time the counterpart pet stays indoors, the user operates the mouse 21D to superpose the pointing cursor 101 over the counterpart pet to move the mouse 21D left and right or to click the mouse button, the agent parameters of the counterpart pet are updated at step SP55, based on the actuation by the user. Next, at step SP56, the agent parameters of the counterpart pet are encoded by the encoding method prescribed by Base 64 of MIME. At the next step SP57, the encoded agent parameters are annexed as annexed papers to the mail header 201. The pet mail, this formulated, is automatically returned to the mail server 11D.

Then, processing transfers to step SP50 to cancel the connection to the mail server 11D to compete a series of the reception subroutine operations before processing reverts to step SP1 of FIG. 10.

If it is judged at step SP44, based on the data of the mail header 201 of the received E-mail addressed to the user, that the received E-mail is not the pet mail, but is a usual E-mail, processing transfers to step SP58 to update the TOC file. Then, processing transfers to step SP50 to cancel the connection to the mail server 11D to complete a series of the reception subroutine operations before processing reverts to step SP1 of FIG. 10.

Figure 13:
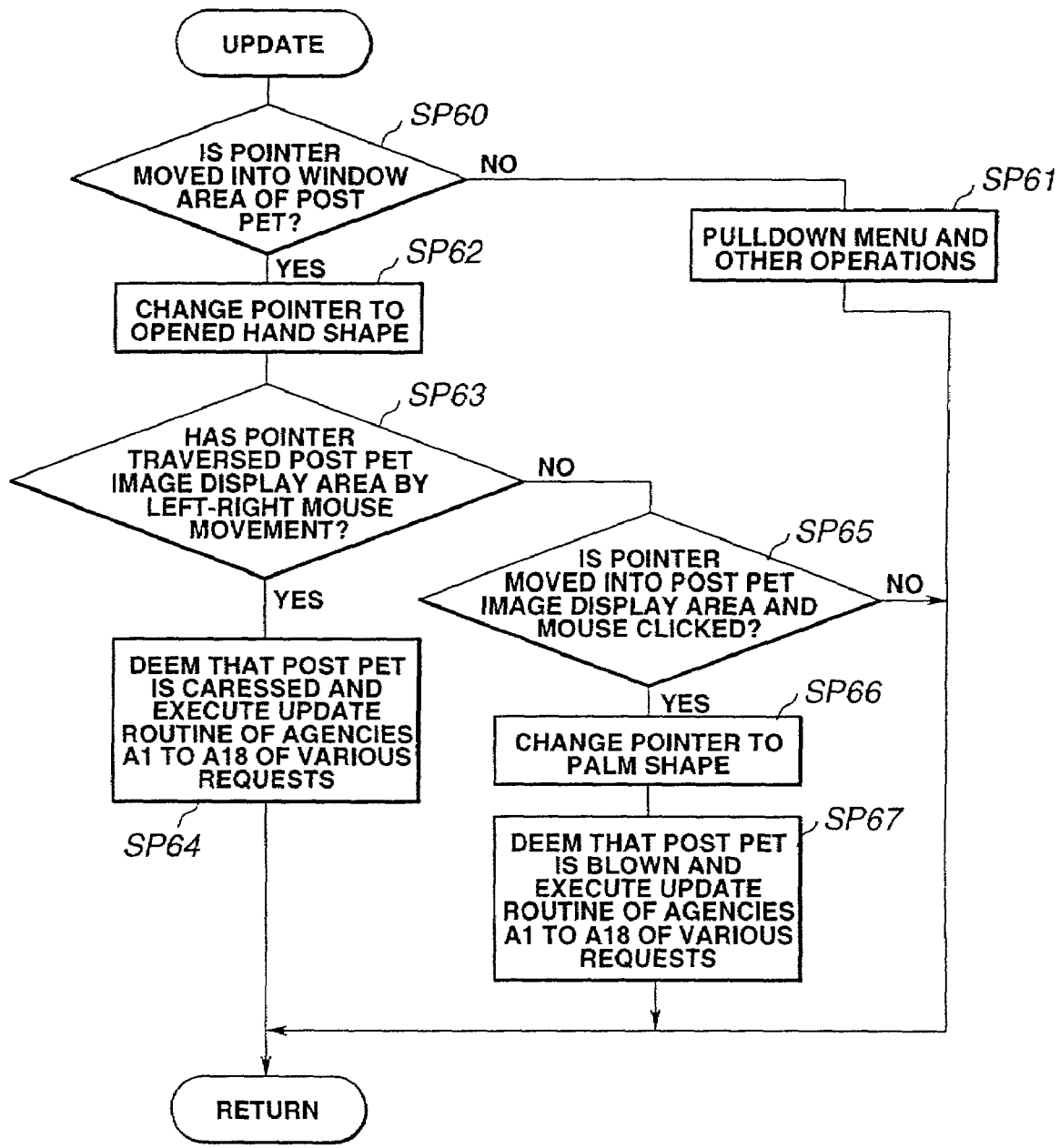
FIG. 13 is a flowchart showing the contents of update processing for the agent parameter by the mailer.

Next, the steps SP60 to SP67 of the agent parameter update processing shown in FIG. 13 are hereinafter explained.

Figure 41:
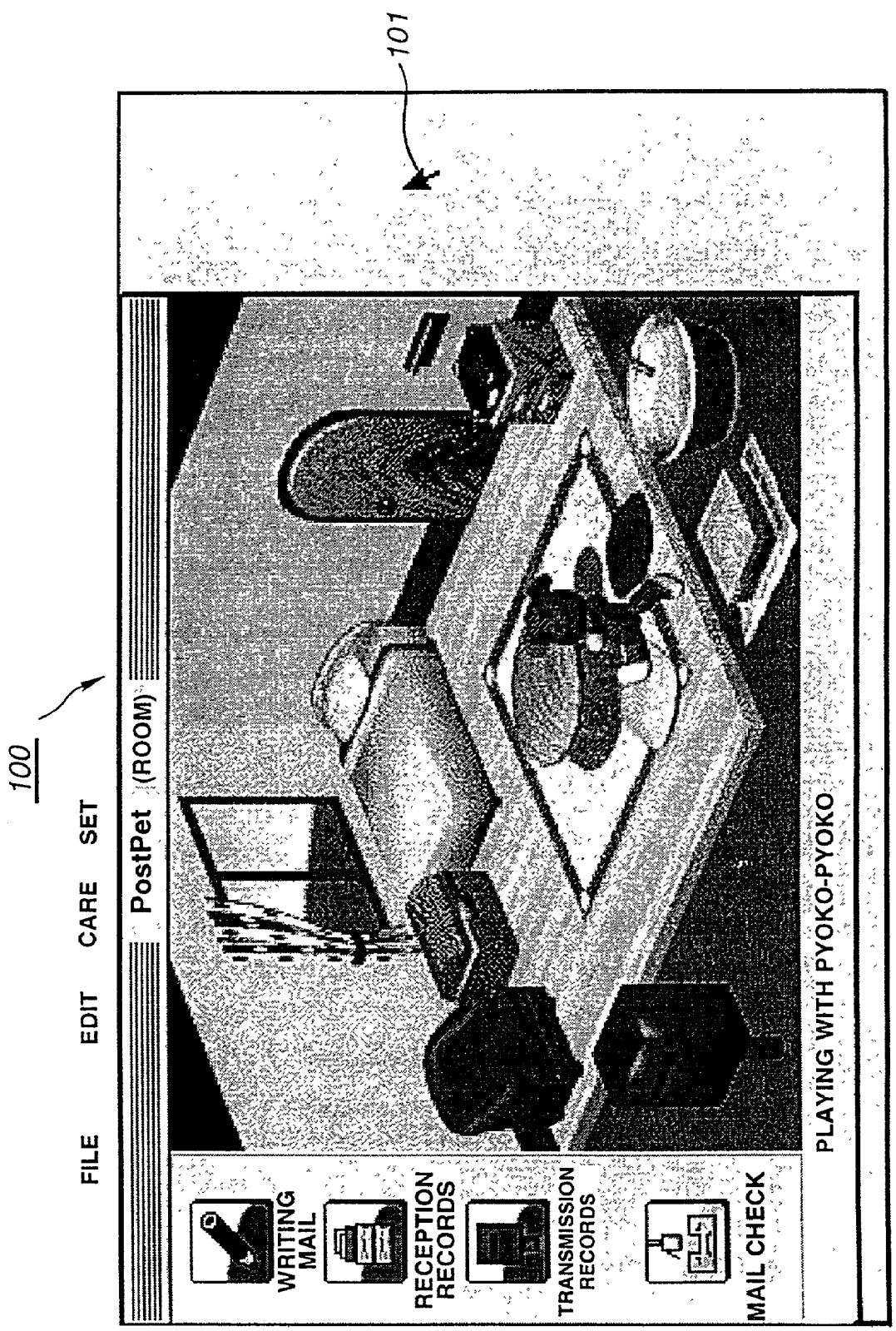
FIG. 41 shows the display state of a pointing cursor positioned outside of a room on the GUT picture of the 'PostPet (Room)'.
Figure 42:
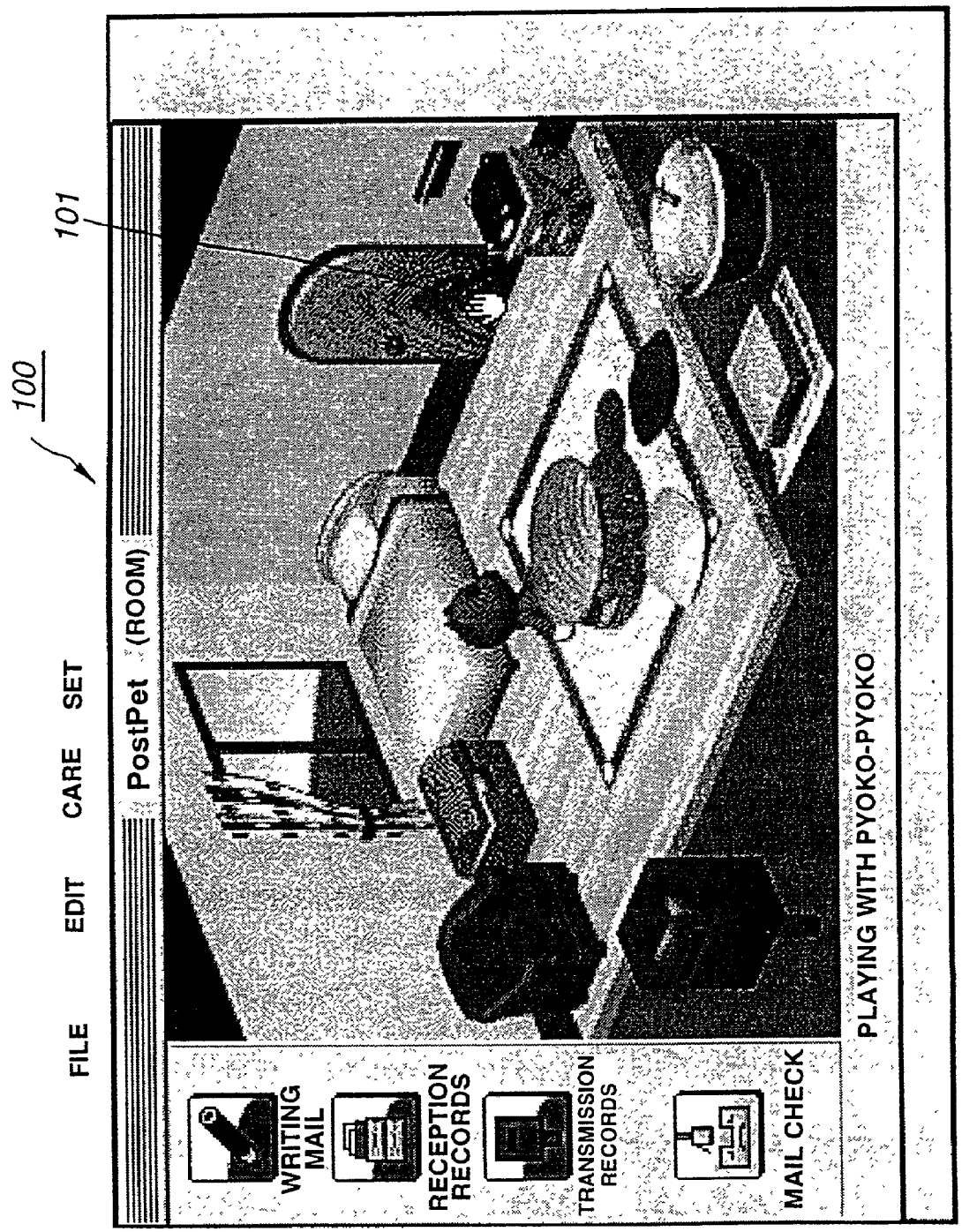
FIG. 42 shows the display state of a pointing cursor positioned within a room on the GUI picture of the 'PostPet (Room)'.

Referring to the flowchart of FIG. 13, the CPU 21a monitors at step SP60 whether or not the pointing cursor 101 displayed on the screen of the display device 21B has moved into a window area of 'PostPet (Room)'. If the pointing cursor 101 is outside the window area of 'PostPet (Room)', pulldown menu processing or the like processing is executed at step SP61. If the pointing cursor 101 goes into the window area of 'PostPet (Room)', that is, into the room, the pointing cursor 101 is changed at step SP62 to an open hand shape. Thus, if the pointing cursor 101 is positioned outside the room on the GUI picture 100 of the 'PostPet (Room)', as shown in FIG. 41, the pointing cursor 101 is represented as an arrow, whereas, if it goes into the room, as shown in FIG. 42, it is displayed in an open hand shape.

Figure 43:
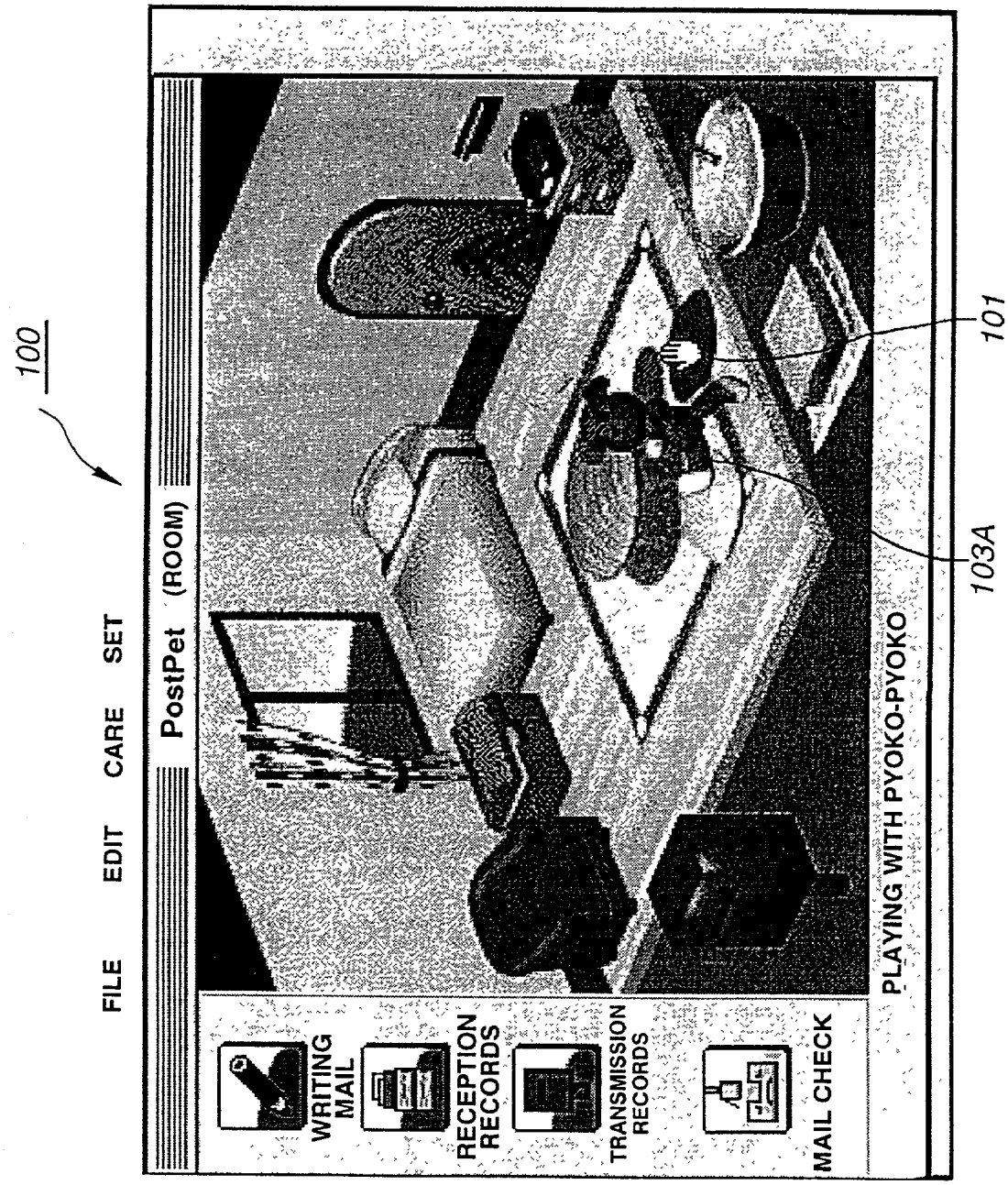
FIG. 43 shows the state of caressing the post pet on the GUI picture of the 'PostPet (Room)'.
Figure 44:
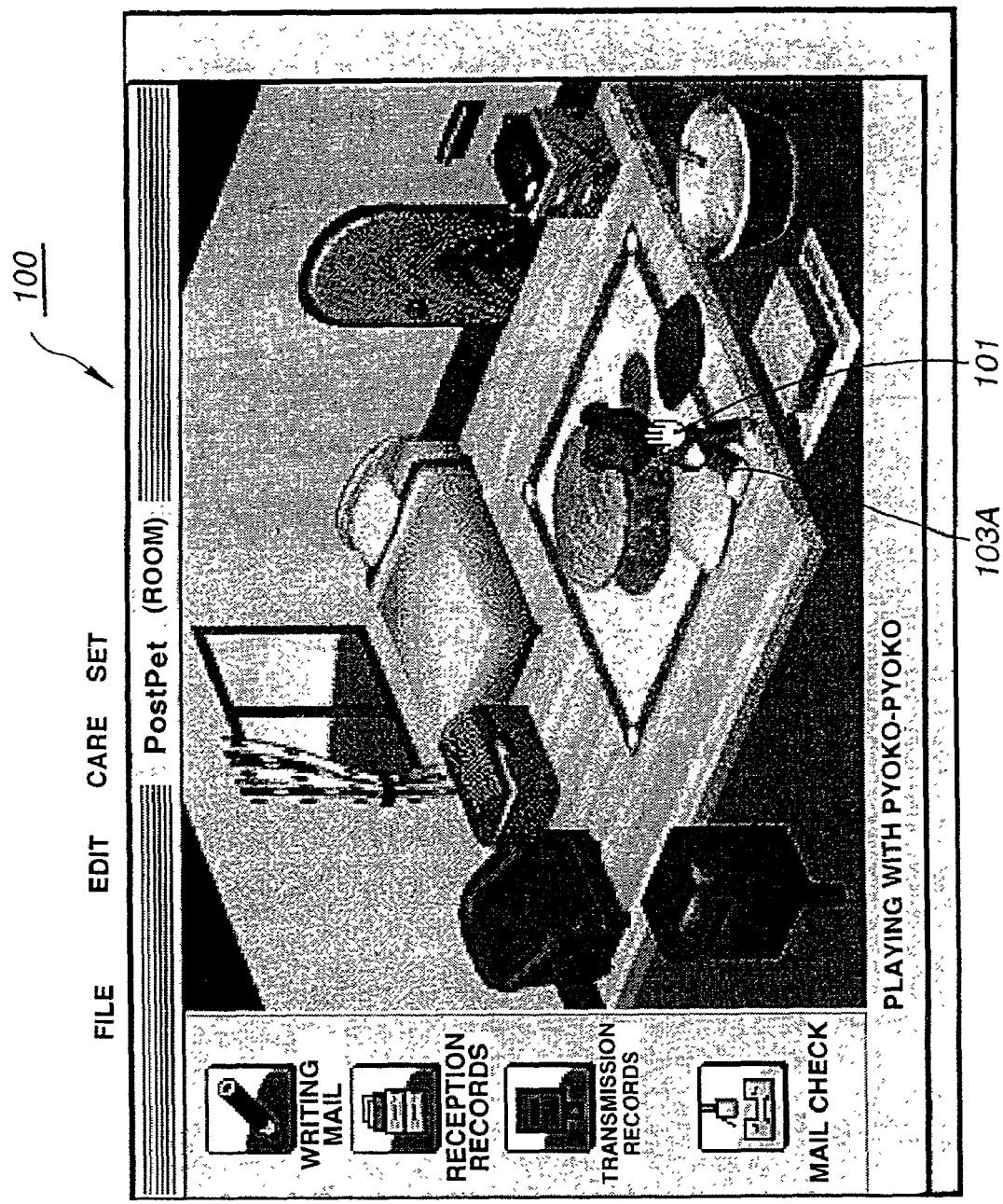
FIG. 44 similarly shows the state of caressing the post pet on the GUI picture of the 'PostPet (Room)'.
Figure 45:
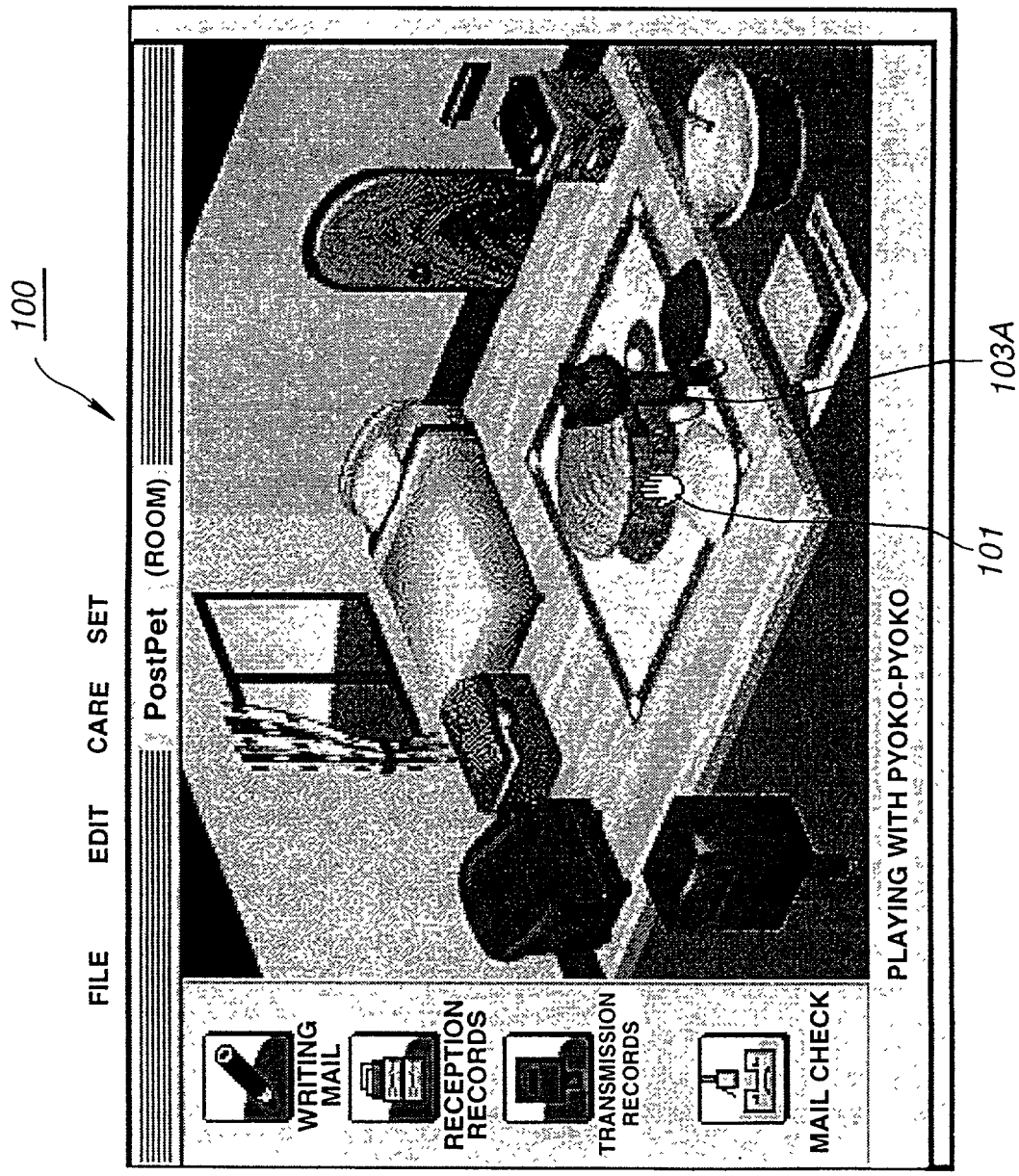
FIG. 45 similarly shows the state of caressing the post pet on the GUI picture of the 'PostPet (Room)'.

The CPU 21a judges at step SP63 whether or not the pointing cursor 101 has traversed the display area of the post pet image by the reciprocating movement of the mouse 21D in the left and right direction. If the result of judgment is YES, that is, if the pointing cursor 101 has traversed the display area of the post pet image, the CPU 21a deems that the post pet has been caressed and executes at step SP64 an update processing routine for the agencies A1 to A18 of various desires as later explained. Thus, on the GUI picture 100 of 'PostPet (Room)', the pointing cursor 101, represented by the open hand shape, is reciprocated in the left-and-right direction on the post pet 103 for caressing the post pet 103, as shown in FIGS. 43 to 45.

Figure 46:
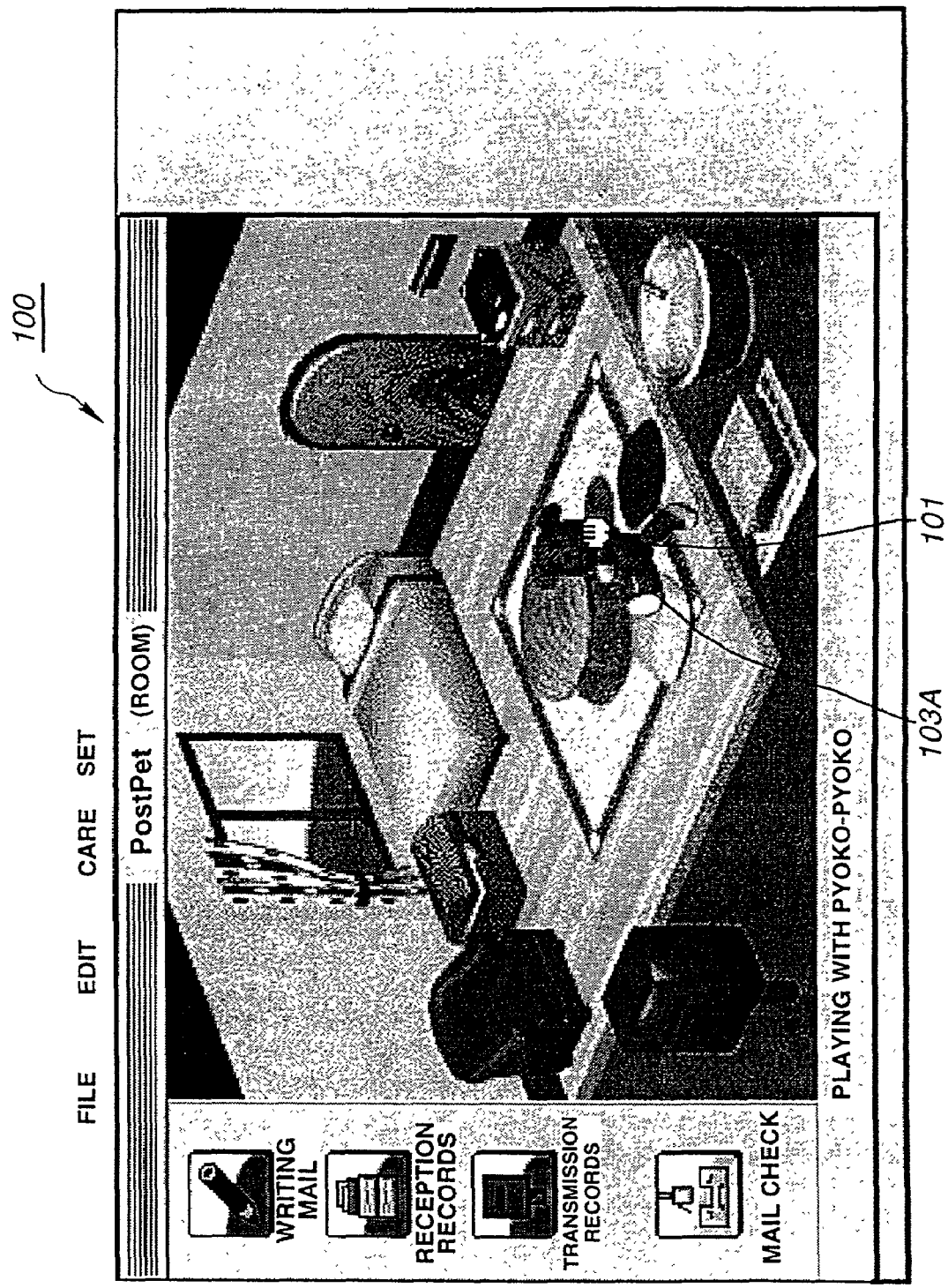
FIG. 46 similarly shows the state of hitting the post pet on the GUI picture of the 'PostPet (Room)'.

The CPU 21a judges at step SP65 whether the pointing cursor 101 has been moved into the display area of the post pet image and the mouse button of the mouse 21D has been clicked. If the result of judgment is affirmative, that is, if the mouse 21D has been clicked when the pointing cursor 101 is in the post pet image display area, the CPU 21a alters at step SP66 the pointing cursor 101 to the shape of a clenched fist to execute updating processing routines of the agencies A1 to A18 of various desires at step SP67 on the assumption that the post pet has been struck. Thus, on the GUI picture 100 of the 'PostPet (Room)', the post pet 103 can be struck on the pointing cursor 101 displayed in the shape of a clenched fist, as shown in FIG. 46.

When executing the mail sending by the postman 104, the CPU 21a sequentially alters bit map data of the postman 104 on the video RAM 21j to cause the display controller 21g to display on the display device 21B an animation in which the postman 104 moves on the GUI picture 100 of the 'PostPet (Room)' to recover the mail posted into the mail post 106 to deliver the recovered mail.

Figure 14:
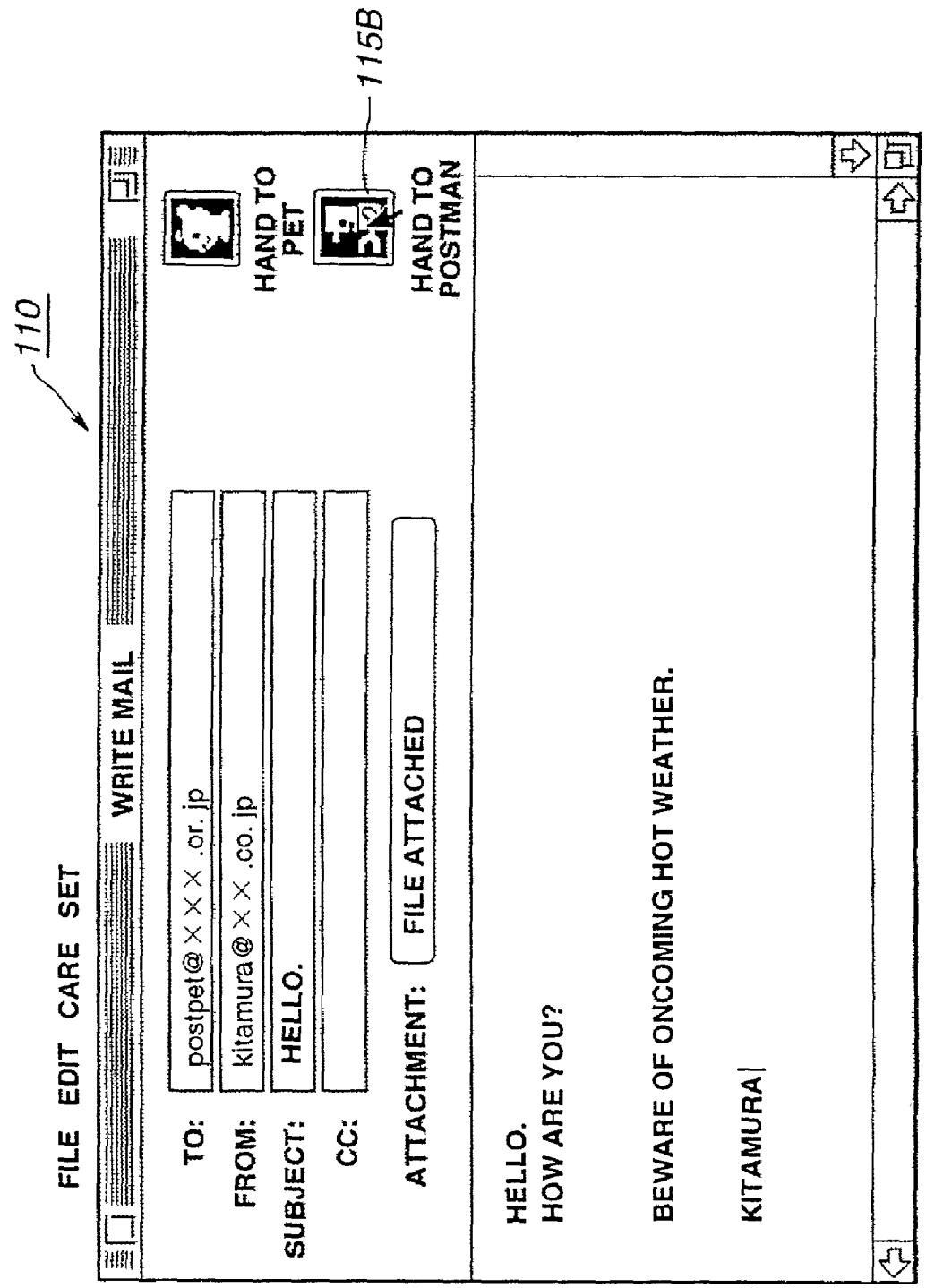
FIG. 14 shows the state of instructing mail sending by a postman in the GUI picture of 'Write a Mail' represented by the mailer.
Figure 15:
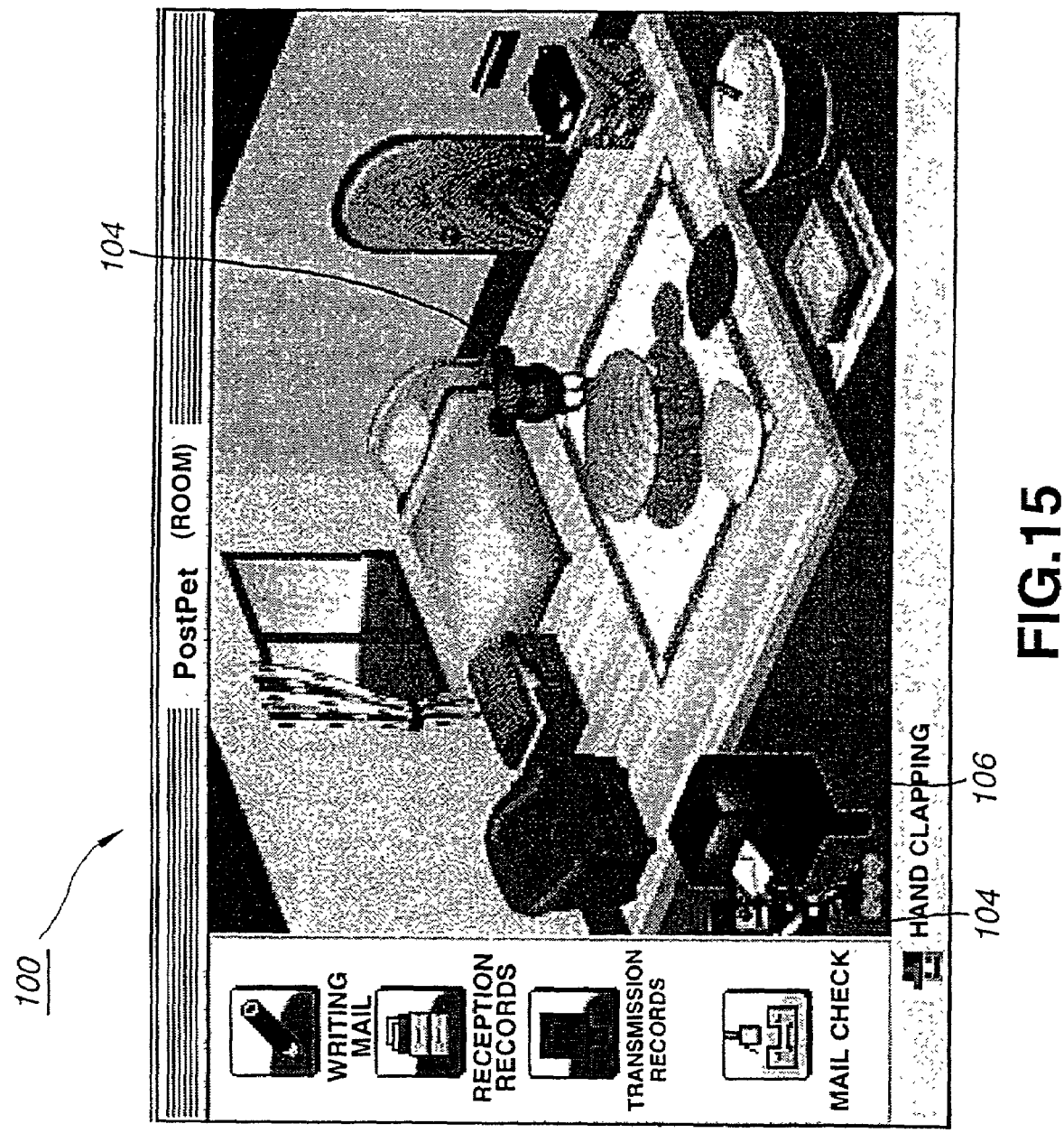
FIG. 15 shows the state of the GUI picture of a 'PostPet (Room)' in the case of a mail send is commanded by a postman.
Figure 16:
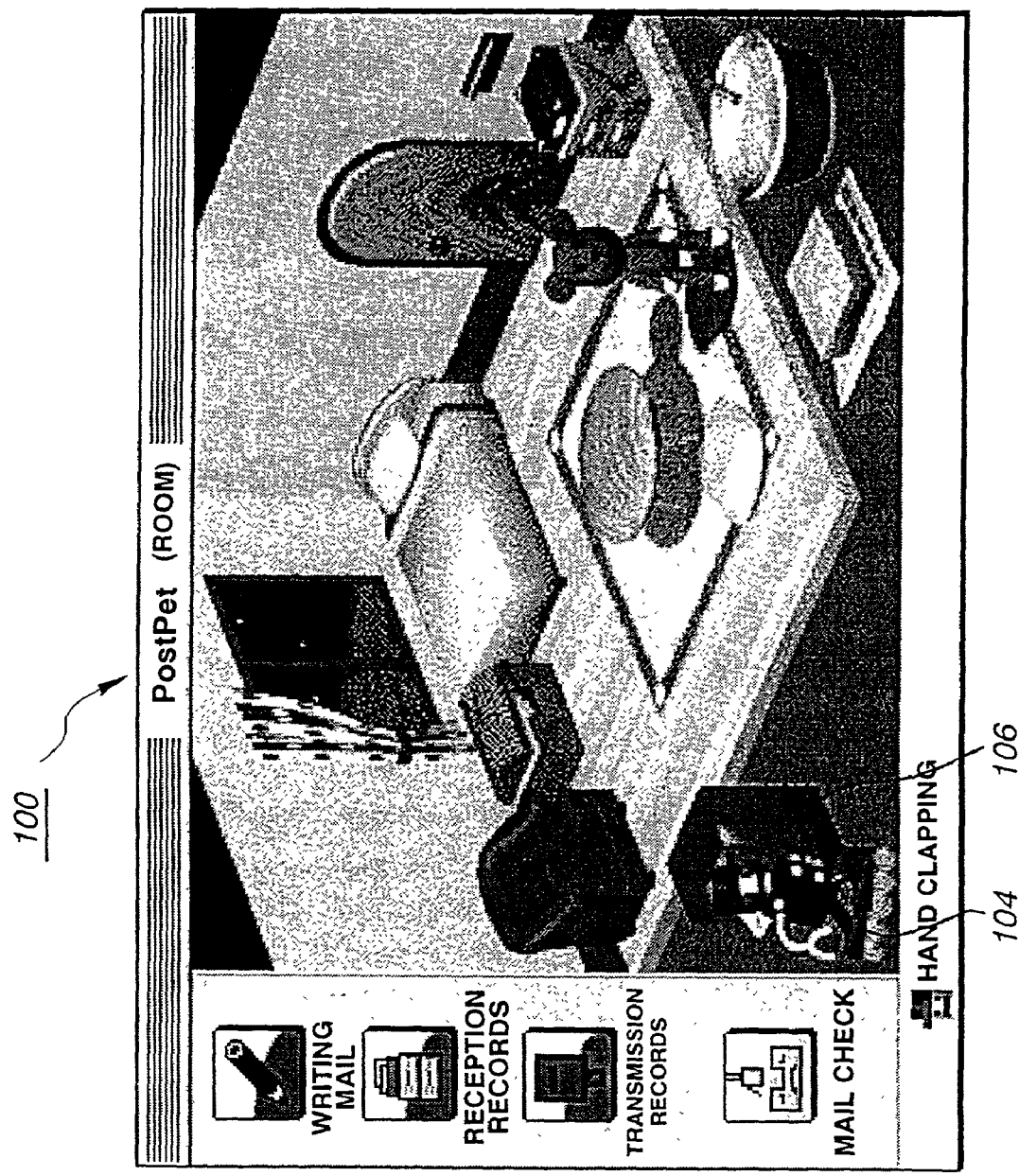
FIG. 16 similarly shows the state of the GUI picture of a 'PostPet (Room)' in the case of a mail send is commanded by the postman.
Figure 17:
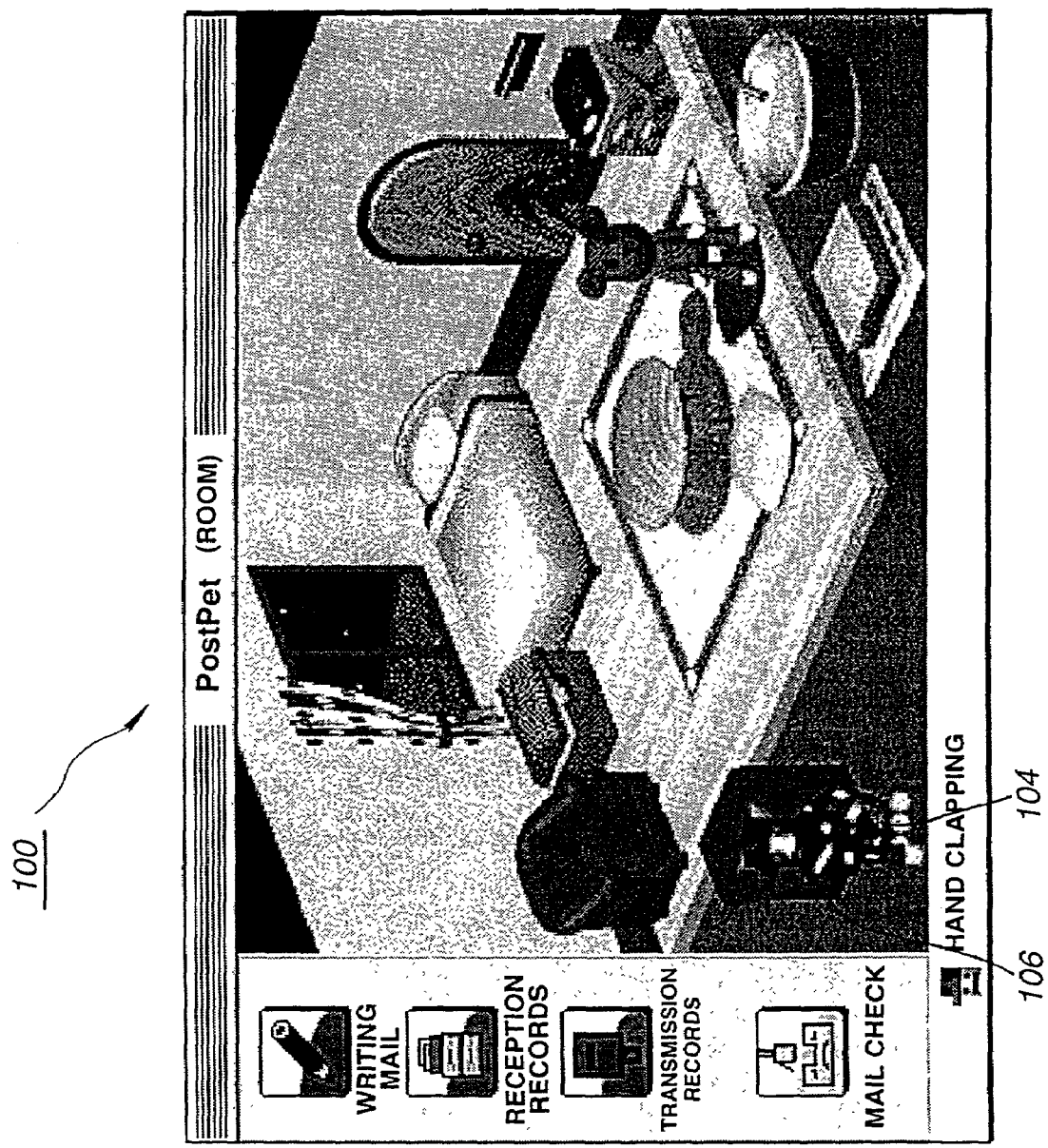
FIG. 17 similarly shows the state of the GUI picture of a 'PostPet (Room)' in the case of a mail send is commanded by the postman.
Figure 18:
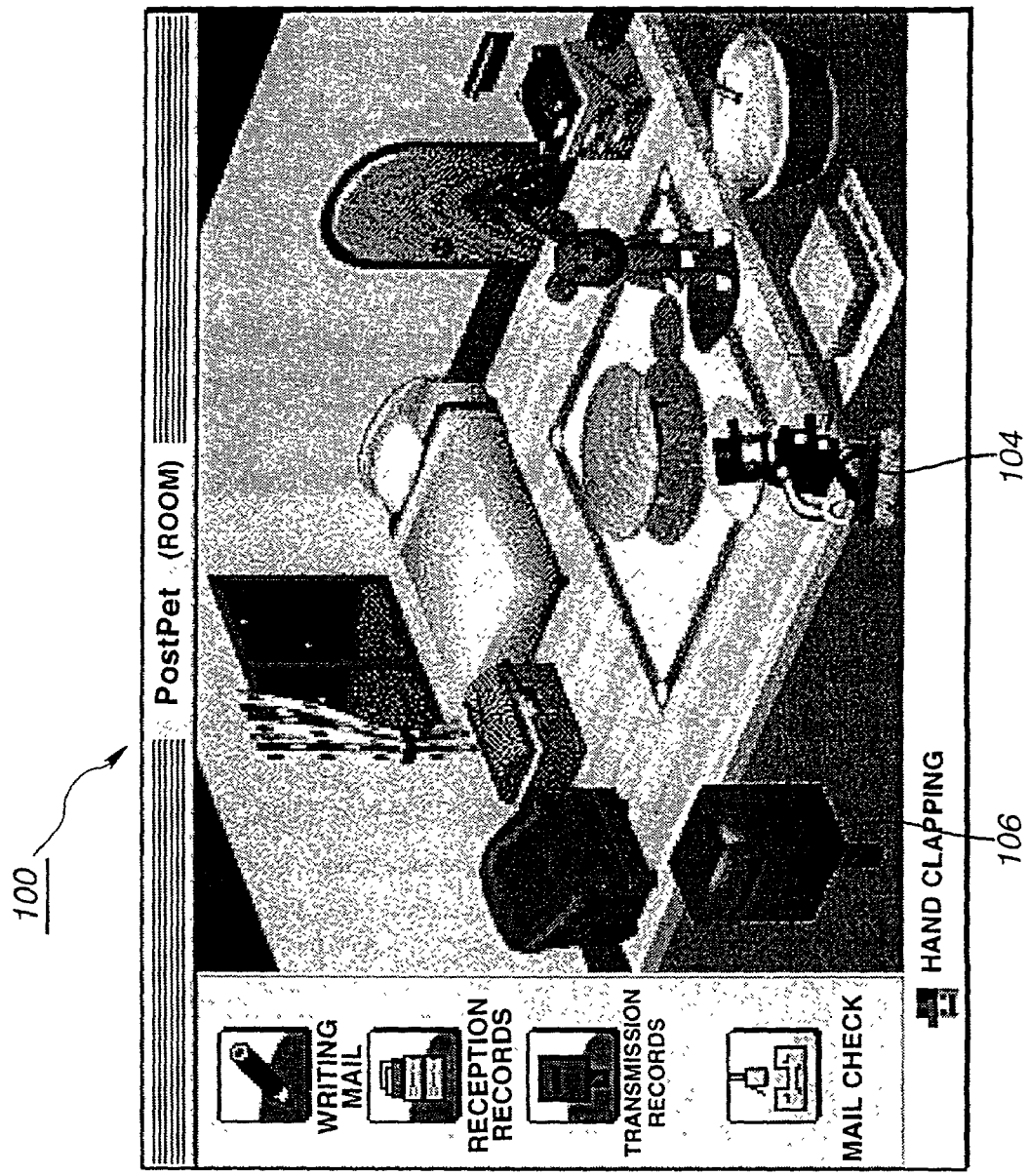
FIG. 18 similarly shows the state of the GUI picture of a 'PostPet (Room)' in the case of a mail send is commanded by the postman.
Figure 19:
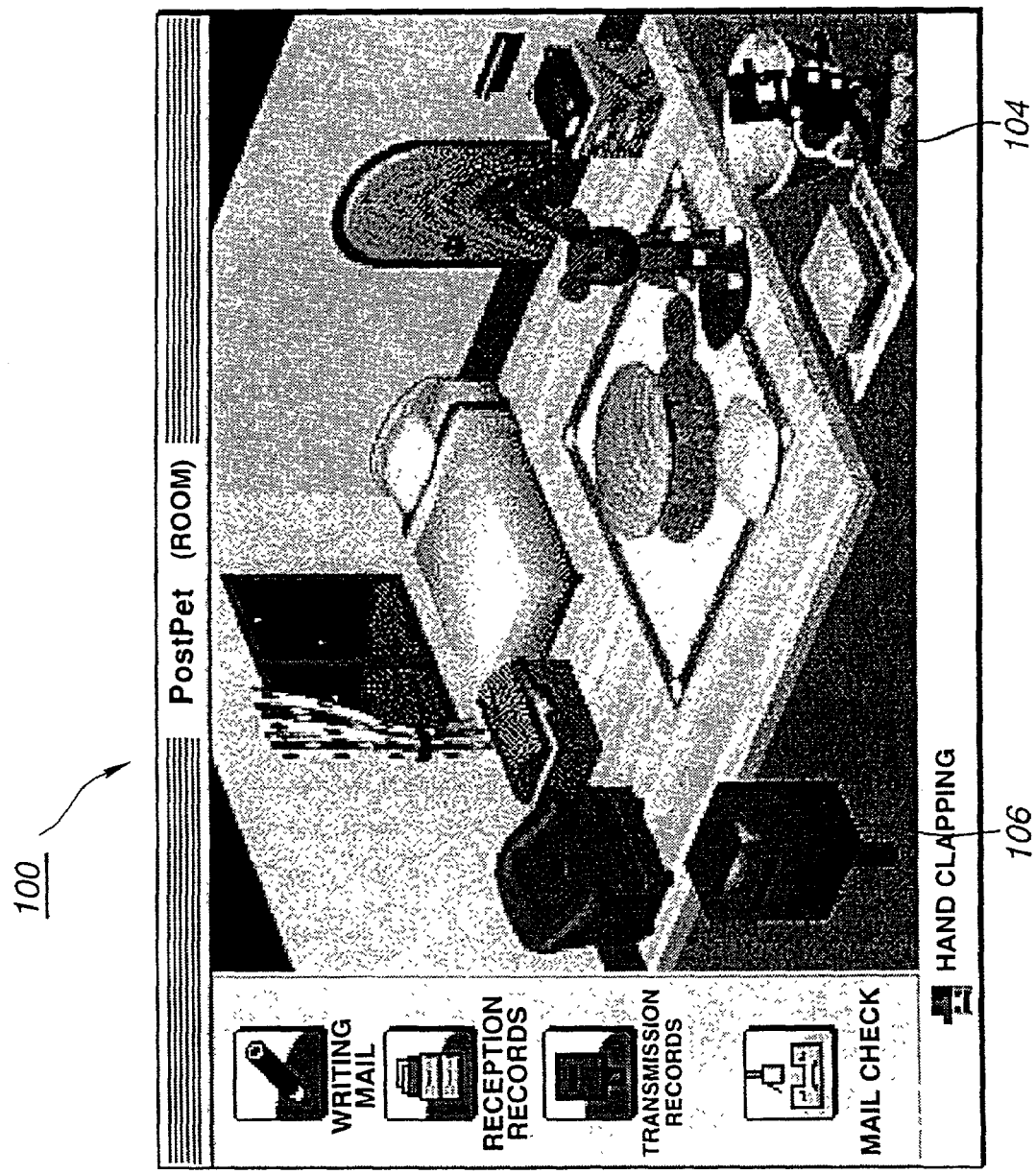
FIG. 19 similarly shows the state of the GUI picture of a 'PostPet (Room)' in the case of a mail send is commanded by the postman.

Specifically, if the icon 115B of handing over to the postman 104 for commanding mail dispatch by the postman on the GUI picture 110 of 'Writing a Mail' is clicked as shown in FIG. 14, animation display is made such that the postman 104 makes debut from the left side on the GUI picture 100 of the 'PostPet (Room)' as shown in FIG. 15 and moves to the site of the mail post 108 as shown in FIG. 16, the postman 104 then recovering the mail posted in the mail post 106 as shown in FIG. 17 and starting for delivering the mail posted in the mail post 106, as shown in FIGS. 18 and 19.

Also, when executing the mail sending by the post pet 103, the CPU 21a sequentially alters bit map data of the post pet 103 on the video RAM 21j to cause the display controller 21g to display on the display device 21B an animation in which the post pet 103 carrying the mail moves on the GUI picture 100 of the 'PostPet (Room)' as shown in FIG. 3 as far as the door 107 on foot to open the door to go out.

Figure 21:
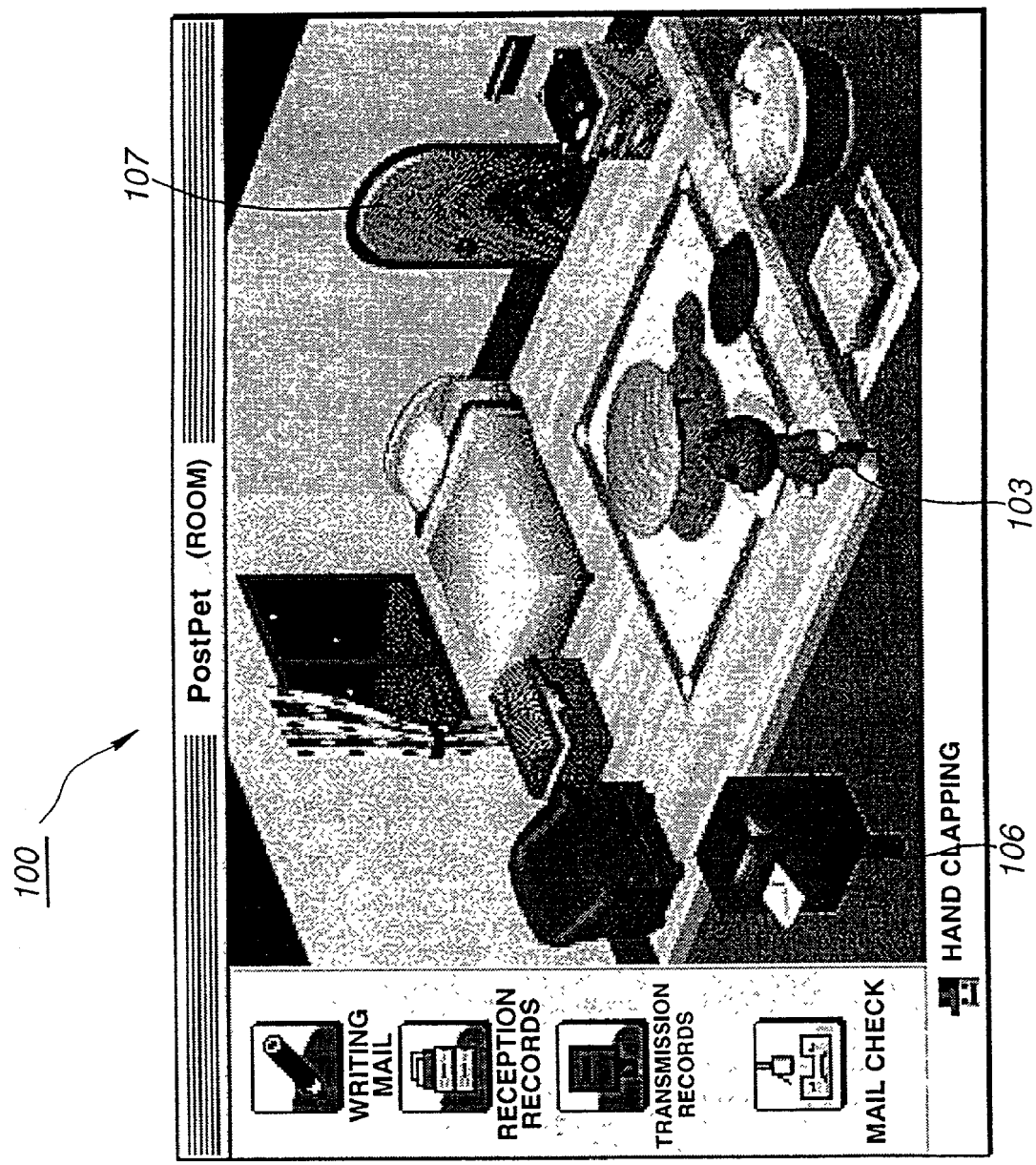
FIG. 21 shows the state of a GUI picture of a 'PostPet (Room)' when a mail send is commanded by a post pet.
Figure 22:
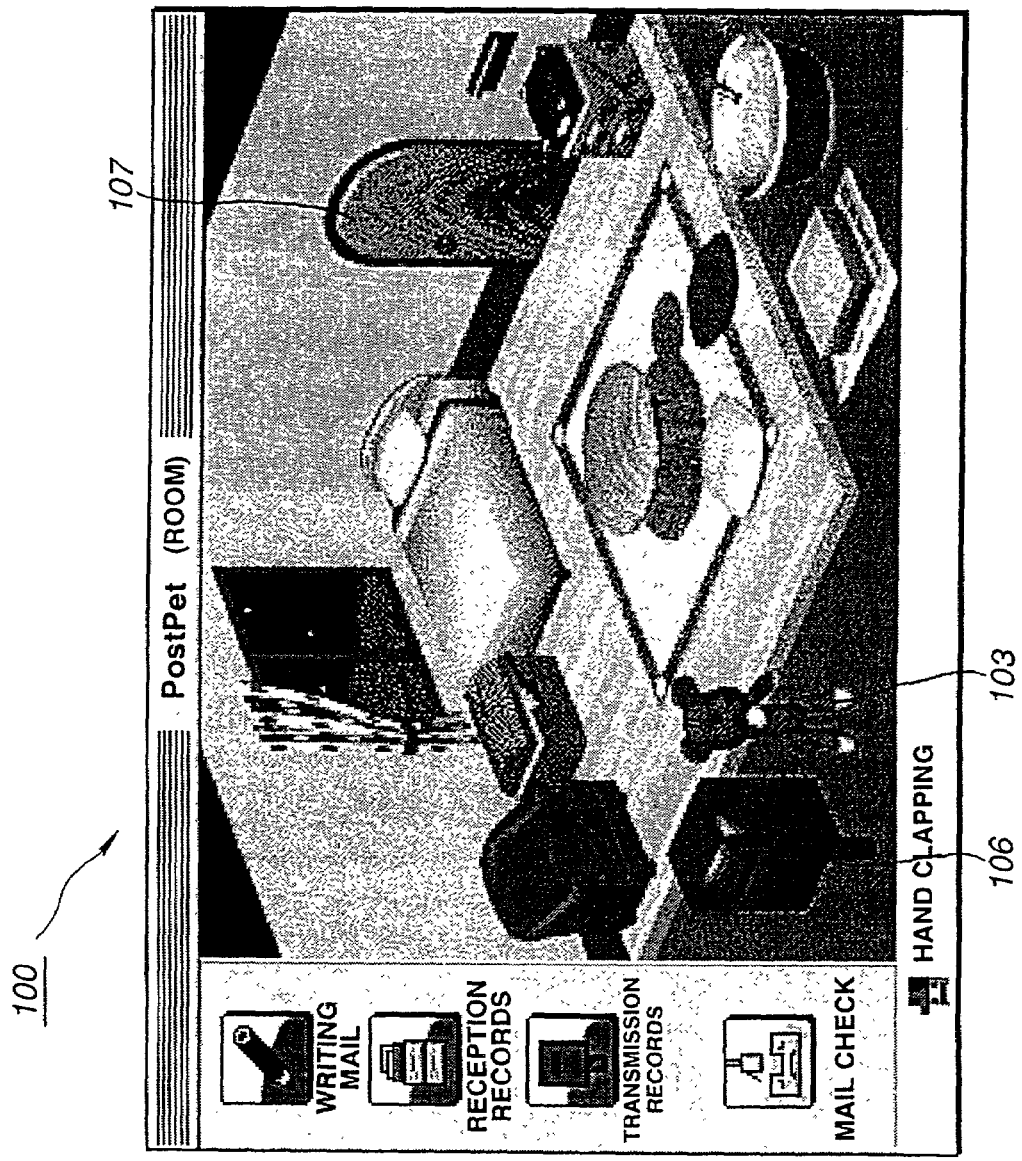
FIG. 22 similarly shows the state of a GUI picture of a 'PostPet (Room)' when a mail send is commanded by the post pet.
Figure 23:
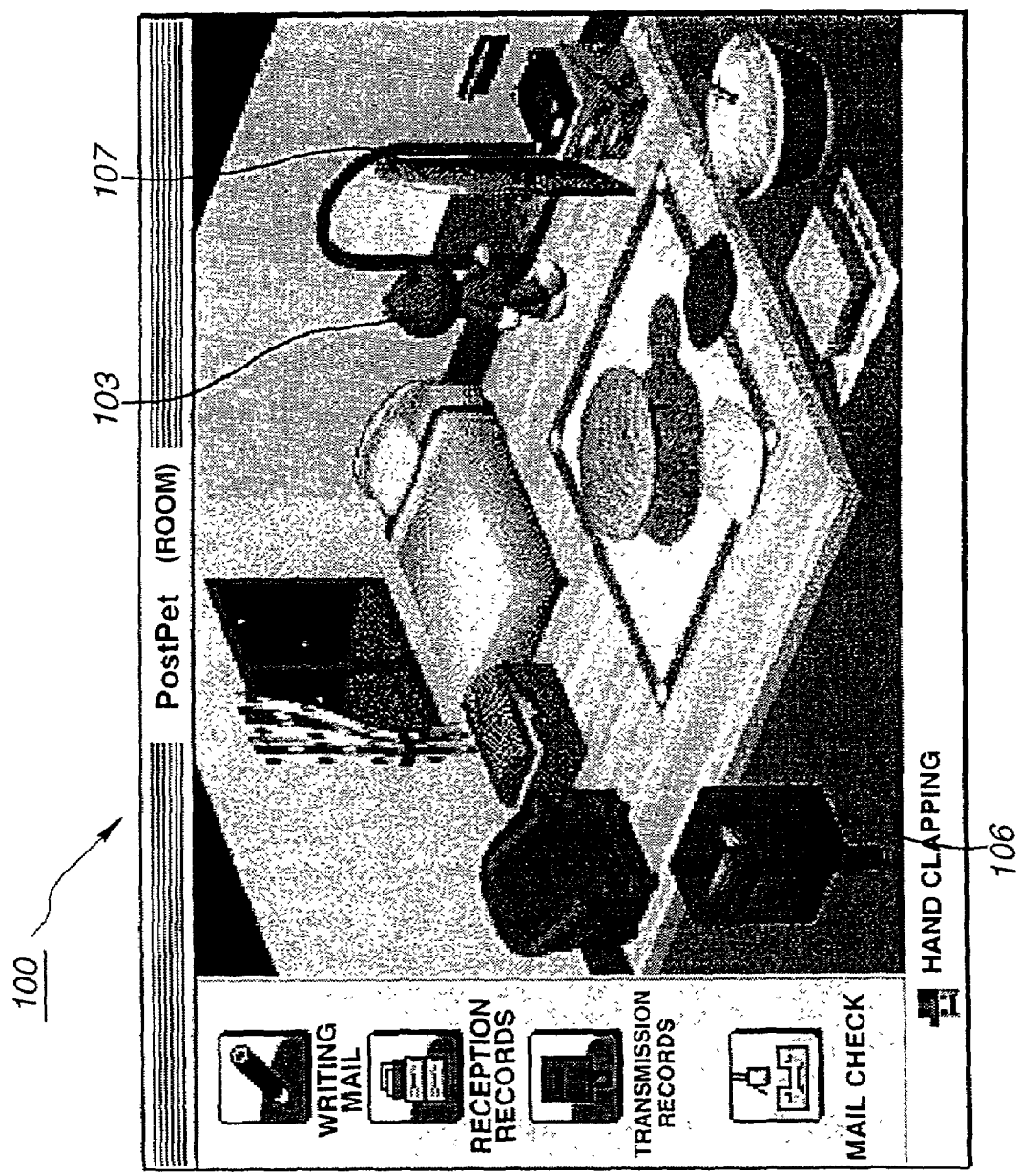
FIG. 23 similarly shows the state of a GUI picture of a 'PostPet (Room)' when a mail send is commanded by the post pet.
Figure 24:
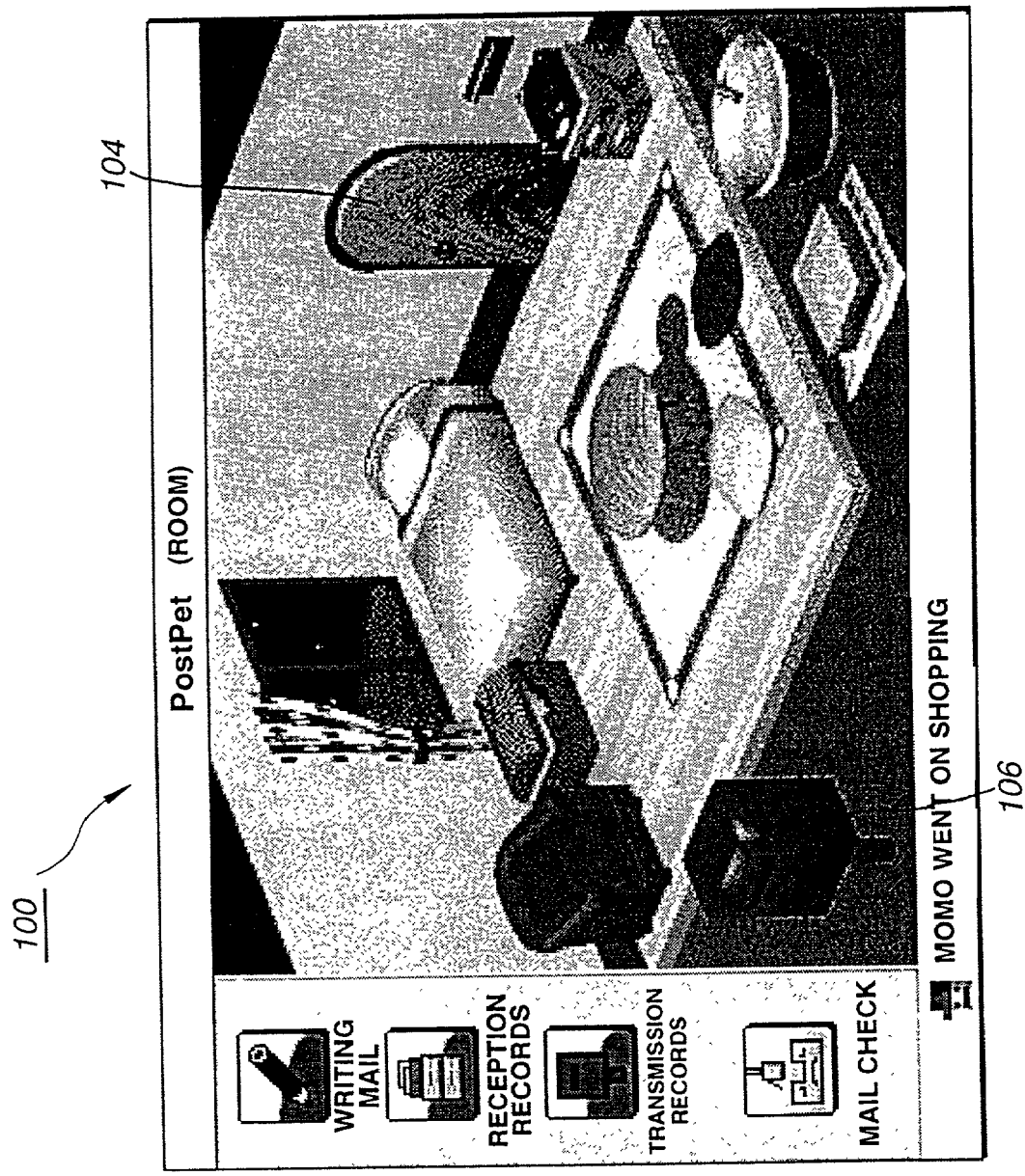
FIG. 24 similarly shows the state of a GUI picture of a 'PostPet (Room)' when a mail send is commanded by the post pet.

Specifically, if the icon 115A of handing over to the pet for commanding mail dispatch by the post pet 103 on the GUI picture of 'Writing a Mail' as shown in FIG. 20, is clicked, animation display is made such that the post pet 103 moves on the GUI picture 100 of the 'PostPet (Room)' as far as the mail post 106 as shown in FIG. 21, the post pet 103 recovers the mail posted in the mail post 106 as shown in FIG. 22 and the post pet 103 carrying the mail then moves as far as the door 107 to open the door for outing as shown in FIGS. 22 and 24. At this time, a message which reads: "Momo (name of the pet) went out for mail dispatching" specifying mail dispatching by the post pet 103 is displayed on the lower side of the GUI picture 100 of the 'PostPet (Room)'.

It should be noted that mail sending by the post pet 103 sends a single E-mail by a single post pet 103, that is, by a single agent, while mail sending cannot be executed if the post pet 103 is absent on the GUI picture 100 of the 'PostPet (Room)', that is, if the post pet 103 is outing.

Conversely, mail sending by the postman 104 sends one or more E-mails by a single postman 104, that is, by a single agent, and can be executed at any time. That is, if the post pet 103 is absent on the GUI picture 100 of the 'PostPet (Room)', that is, if the post pet 103 is out, mail sending can be done by the postman 104.

The above-described behavior of the post pet is determined by the agent parameters attached to the mail, such that, if, on mail reception by the post pet, there are agent parameters, the CPU 21a causes the display controller 21g to display on the screen of the display controller 21g an animation for indicating that the post pet 103D, for example, on the GUI picture 100 of the 'PostPet (Room)' opens the door 107 to go into the room to put the mail on the table 108 to then walk around in the room by way of performing post pet behavior as defined by the above-mentioned agent parameters.

Figure 25:
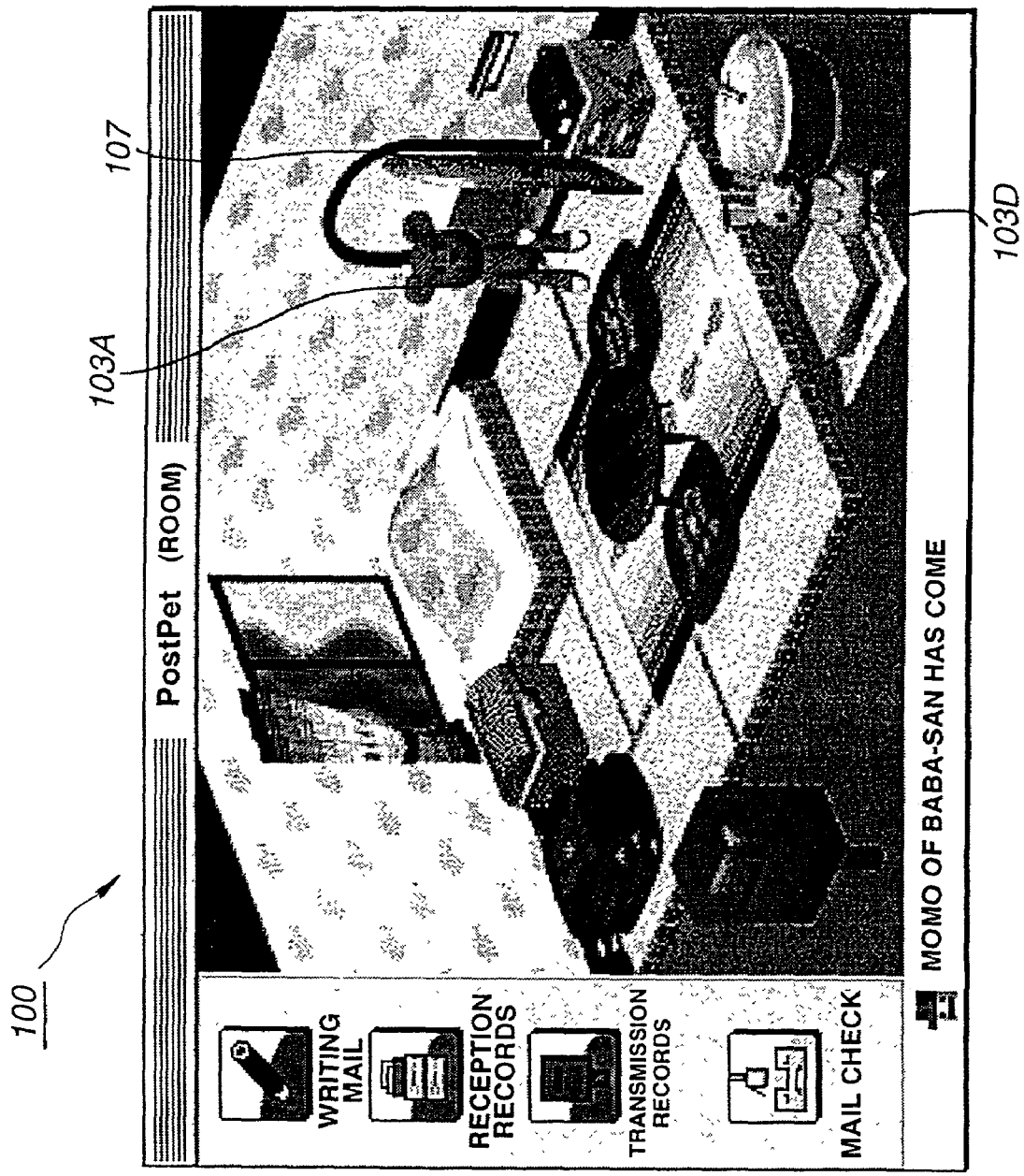
FIG. 25 shows the state of a GUI picture of a 'PostPet (Room)' when an E-mail is received by the post pet.
Figure 26:
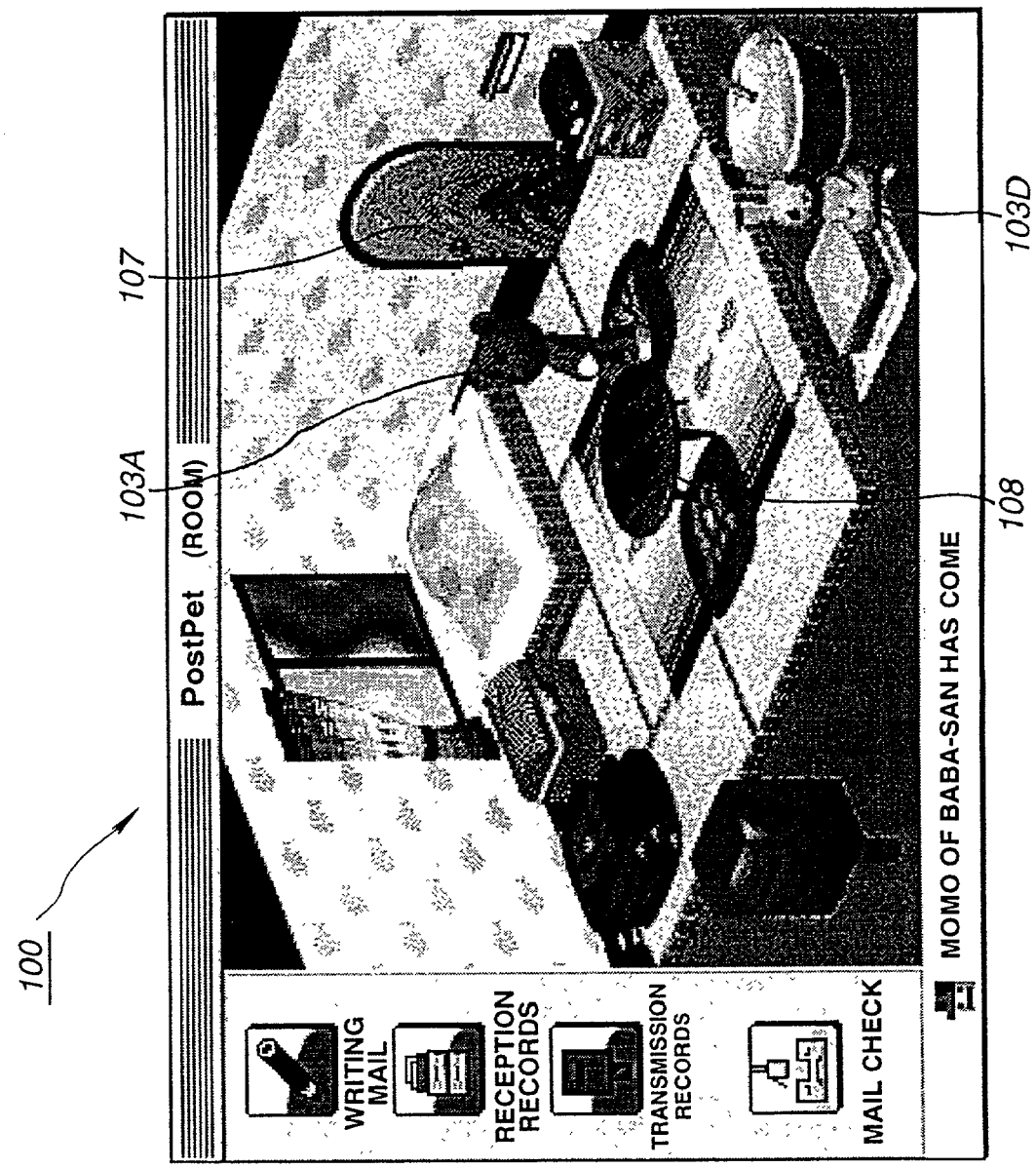
FIG. 26 similarly shows the state of a GUI picture of a 'PostPet (Room)' when an E-mail is received by the post pet.
Figure 27:
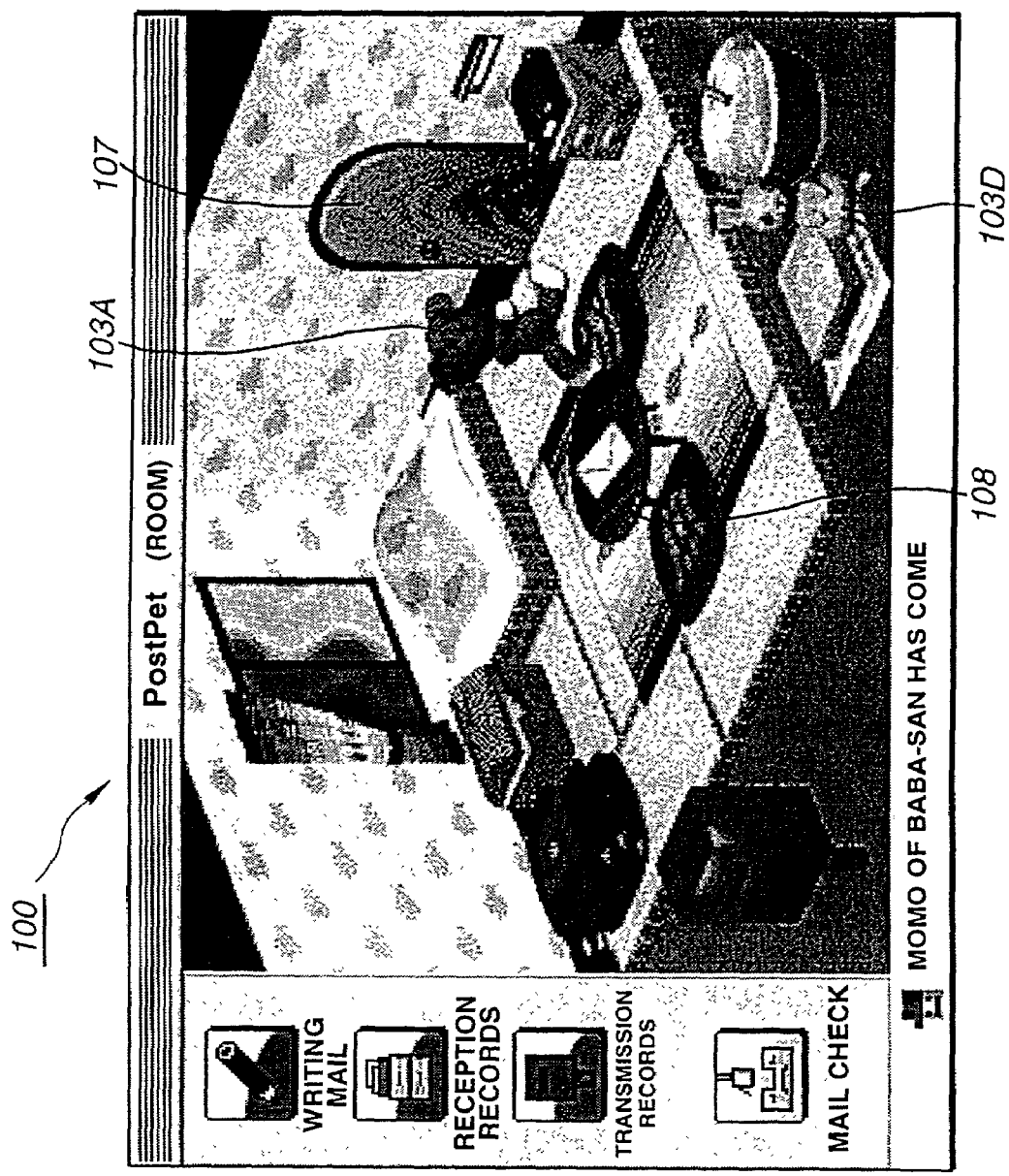
FIG. 27 similarly shows the state of a GUI picture of a 'PostPet (Room)' when an E-mail is received by the post pet.
Figure 28:
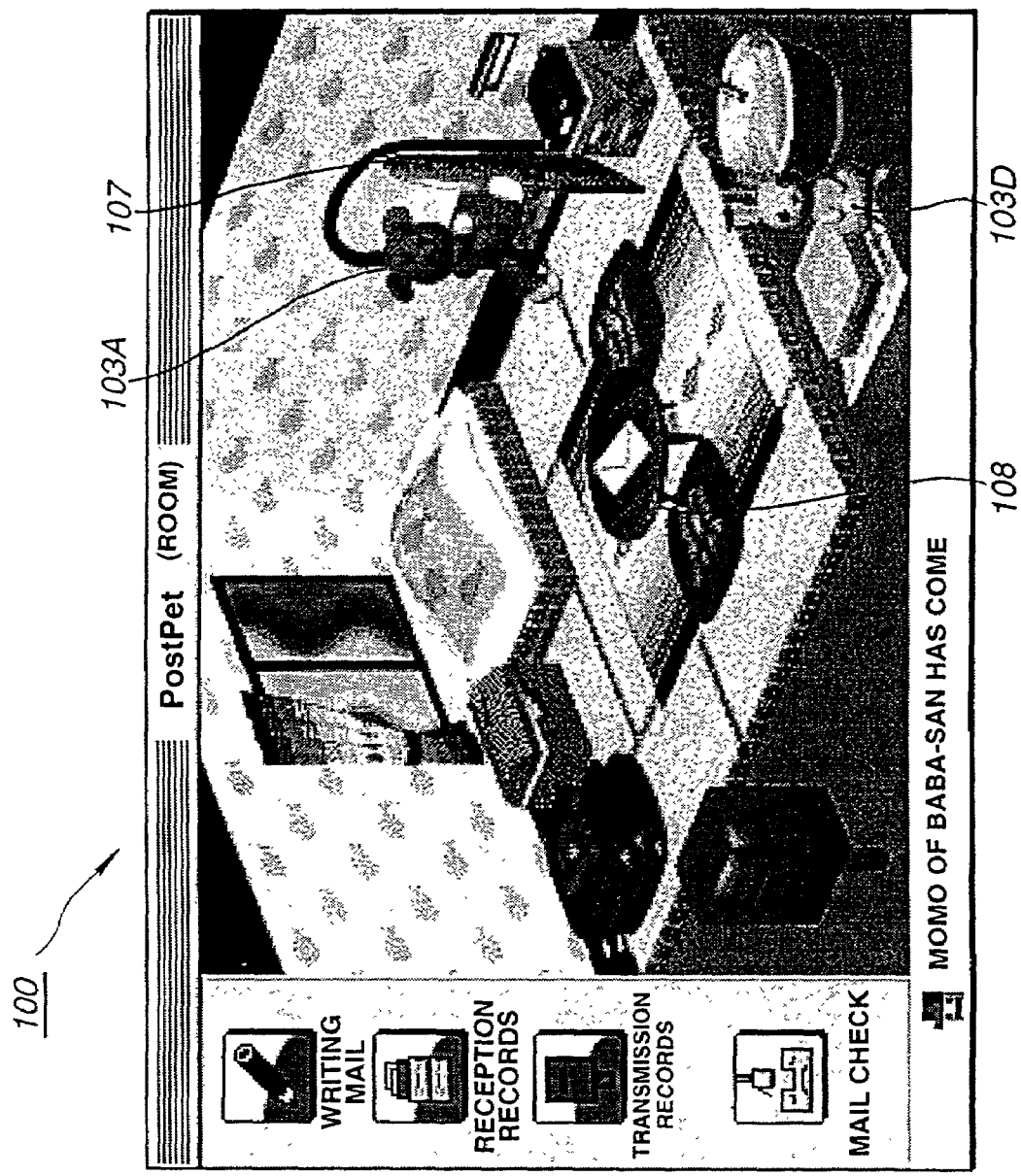
FIG. 28 similarly shows the state of a GUI picture of a 'PostPet (Room)' when an E-mail is received by the post pet.

Specifically, if, upon mail reception by the post pet, there are agent parameters, animation display is made in which the door 107 is first opened on the GUI picture 100 of the 'PostPet (Room)' as shown in FIG. 25, the post pet 103A then enters the room as shown in FIG. 26 to put the mail on the table 108 as shown in FIG. 27, the post pet 103A then walking around in the room to then go out to close the door 107 as show in FIG. 28. At this time, a message reading: "Momo of Mr. Baba has come" is displayed on the lower side of the GUI picture 100 of the 'PostPet (Room)'.

If the user operates the mouse 21D to click the post pet 103B on the GUI picture 100 of the 'PostPet (Room)' by the pointing cursor 101 or acts on the keyboard 21C, the CPU 21a executes changes pre-defined in association with the contents of the operation to process the agent parameters determining the behavior of the post pet 103B. Specifically, the CPU processes' the agent parameters responsive to the operating of caressing or hitting the post pet 103B by the operation of the mouse 21D.

The CPU 21a automatically returns the processed agent parameters to the sending side.

Figure 29:
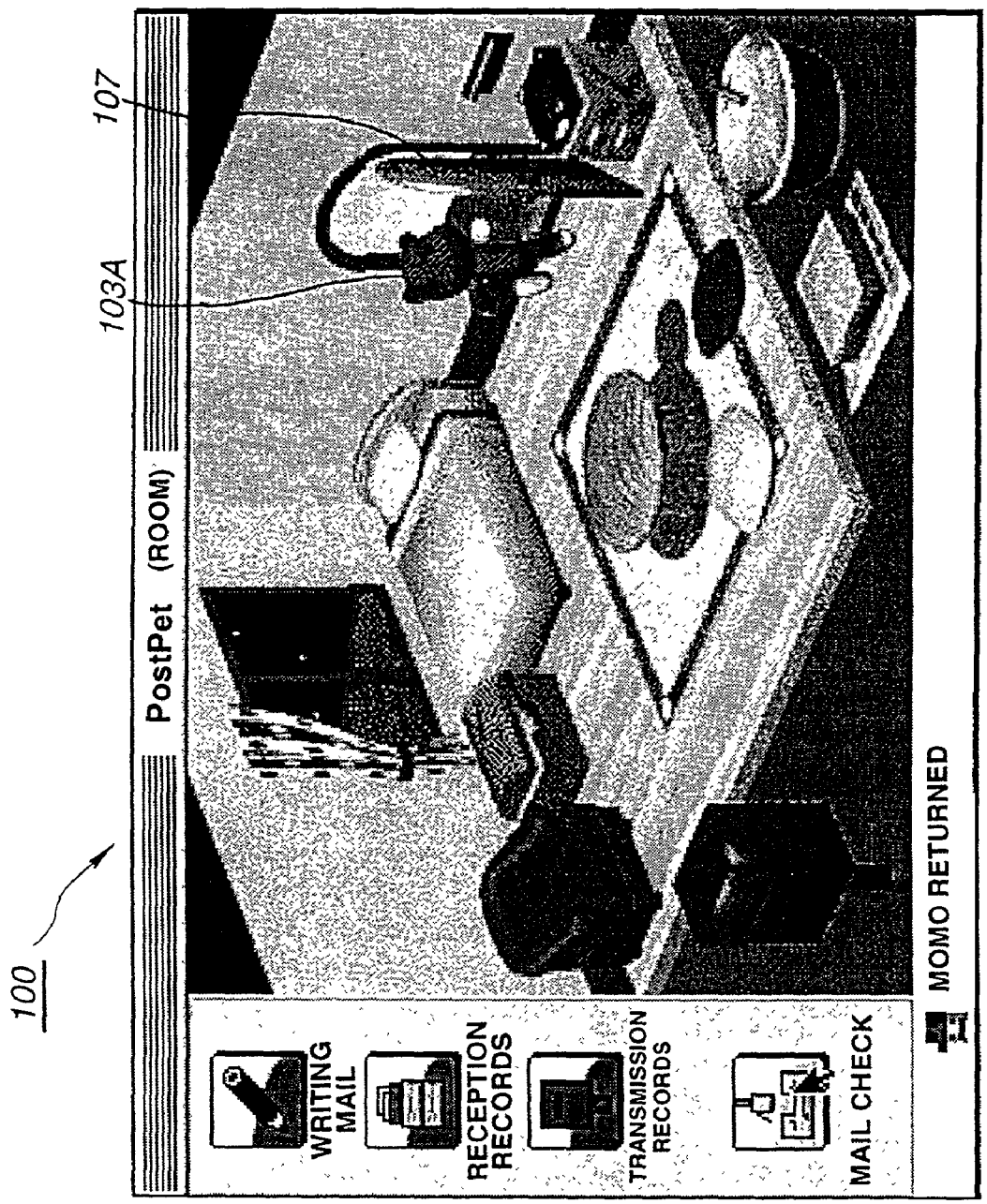
FIG. 29 shows the state of a GUI picture of a 'PostPet (Room)' when the mail has been sent by the post pet and the post pet has returned.
Figure 30:
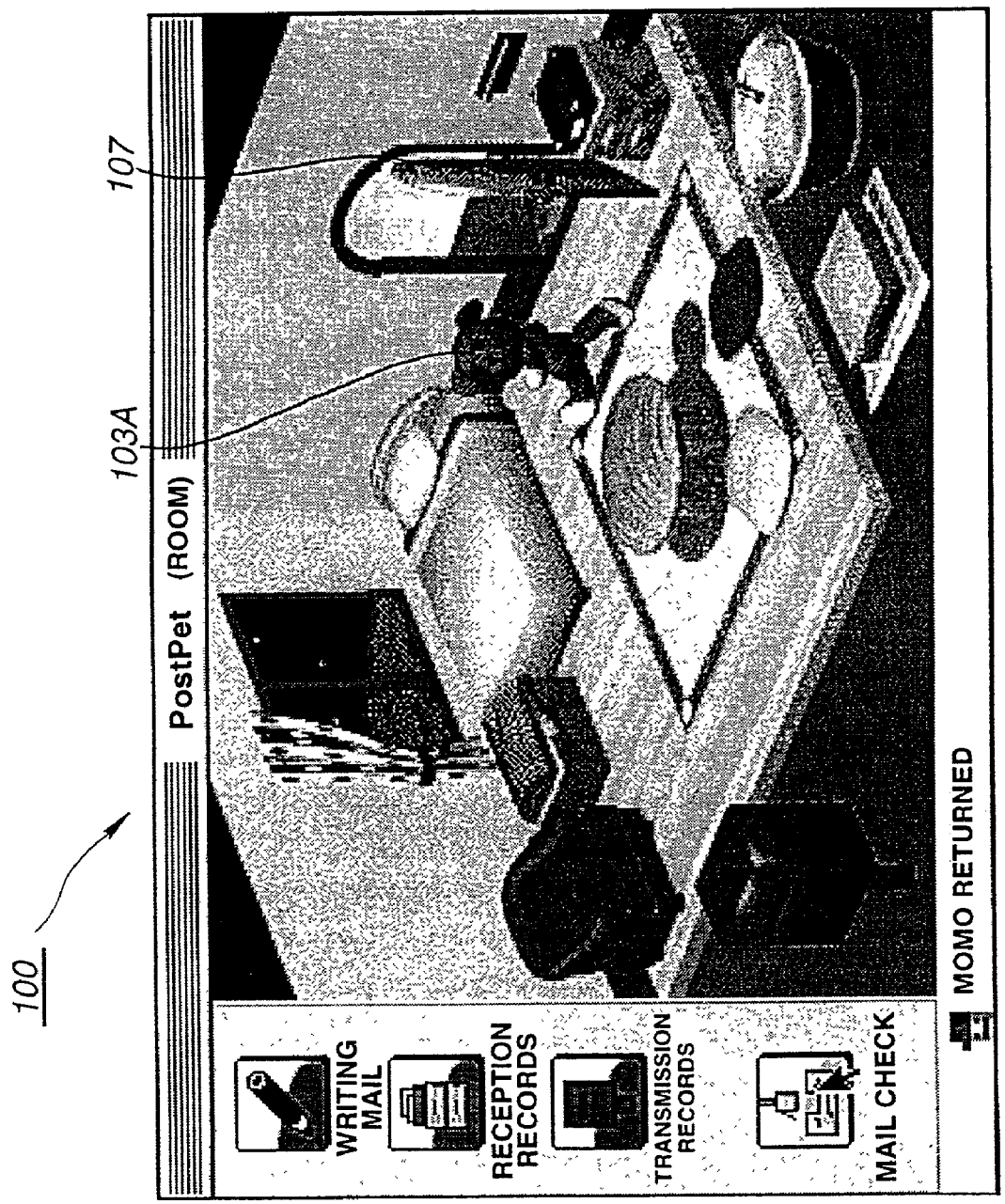
FIG. 30 similarly shows the state of a GUI picture of a 'PostPet (Room)' when the mail has been sent by the post pet and the post pet has returned.
Figure 31:
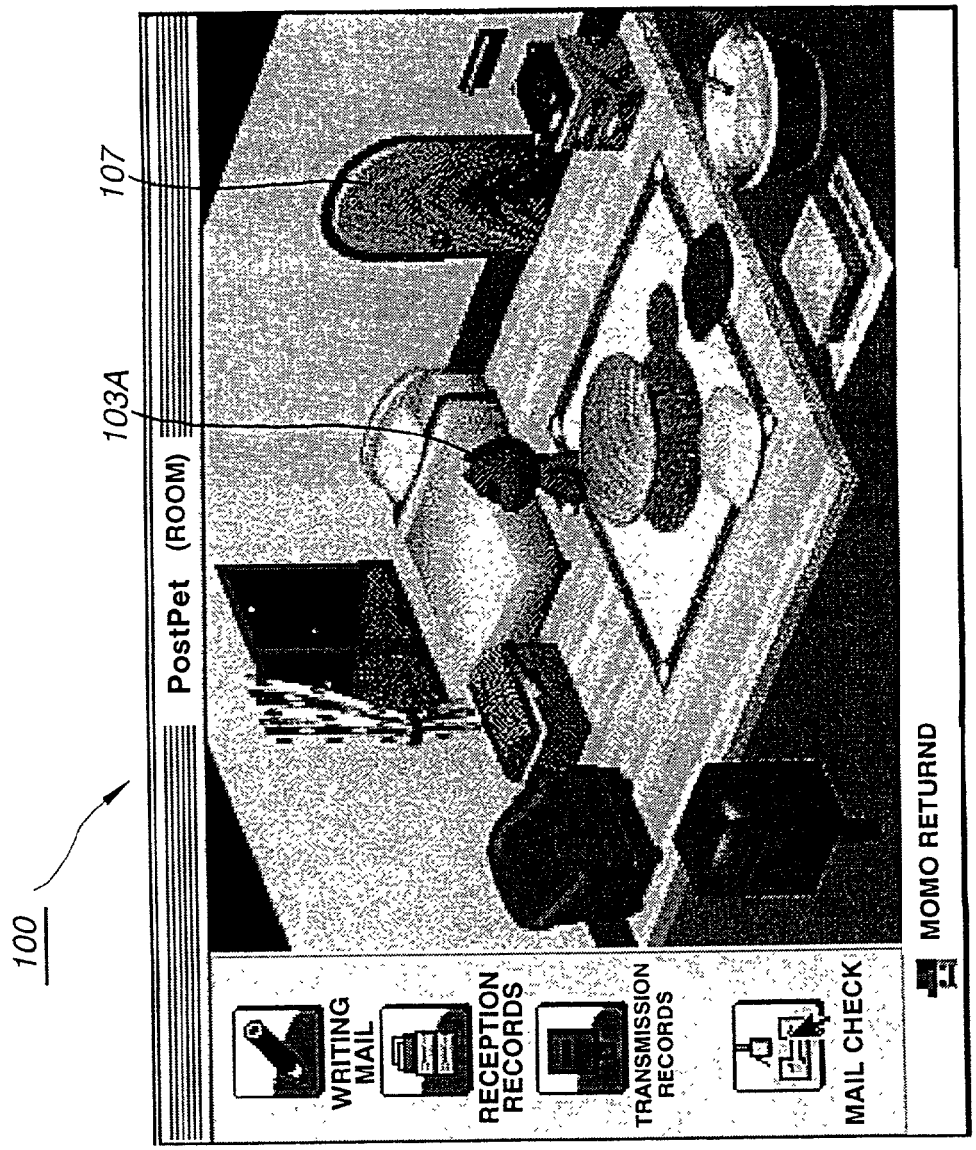
FIG. 31 similarly shows the state of a GUT picture of a 'PostPet (Room)' when the mail has been sent by the post pet and the post pet has returned.

On reception of the automatically returned agent parameters, the CPU 21a causes the display controller 21g to display on the screen of the display device 21B an animation in which the door 107 is first opened on the GUI picture 100 of the 'PostPet (Room)' as shown in FIG. 29, the post pet 103 entering the room as shown in FIG. 30 and closing the door 107 as shown in FIG. 31. At this time, a message reading: "Momo (pet's name) has come back" is displayed on the lower side of the GUI picture 100 of the 'PostPet (Room)'.

Figure 32:
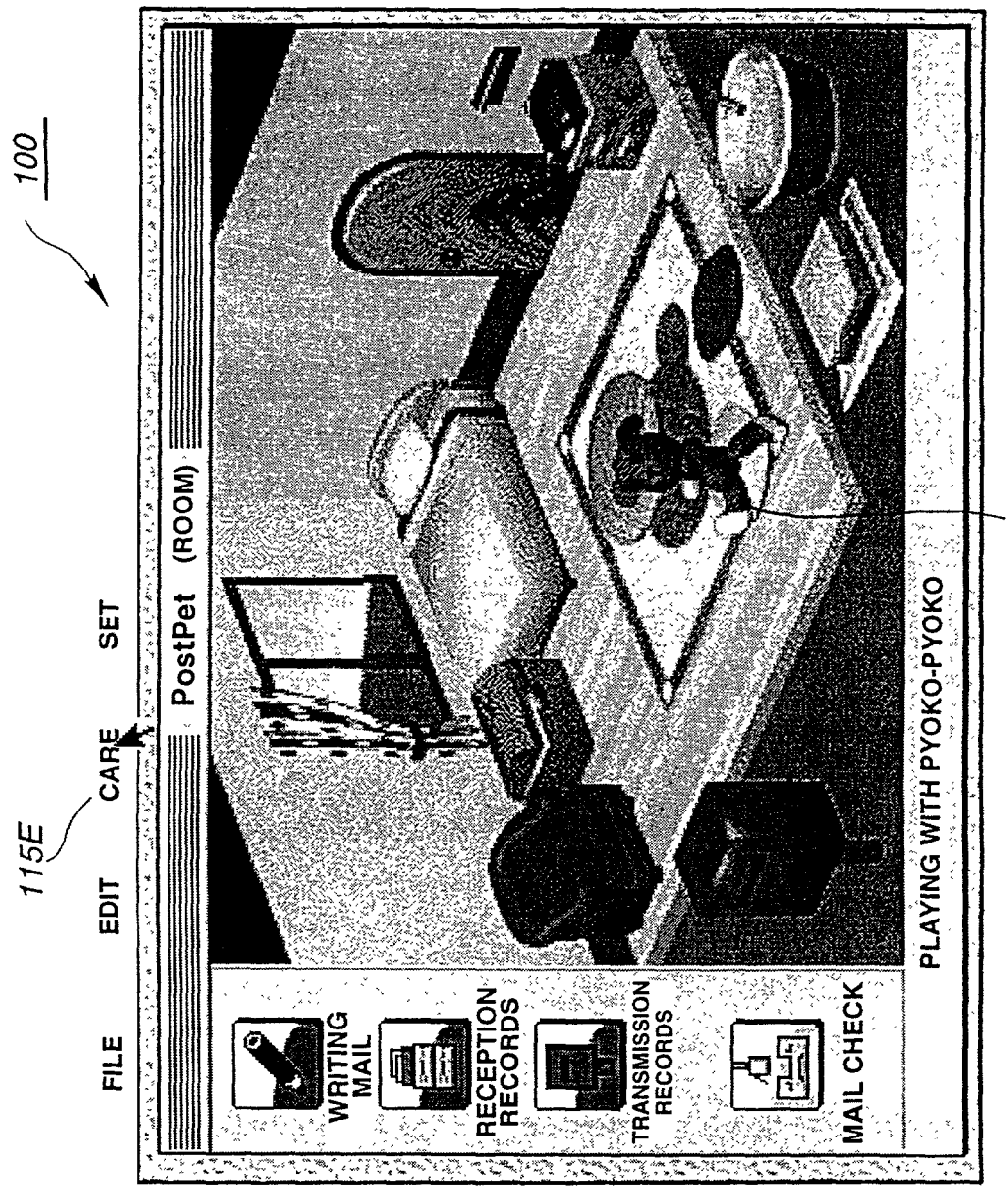
FIG. 32 shows the state of clicking an icon commanding looking after a post pet on the GUT picture of the 'PostPet (Room)'.
Figure 34:
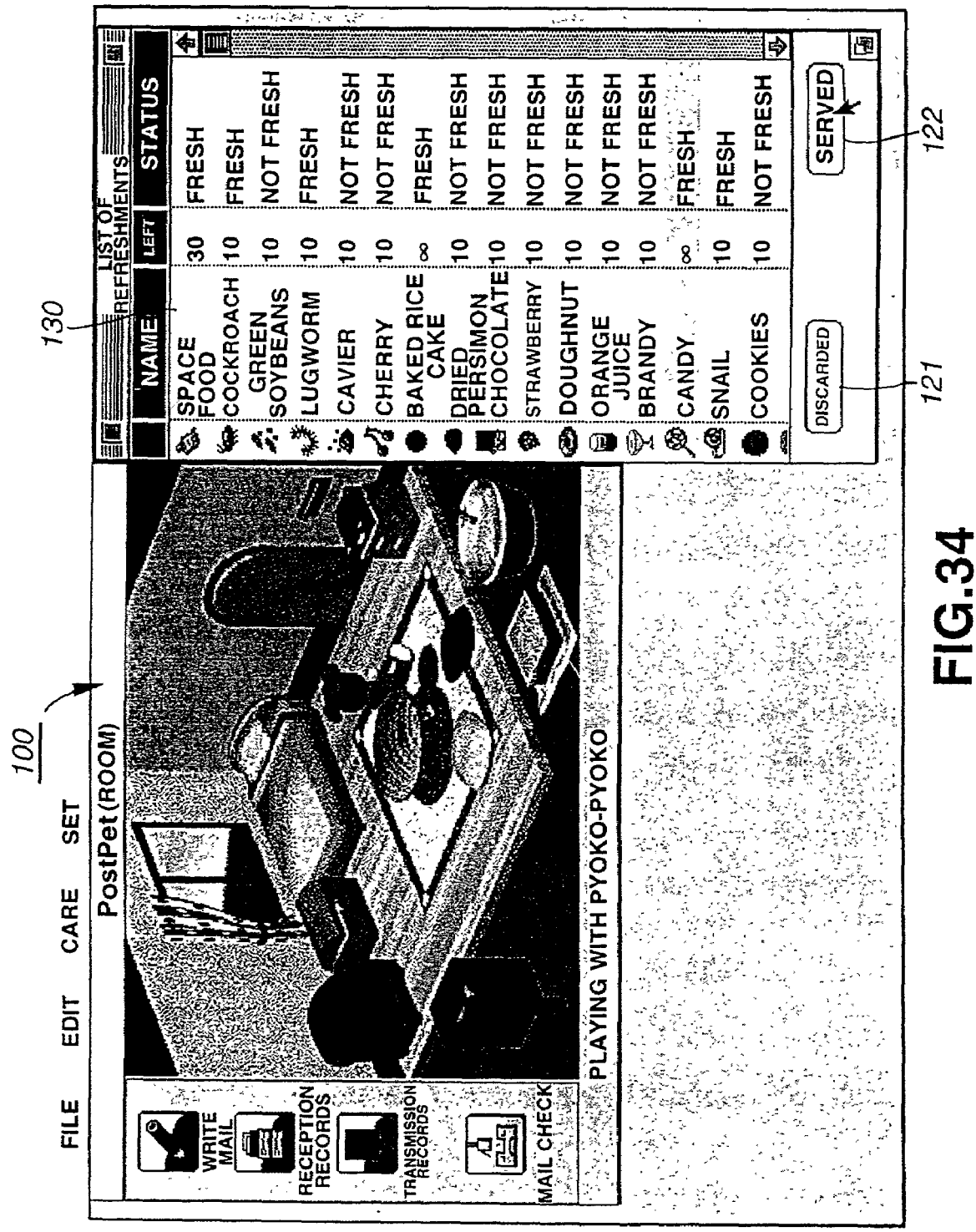
FIG. 34 shows the state in which a 'refreshment' item of the pulldown menu on the GUT picture of the 'PostPet (Room)' is selected for opening the window.
Figure 35:
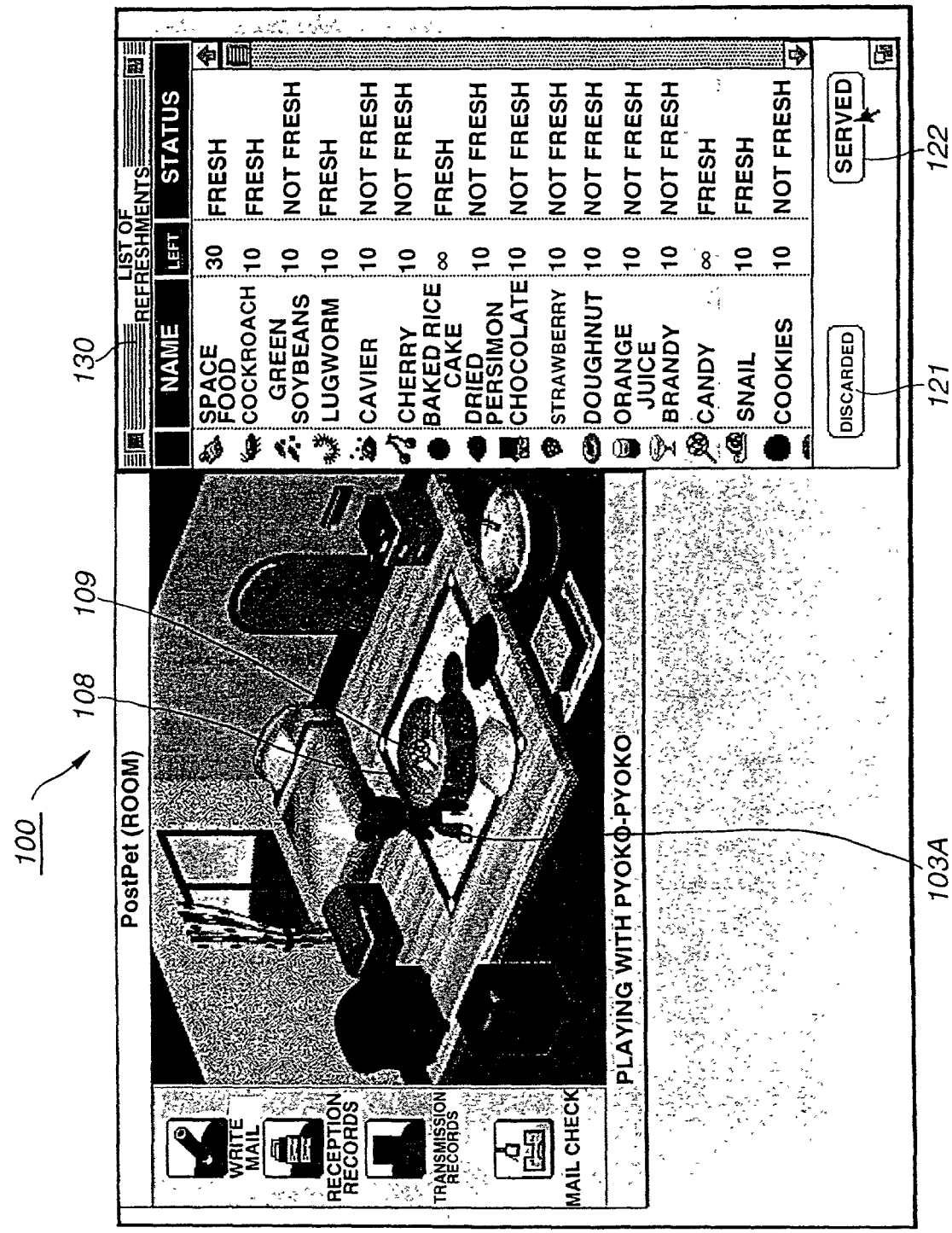
FIG. 35 shows the state of clicking a button 'served' on a window opened upon selecting 'refreshment' on the pulldown menu on the GUT picture of the 'PostPet (Room)'.

If the icon 115E for looking after the post pet 103 staying in the room is clicked on the GUI picture 100 of the 'PostPet (Room)' as shown in FIG. 32, there is opened a pulldown menu 125 specifying items such as 'state of the pet', 'wash' or 'refreshments' showing the contents of care as shown in FIG. 33. If the item 'refreshments' is selected, there is opened a window 130 showing a list of names of refreshments, remaining quantity and quality of the refreshments, as shown in FIG. 34. In this window 130 showing the list of names of refreshments, there are a 'discard' button commanding discarding of the selected refreshments and a 'serve' button commanding giving the selected refreshments to the post pet 103. If any of the listed refreshments is selected and the 'serve' button 122 clicked, the selected refreshment, for example, a candy 109, is put on a table 108, as shown in FIG. 35. Thus, the candy 109 is given the post pet 103 staying in the room. Although there are provided a number of sorts of refreshments as default, an up-to-date list of refreshments may be procured, such as by downloading from the WWW server on the Internet, and pasted to the 'refreshments' folder present in the same directory as the PostPet.exe which is the execution file or the E-mail sending program by way of adding the new 'refreshments' file.

Figure 36:
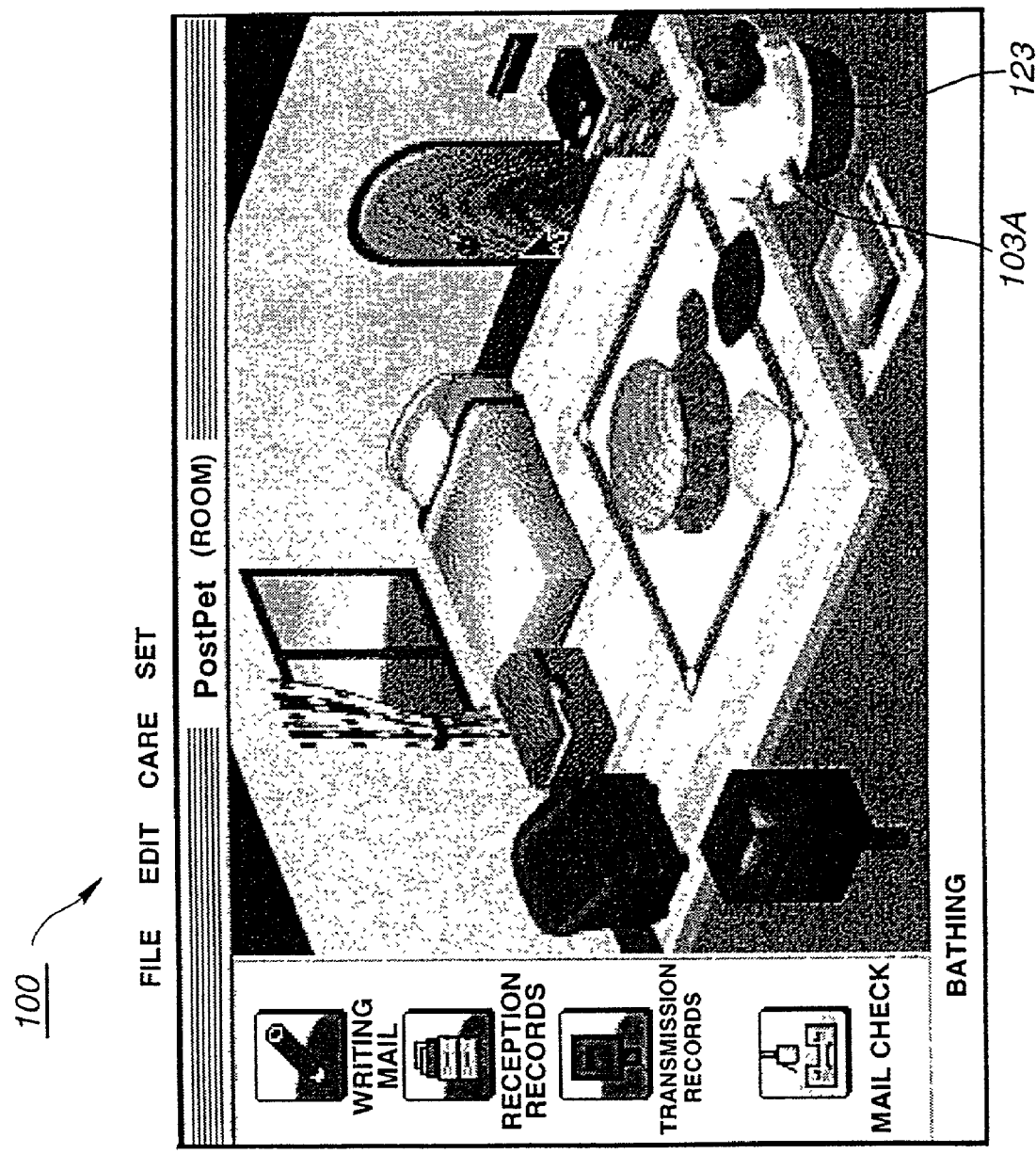
FIG. 36 shows the state in which an item 'Wash' of the pulldown menu on the GUT picture of the 'PostPet (Room)' has been selected.

If the item 'wash' displayed on the pulldown menu shown in FIG. 33 is selected, the post pet 103 takes a bath using a pail 123 on the GUI picture 100 of the 'PostPet (Room)', as shown in FIG. 36. At this time, a message reading: "Taking Bath" is displayed on the lower side of the GUI picture 100 of the 'PostPet (Room)'.

Figure 37:
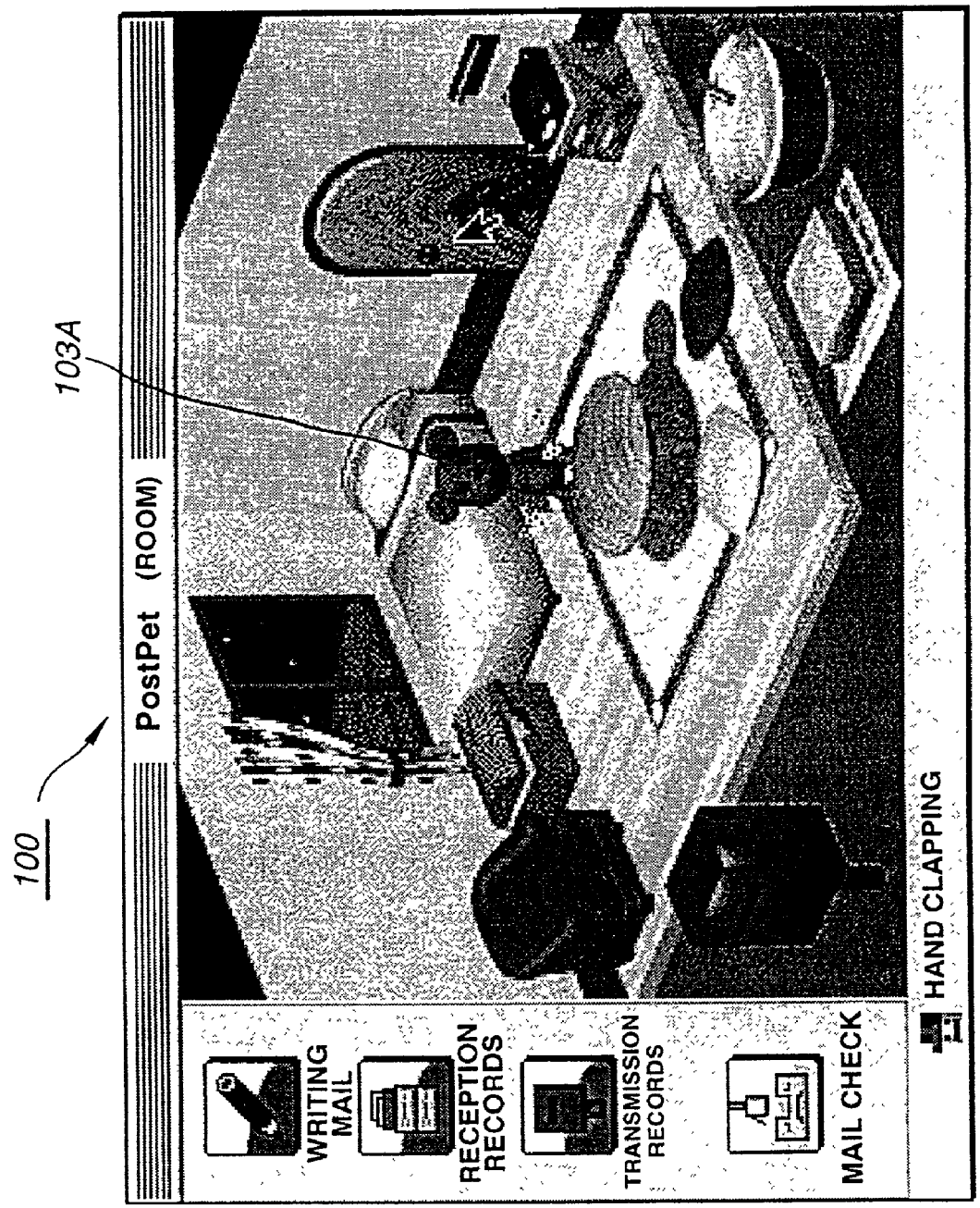
FIG. 37 shows the state in which the post pet on the pull-down menu on the GUI picture of the 'PostPet (Room)' is contaminated.

The post pet 103 has become dirty due to going out for the mail dispatch or taking refreshments. The dirty state is shown by dots on the post pet 103 as shown in FIG. 37. These dots are removed on selecting the item 'wash' displayed on the care pulldown menu 125 to get the pet to take a bath.

Figure 38:
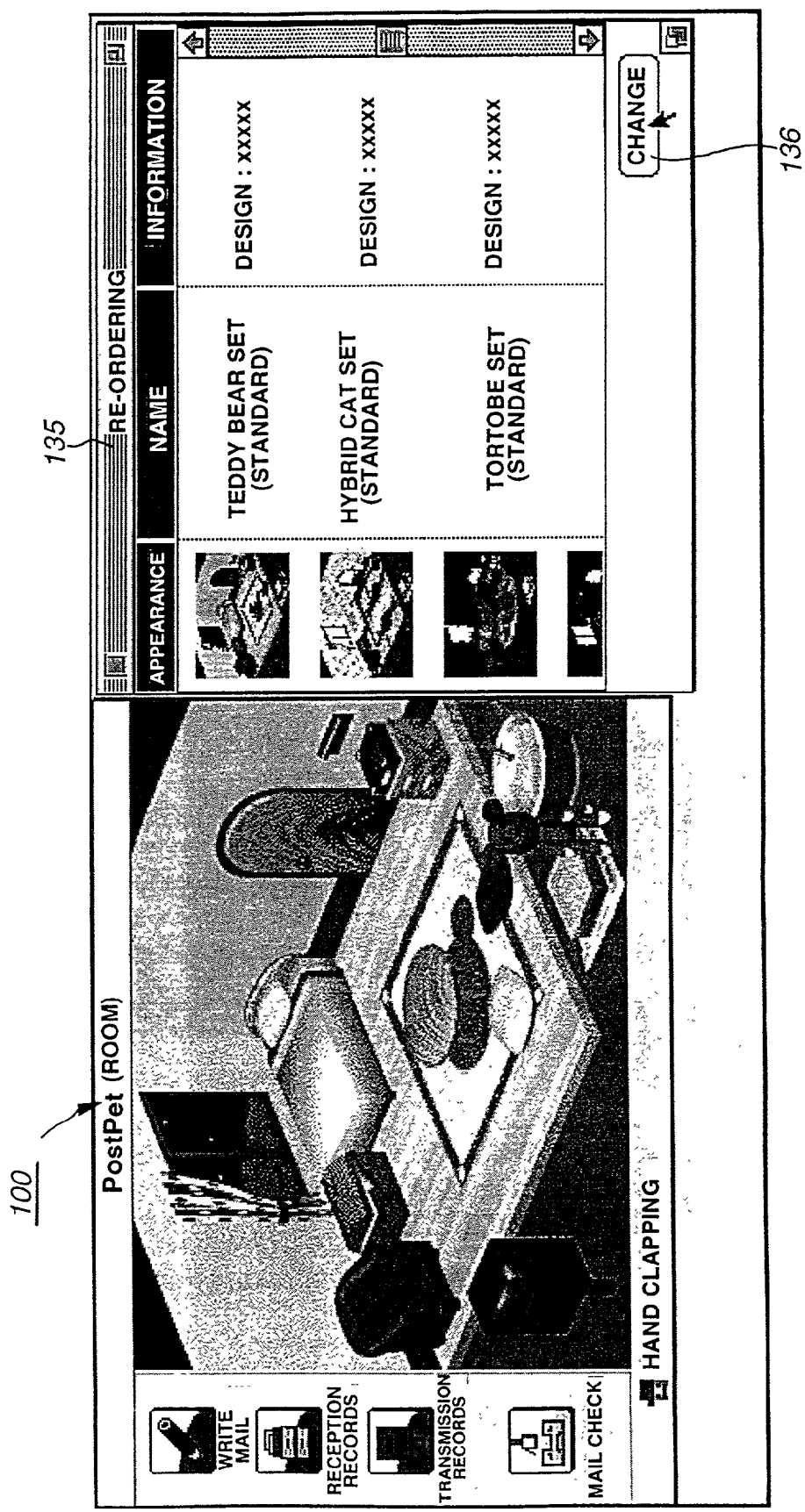
FIG. 38 shows the state in which an item 'Re-Ordering' of the pulldown menu on the GUT picture of the 'PostPet (Room)' has been selected.
Figure 39:
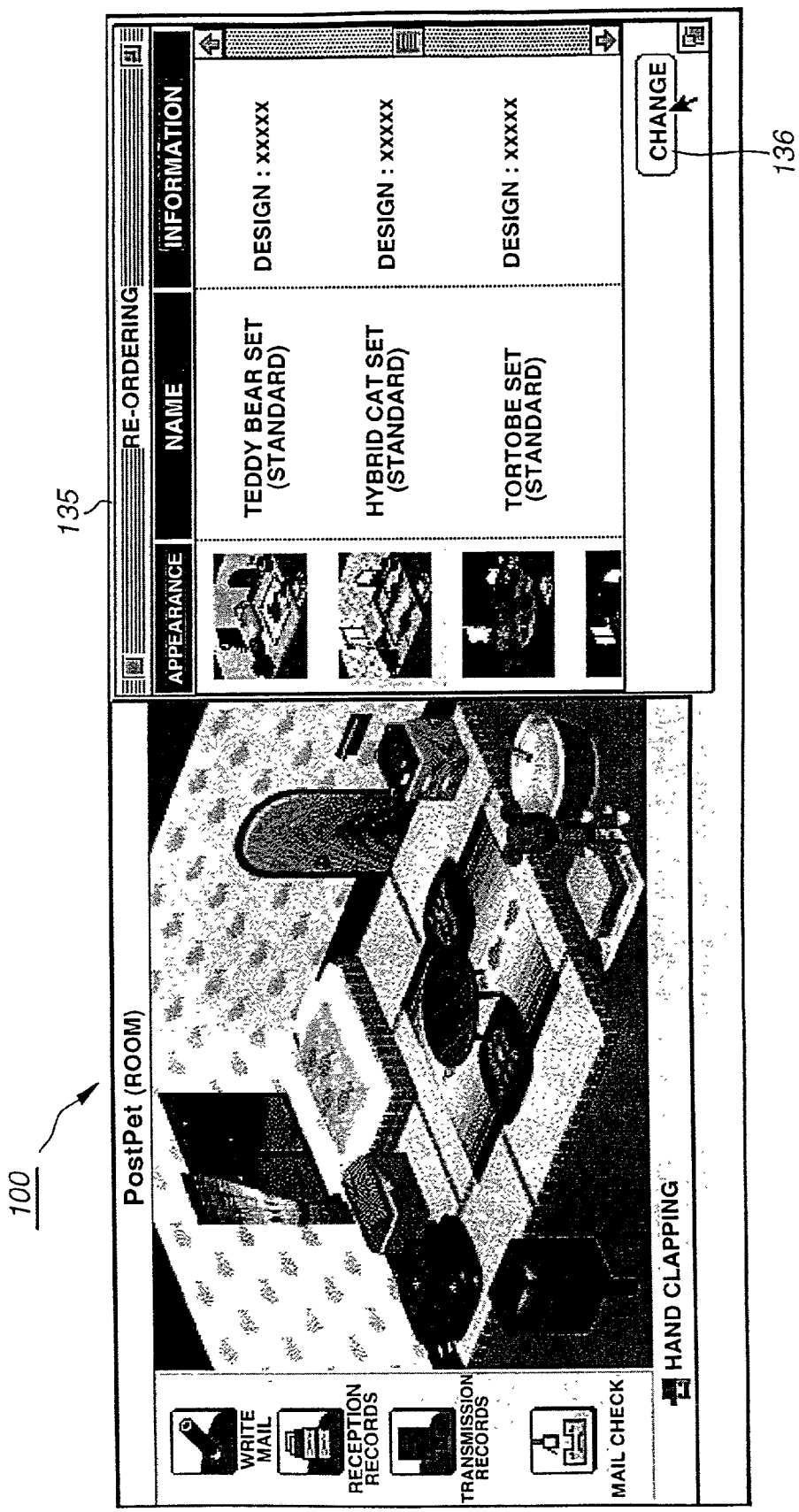
FIG. 39 shows the GUT picture of the 'PostPet (Room)' when the re-ordering has been executed.

If an item 'Re-ordering' displayed on the care pulldown menu 125 is selected, a 're-ordering' window 135 shown in FIG. 38 is opened. If a desired room, such as a hybrid cat set shown netted in FIG. 38, is selected, and a -change' button 136 is pushed, the room re-ordering is performed, as shown in FIG. 39. Although there are provided a number of sorts of room re-ordering as default, an up-to-date list of refreshments may be procured, such as by downloading from the WWW server on the Internet, such as 'http://www,so-net.or.jp/postpet/ index.html, and pasted to the 'plug-in' folder present in the same directory as the PostPet.exe, which is the execution file of the E-mail sending program, by way of adding the new 'room re-ordering' file.

Figure 40:
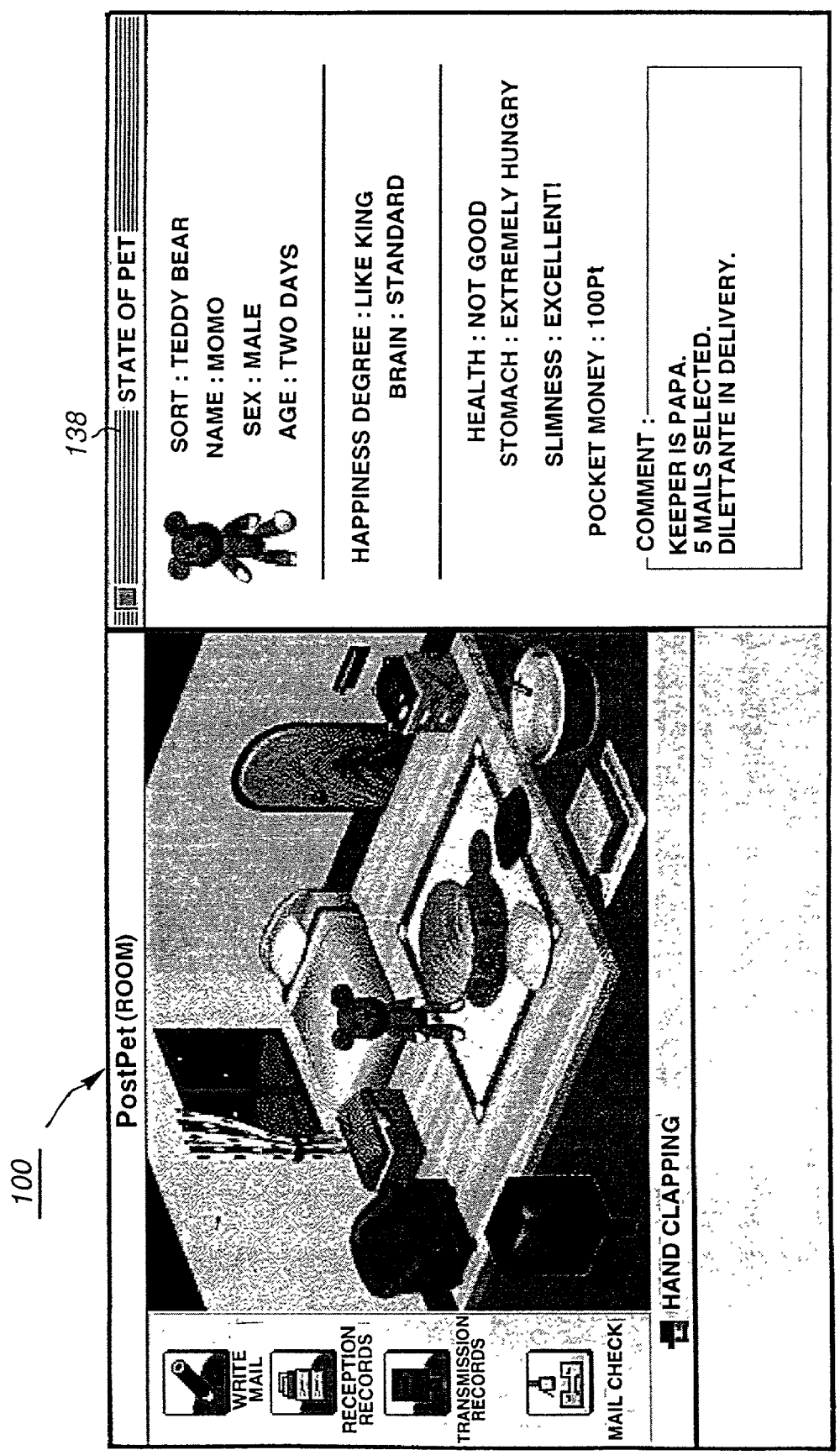
FIG. 40 shows the state in which an item 'State of Pet' of the pulldown menu on the GUT picture of the 'PostPet (Room)' has been selected.

If an item 'state of pet' displayed on the care pulldown menu 125 is selected, the window 138 shown in FIG. 40 is opened for displaying the state of the pet. Depending on the state of the pet displayed on the window 138, the user can recognize the sort, name, sex, age, degree of happiness, brain, condition, degree of hunger, slimness, pocket money and comment. The degree of happiness or type of brain can be variably represented by pet parameter values.

Figure 47:
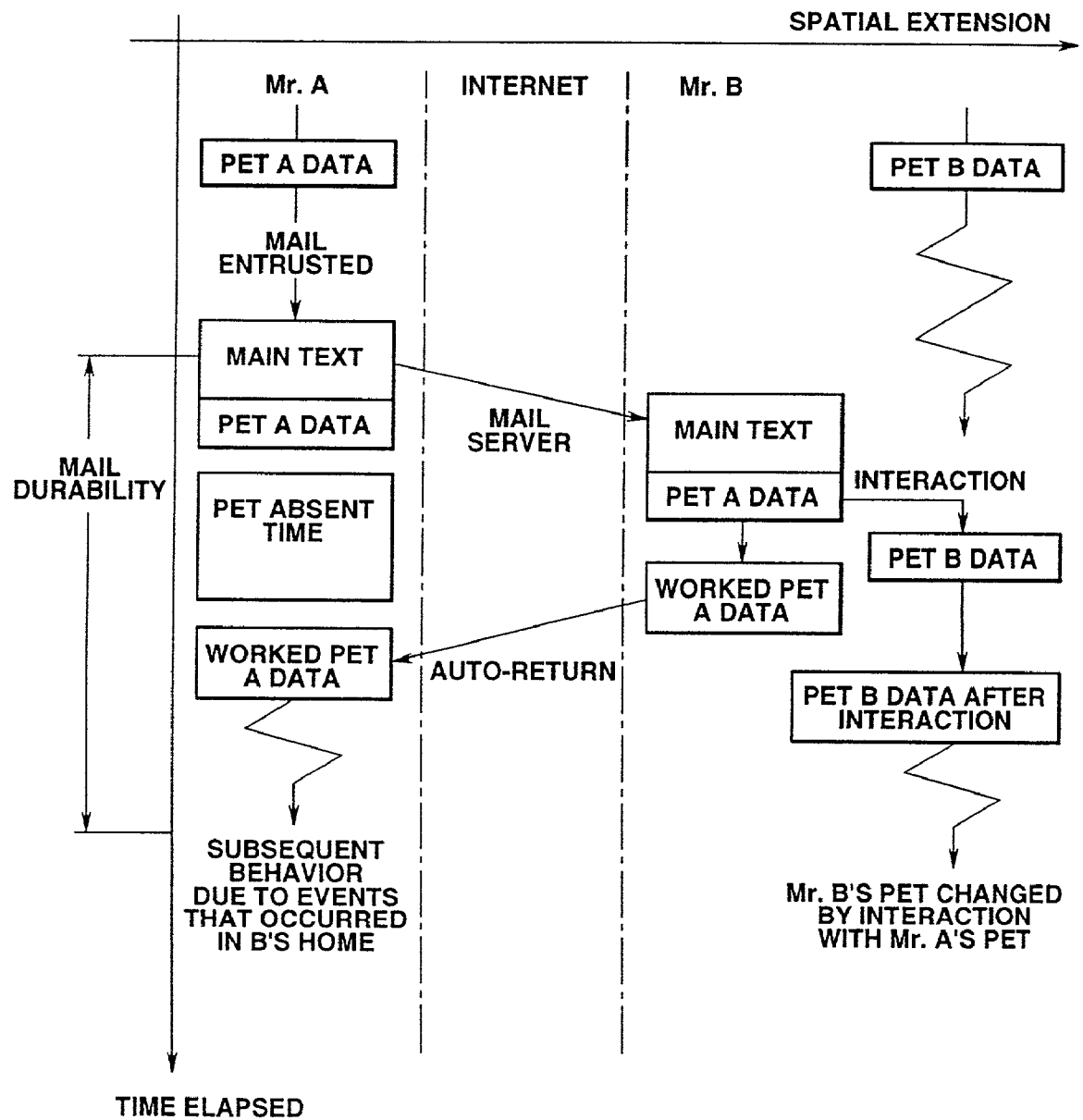
FIG. 47 shows a timing chart illustrating the sequence of E-mail exchange in a state in which two personal computers each having installed therein the mailer are connected concurrently to the communication network.
Figure 48:
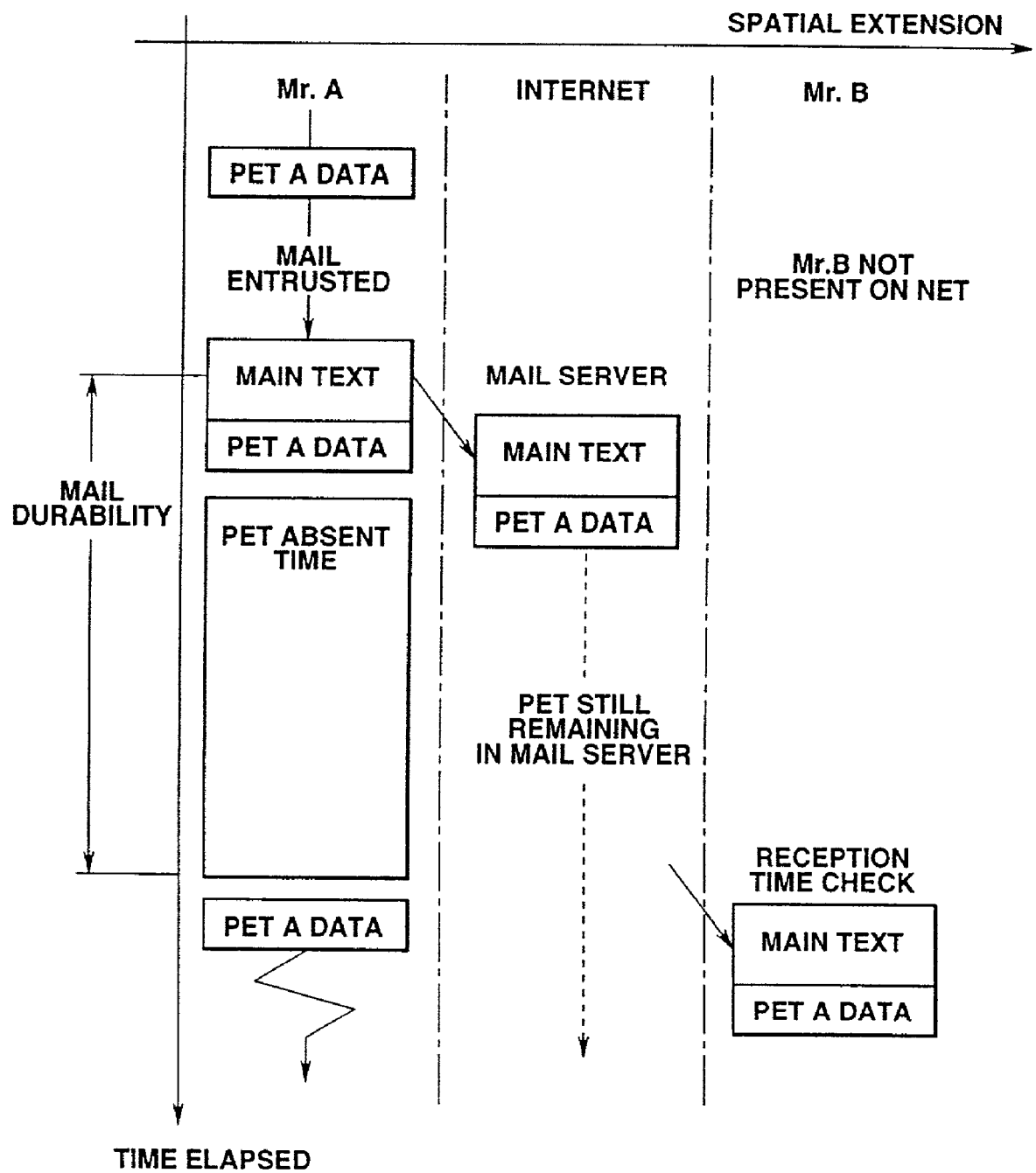
FIG. 48 shows a timing chart illustrating the sequence of E-mail exchange in a state in which two personal computers each having installed therein the mailer are connected with a time offset to the communication network.

Between personal computers 22 having the mailer function similar to that of the personal computer 21 having the above-described mailer function, E-mails can be exchanged by the post pet 103. If the personal computer 21 executes E-mail sending by the post pet 103A to send the E-mail to the personal computer 22, the latter executes the receive subroutine shown in FIG. 12 to check the E-mail reception time by the post pet 103A as shown by the time chart shown in FIG. 47. If the time is within the mail life, the post pet 103A is displayed on the screen of the display device 21B to automatically return the processed agent parameters.

If the sending side personal computer 21 executes the E-mail sending by the post pet 103A, the post pet 103 is absent, that is the post pet 103 is out, on the GUI picture of the 'PostPet (Room)', until the agent parameters of the post pet 103A are returned from the receiver, such that the post pet 103 cannot execute mail sending. However, if the agent parameters are returned automatically within the mail life, the single post pet 103A can be used repeatedly for sending the E-mails one-by-one.

In the sending personal computer 21, the operation determined by the automatically returned agent parameters is executed by the post pet 103A. If a further post pet 103B is registered as an agent on the receiving side personal computer 22, the agent parameters of the post pet 103B are changed, on reception of the E-mail by the post head 103A sent from the personal computer 21, by the interaction with the post pet 103A performing the operation as determined by the agent parameters annexed to the E-mail.

If, when the personal computer 21 executes the E-mail sending by the post pet 103A to send the E-mail to the personal computer 22, the personal computer 21 fails to execute the transmissions subroutine shown in FIG. 11, that is if the personal computer 22 is not connected to the communication network, the E-mail is reserved in the mail server on the Internet service provider 12 such that the E-mail is received at a time point the personal computer 22 is connected to the communication network. In this case, the post pet 103A stays in the mail server until the E-mail is received. Thus, with the sending personal computer 21, mail sending by the post pet 103A cannot be executed, with the post pet 103A being absent, that is, the post pet 103 is out, on the GUI picture of the 'PostPet (Room)'. Therefore, the E-mail sent by the post pet 103A is designed to have a pre-set life, such that, if the agent parameters of the post pet 103A are not returned from the receiving side within the mail life period, the agent parameters of the post pet 103A are automatically generated on timeout of the mail life period for causing the post pet 103A to appear on the GUI picture of the 'PostPet (Room)'.

On connection to the communication network, the receiving side personal computer 22 checks the reception timing of the E-mail by the post pet 103A to judge whether or not the time is within the mail life period, based on the sending data and time information of the agent parameters annexed to the E-mail and on the mail life period information. If the time is within the mail life period, the processed parameters are automatically returned after waiting until entrance to the above-mentioned reception subroutine. On the other hand, if the reception timing of the E-mail by the above-mentioned post pet 103A exceeds the mail life period, the post pet 103A is not displayed, while the agent parameters are not returned, even if the above-mentioned reception subroutine is executed.

The pet arrival confirmation mail function, which is an additional function of the automatic mail return processing of the step SP57 of FIG. 12, is hereinafter explained.

For making the animation display on the E-mail sending side GUI picture 100 for indicating the state of the post pet 103 returning home, the main text 202 of the pet mail received on the receiving side is deleted at step SP57. In addition, the agent parameters 203 are processed on the basis of actuation by the user so that only the processed agent parameters 203 are annexed to the mail header 201 for automatic return mailing. This enables the E-mail sending side to make animation display on the GUI picture 100 showing the post pet 103 returning home as shown in FIGS. 29 to 31 by the above-mentioned processing at the step SP49.

The function of automatic return mailing to the sender for advising the effect of arrival of the post pet as a text message of the E-mail, in addition to automatic return mailing of the agent parameters 203, is the pet arrival confirming function.

Figure 54:
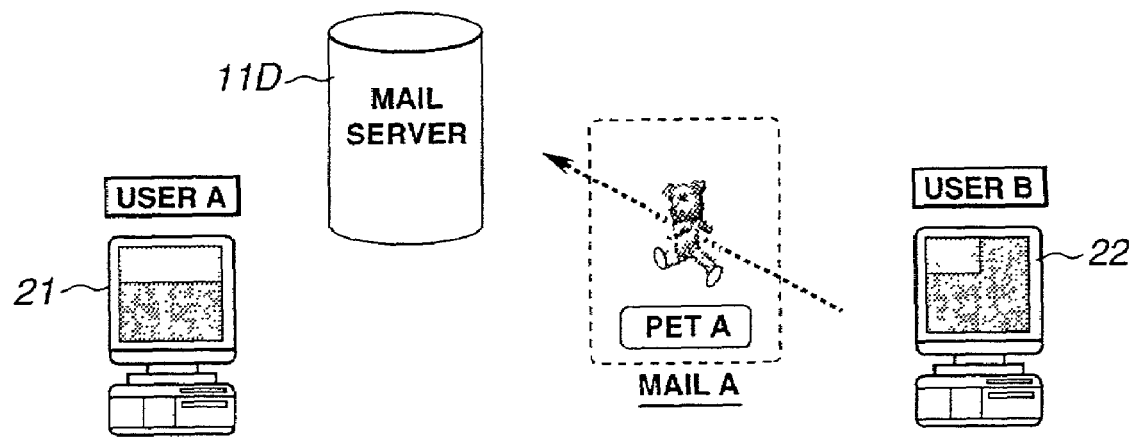
FIG. 54 schematically shows automatic mail returning of an agent parameter by the user B.
Figure 55:
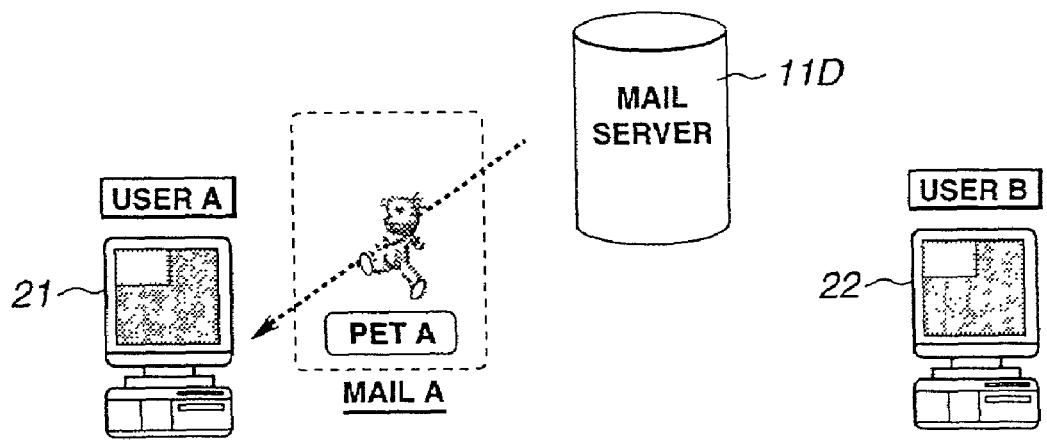
FIG. 55 schematically shows reception of an agent parameter automatically returned from the user B.

Referring to FIGS. 52 to 55 showing the processing flow, an 'automatic return' mail A' is automatically returned from the receiving side personal computer 22 of the user B via mail server 11D to the personal computer 21 of the sending side user A, as shown in FIGS. 54 and 55. In addition to this 'automatically returned' mail A', a 'pet arrival confirmation mail' is automatically returned from the receiving side personal computer 22 of the user B via mail server 11D) to the personal computer 21 of the sending side user A.

This 'pet arrival confirmation mail' is automatically generated by the E-mail sending/receiving program of the receiving side personal computer 22 of the user B.

Figure 56:
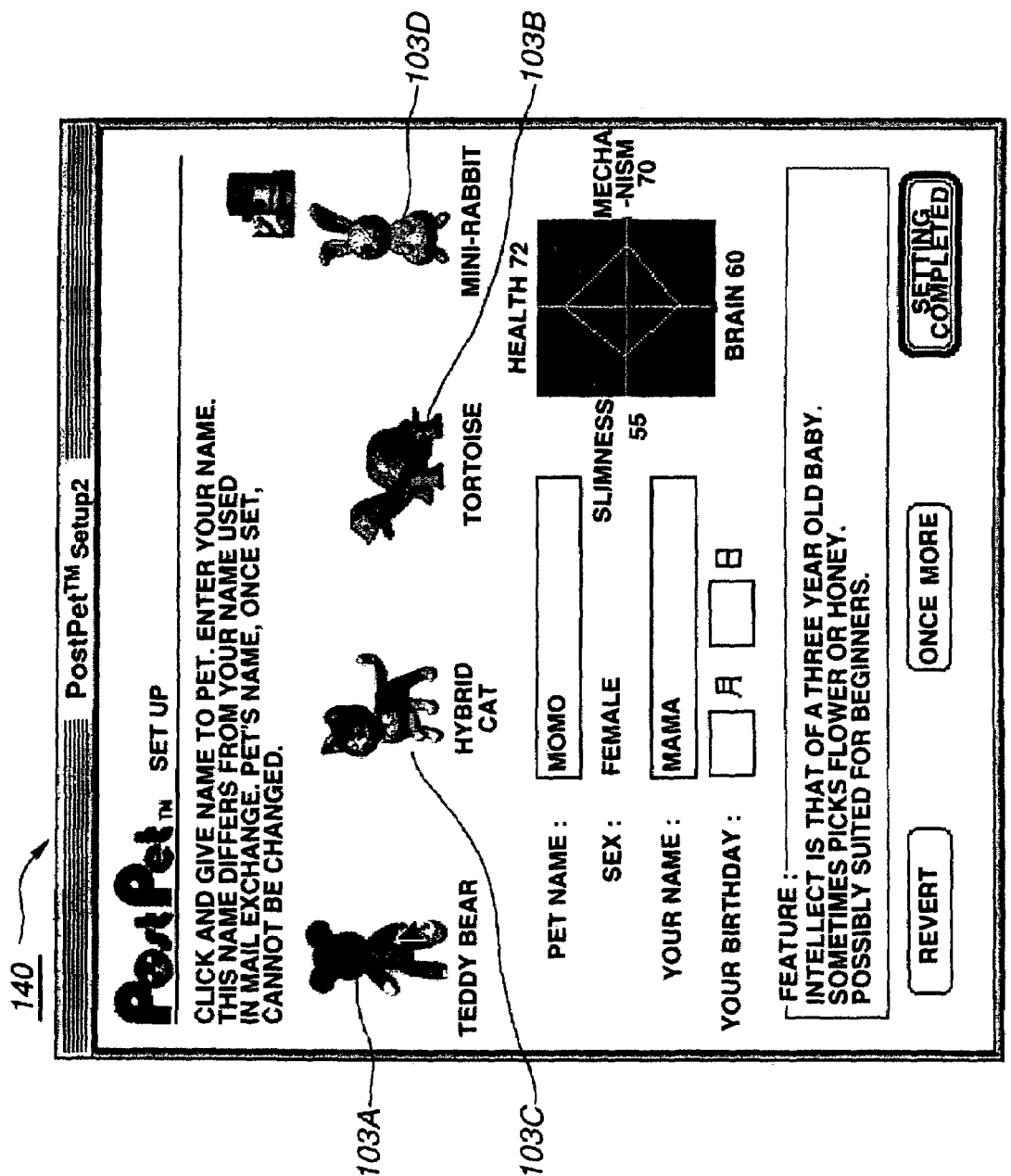
FIG. 56 shows a GUI picture for selecting the post pet.

It is assumed that, in a GUI picture 140 of a setup shown in FIG. 56, the user A sets 'Momo' as the name of his or her pet, while the user B sets 'Mippi' as the name of his or her pet.

The following mail is then set as the 'pet arrival confirmation mail'.

That is, a 'secret diary' is automatically set as the title (Subject), and a main text reading, for example:

"Today, I went (to the user B).
I played with Mippi.
I was hit a little.
I was hit many times.
Momo." is set automatically.

This 'pet arrival confirmation mail', in addition to the 'automatically returned' mail A', is automatically returned from the receiving side personal computer 22 of the user B via mail server 11D to the personal computer 21 of the sending side user A.

This adds the 'pet arrival confirmation mail' entitled 'secret diary' to the reception list of the user A, as is the usual E-mail.

This 'pet arrival confirmation mail', automatically generated by the E-mail sending/receiving program of the personal computer 22 of the user B, has the main text corresponding to the act of the user B on the post pet who delivered the mail, such as the act of caressing or hitting.

This gives not only the practical effect of confirming the delivery of the E-mail to the receiving side but also the psychological effect that the keeper can actually feel the fact that the post pet is serving on his or her behalf.

It is noted that the behavior of the post pet is determined by the agent parameters 203 as follows:

Specifically, the relative intensities of the pseudo-desires are determined by the environment of the post pet and stimuli from the user. Each desire agency has a score and sensitivity, whilst each behavior unit adds new scores with the scores of each desire agency as an input. The behavior unit having the maximum score is manifested.

The score of the behavior unit and the desire agency is calculated by:

new score=old score+(input×sensitivity)

with the sensitivity being the depth of the relation between each desire agency and the behavior unit and the input element. The sensitivity itself is also changed with input.

Figure 49:
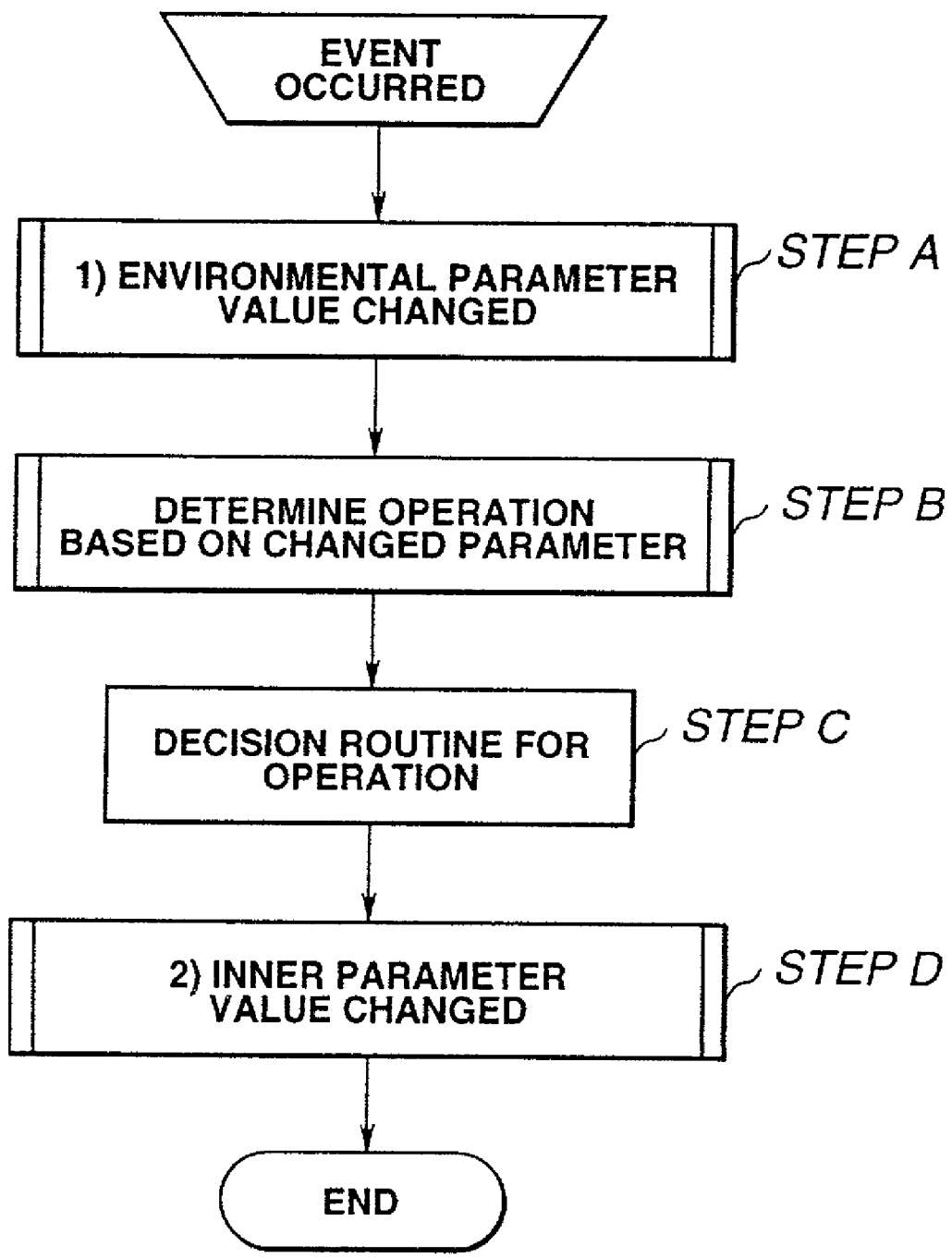
FIG. 49 shows a flowchart illustrating event processing of a feeling unit which governs the behavior of the post pet.

That is, as shown in FIG. 49, the feeling unit determining the post pet behavior captures changed values of environmental parameters of the post pet at step A, determines the behavior based on the changed environmental parameters at step B, judges the behavior taken at step C and modifies the value of the inner parameters at step D by way of performing event processing.

Figure 50:
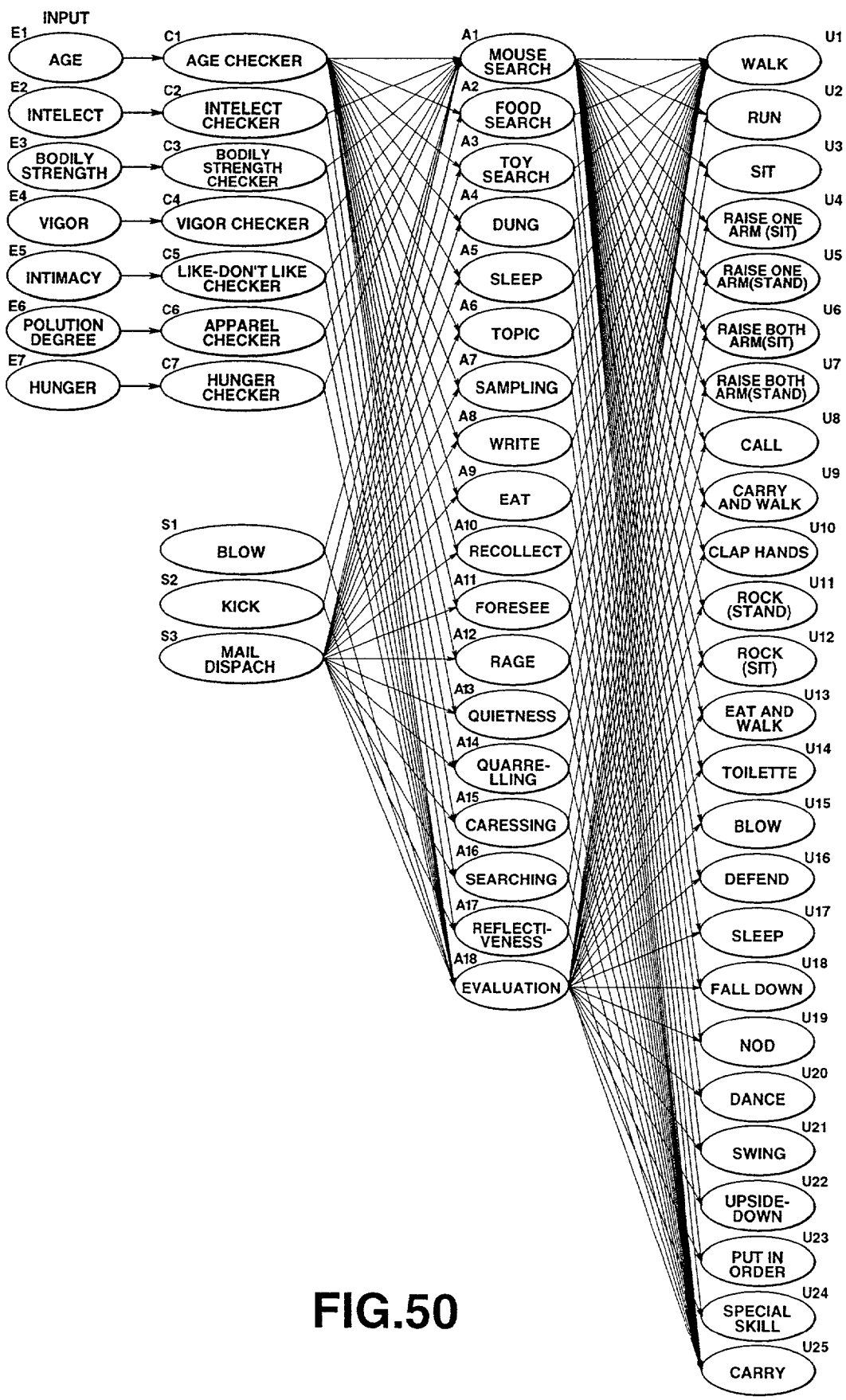
FIG. 50 illustrates the technique of determining the behavior of a post pet by an agent parameter.
Figure 51:
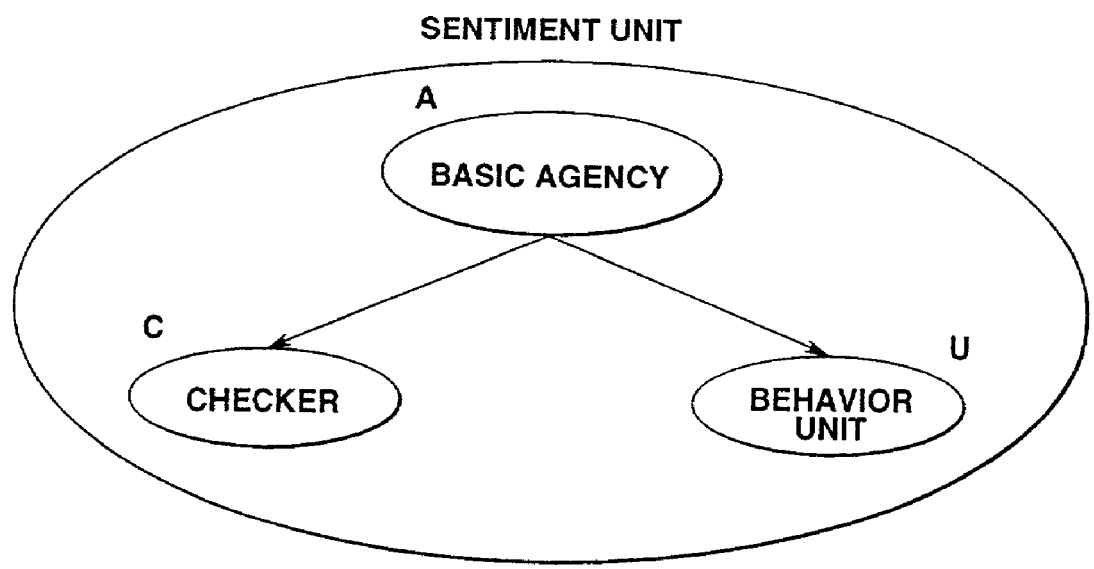
FIG. 51 shows the basic structure of the feeling unit.

Specifically, referring to FIG. 50, the agencies A1 to A18 of various desires receives environmental information items E1 to E7, specifying the environment of the input post pet, such as age, intellect, physical strength, vigor, intimacy, dirtiness or hungriness, and the information on stimuli, specifying the stimuli on the post pet from the user, such as hitting, kicking or dispatching an E-mail, as input, in order to check the environmental information items E1 to E7, through an age checker C1, an intelligence checker C2, a physical strength checker C3, a vigor checker C4, a like-don't like checker C5, an apparel checker C6 and a hungriness checker C7, while directly checking the information on stimuli, for calculating respective scores. Each of behavior units U1 to U25 has the scores of the desire agencies, thus calculated, as the input, and the behavior unit having the maximum score is started. That is, the feeling unit is made up of a basic agency A, a checker C and a behavior unit U, as shown in FIG. 51 showing the basic units for reaction.

The above-mentioned desire agencies may be exemplified by a mouse searcher A1, desirous to search for a mouse, a food searcher A2, desirous to search for food; a toy searcher A3, desirous to search a toy; a bathroom searcher A4, who wishes to go to the bathroom; a sleep liker A5, desirous to sleep; a conversation liker A6, desirous to have a chat; a sampling liker A7, desirous to make sampling; a writer A8, desirous to write letters; an eater A9, having a strong appetite; a recollector A10, desirous to recollect the past; a foreseer A11, desirous to make predictions; a rioter A12, desirous to make rages; a quietness liker A13, who likes quietness; a quarrelling liker A14, desirous to make quarrels, a caressing liker A15, desirous to be caressed, a searcher A16, desirous to make searches; a reflection liker A17, desirous to be reflective and an evaluation liker A18, desirous to make evaluations.

The behavior units may be exemplified by a walking unit U1 for animated representation of the walking motion, a running unit U2 for animated representation of the running operation, a sitting unit U3 for animated representation of the sitting operation, a sit-and-raise-one-hand unit U4 for animated representation of the motion of sitting and raising one hand, a sit-and-raise-both-hands unit U5 for animated representation of the motion of sitting and raising both hands, a standup-and-raise-one-hand unit U6 for animated representation of the motion of standing up and raising one hand, a standup-and-raise-both-hands unit U7 for animated representation of the motion of standing up and raising both hands, a calling unit U8 for animated representation of the calling motion, a carry-and-walk unit U9 for animated representation of the carrying and walking motion, a hand-clapping unit U10 for animated representation of the hand-clapping motion, a standup-and-riot unit U11 for animated representation of the standing up and rioting operation, a lie-and riot unit U12 for animated representation of the lying and rioting operation, an eat-and-write unit U13 for animated representation of the eating and writing operation, a toilet unit U14 for animated representation of going to the bathroom, a hit unit U15 for animated representation of the hitting operation, a defense unit U16 for animated representation of the defending operation, a sleeping unit U17 for animated representation of the sleeping operation, a fall-down unit U18 for animated representation of the falling-down operation, a nodding unit U1 9 for animated representation of the nodding operation, a dancing unit U20 for animated representation of the dancing operation, a swinging unit U21 for animated representation of the swinging operation, a stand-upside-down unit U22 for animated representation of the stand-upside-down operation, a put-into-order unit U23 for animated representation of the putting-into-order or housing operation, a special technique unit U24 for animated representation of the showing the special technique, and a carrying unit U25 for animated representation of the carrying operation.

In the present embodiment, about 50 illustrative legends are provided for the post pet 103. These legends are ranked depending on the 'intellect' of the post pet 103. If the eat-write unit U13 is started, an illustrative legend belonging to a rank 'intellect' at the time point is selected at random. The intellect of the post pet 103 is varied depending on the age E1 of the post pet 103 as set by the time elapsed since registration in the user computer or the serial number information 203 specifying the number of mails handled by the post pet 103.

The selected legends is sent as the E-mail on randomly selecting the counterpart of the E-mailing to whom the user has so far sent E-mails, including the user.

That is, the post pet 103A of the present embodiment can voluntarily send an E-mail reading: "My name is Momoko-please remember me" to the user or to the counterparts of the E-mailing. The scores of the above-mentioned eat and write unit U13 are varied with the age E1, intellect E2, physical strength E3 or the vigor E4 of the post pet 103 and is reset at a time point when the post pet 103 has voluntarily sent an E-mail. The physical strength E3 or the vigor E4 of the post pet 103 is varied with the stimuli or the contents of experiences from the user or the counterpart. For example, the physical strength E3 of the post pet 103 is lowered and raised on dispatching an E-mail and on eating or sleeping. The vigor E4 of the post pet 103 is lowered and enhanced on being persecuted and caressed by the counterpart, respectively. Thus, the post pet 103 can voluntarily send E-mails a number of times to the user or to the counterpart of E-mailing.

For preventing the user from disliking the post pet 103 as a result of the increased age E1 or intellect E2 of the post pet 103 resulting in the increased number of times of dispatching E-mails to the user or to the counterparts and in repeated occurrences of the same legends, a 'life' is set for the post pet 103.

This 'life' set for the post pet 103 is usually set in terms of the number of E-mails carried by the pet to 500 mails and is varied with the physical strength E3 or the vigor E4.

The post pet 103, whose life has come to a close, sends the final E-mail reading, for example: "Momo now goes to a distant place . . . Thank you for taking care of me . . . So long" to the user or to the counterpart to stop the function as an agent.

With the above-described E-mail system, the 'post pet' of the personal computer 21 of the user A encodes the agent parameters as a mail of the MIME format along with the main text of the mail carried by the pet A and sends the encoded mail A to the destination, that is to the user B. This eliminates the pet A from the personal computer 21 of the user A.

Figure 52:
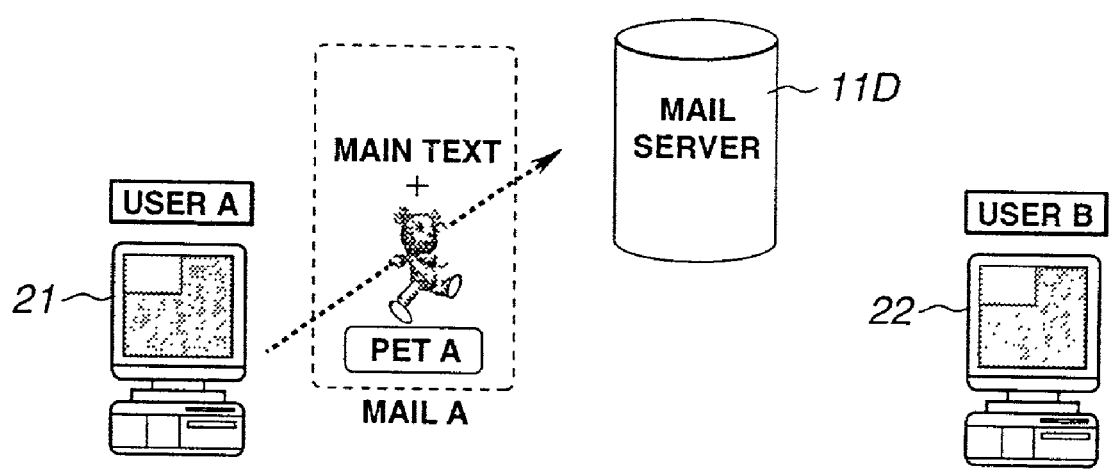
FIG. 52 schematically shows sending a mail A from a user A to another user B by the post pet.
Figure 53:
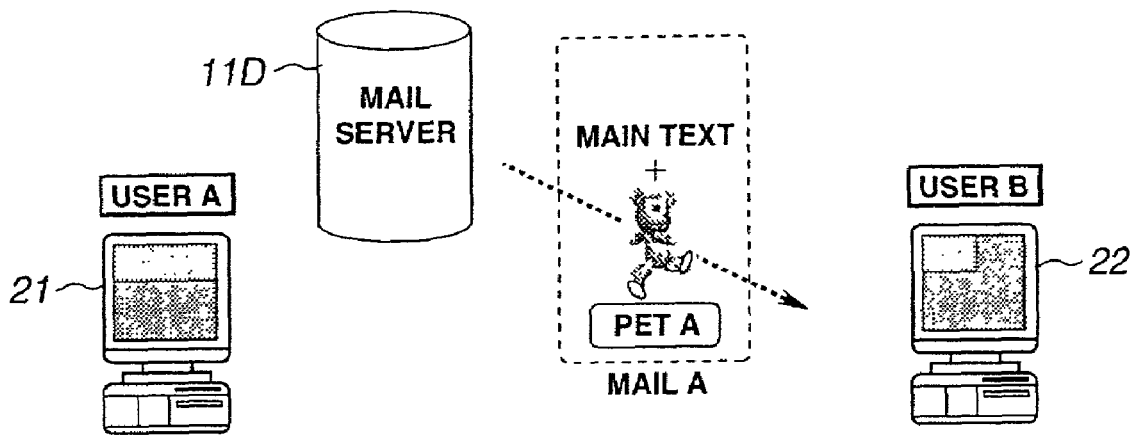
FIG. 53 schematically shows capturing the mail A by the user B.

If next the 'post pet' of the user B of the destination executes mail check, the mail A is captured by the 'post pet' of the personal computer 22 of the user B, as shown in FIG. 52.

Then, the 'post pet' of the user B records changes in the state of the pet A caused by various events occurring in the pet room of the user B and sends back the pet A to the user A as the 'automatically returned mail A', as shown in FIG. 54.

If the user A checks the mail by the 'post pet' of the personal computer 21, the 'automatically returned mail A' is captured, as shown in FIG. 55. Thus, the 'post pet' of the personal computer 21 of the user A uses the new agent parameters reflecting the events that occurred in the user B.

That is, by having picture data of the agent on the personal computers of the user and the counterpart of the E-mailing of the user, and actually sending agent parameters controlling the agent's behavior, the result as though picture data of the agent were being sent is obtained. By sending the agent parameters, instead of the picture data, the user connection time is shortened, such that, for a dial-up user, the Internet connection charges and telephone charges are reduced. Moreover, since the amount of exchanged data is relatively decreased, the resources of the Internet in their entirety may also be saved.

Meanwhile, if the post pet is selected first, the GUI picture 140 for selecting the pet is displayed, as shown in FIG. 56, such that one of the Teddy-bear 103A, tortoise 103B, hybrid cat 103C and mini-rabbit 103D can be selected. The parameters of 'condition', 'temper', 'brain' and 'slimness' are varying at all times and are set by the timing of selecting (clicking) the pet. However, the parameters as set by the timing of selecting (clicking) the pet are initial values, after all, and are varied depending on the pet keeping state of the user. The items 'pet's name' and 'your name' can be freely entered by the user.

Figure 57:
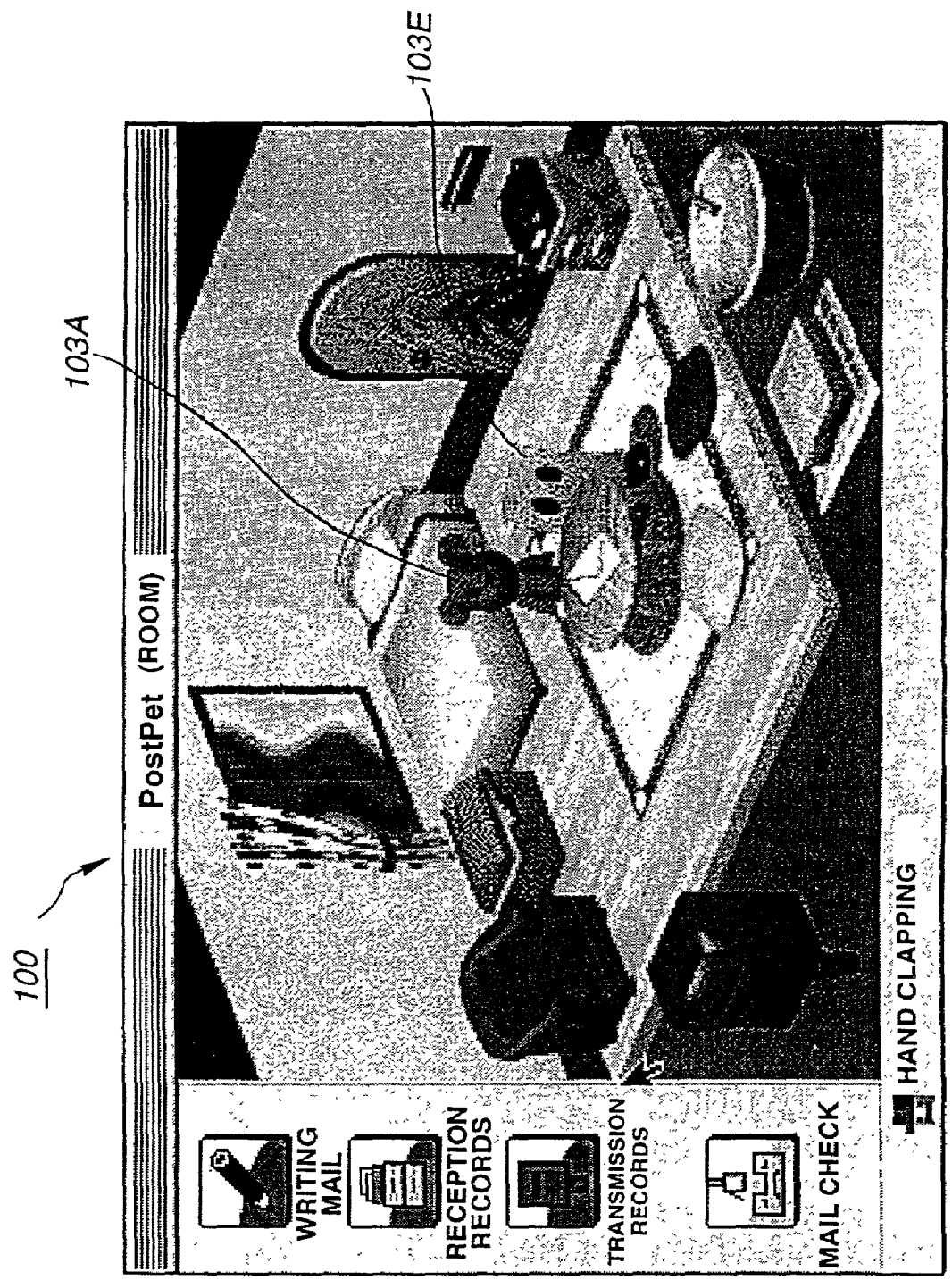
FIG. 57 shows a GUI picture of the 'PostPet (Room)' in which Hatena-kun made debut.

In the post pet, picture data of the pet are stored in the local storage medium of the user, so that, if the number of pet types is increased in the future, these new pets cannot be represented. Thus, picture data of a character 'hatena-kun' (Mr. Question) 103E shown in FIG. 4 is used. That is, if a mail is sent by a post pet of a newly defined character to a user having only picture data of Teddy bear 103A, tortoise 103B, a hybrid cat 103C and a mini-rabbit 103D, the hatena-kun 103E is displayed, as shown in FIG. 57. Thus, it is possible with the post pet to cope with an increased number of the pets, by using the hatena-kun 103E, for adding new pets.

Although the foregoing description has been made in connection with application of the present invention to the Internet, the present invention can be applied to a mail communication system exploiting a personal handy phone or other mobile communication terminals capable of coping with the mail communication on the Intranet or PHS Internet Access Forum Standard (PIAFS), in addition to mail exchange on the Internet.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method for sending an E-mail wherein an agent of a sender of the E-mail is displayed on a screen and the behavior of the agent of the sender is managed by agent parameters;

and wherein on accepting a sending command for commanding sending of an E-mail, agent parameters determining the behavior of the agent of the sender are annexed to the main text of the mail having an appended mail header for sending the E-mail;

and wherein after the E-mail is sent, the agent of the sender is not displayed on the screen and the agent parameters determining the behavior of the agent of the sender is not appended to the E-mail, so that the agent of the sender is set to be absent until a pre-set time elapses.

2. The method for sending an E-mail as claimed in claim 1 wherein the agent parameters determining the behavior of the agent of the sender are automatically generated after lapse of the pre-set time.

3. The method for sending an E-mail as claimed in claim 1 wherein a single E-mail is sent by a single agent of the sender.

4. The method for sending an E-mail as claimed in claim 2 wherein the agent parameters determining the behavior of the agent of the sender include the sending date and time information and can be annexed to the main text of an E-mail sent next after lapse of the pre-set time based on the sending date and time information.

5. The method for sending an E-mail as claimed in claim 1 wherein the agent parameters are changed by learning function.

6. The method for sending an E-mail as claimed in claim 1 wherein the behavior of the agent of the sender is managed by the agent parameters including environmental information.

7. The method for sending an E-mail as claimed in claim 1 wherein a sending command for designating sending an E-mail by a single agent of the sender and a sending command for designating sending plural E-mails by a single second agent of the sender are selectively accepted; and wherein on accepting the sending command for designating sending an E-mail by a single agent of the sender, the agent parameters determining the agent behavior are annexed to the main text of the E-mail for sending the E-mail.

8. The method for sending an E-mail as claimed in claim 1 wherein when the agent of the sender whose behavior is determined by the agent parameters is absent, the E-mail is sent by the second agent of the sender which can be designated sending plural E-mails.

9. An E-mail sending method wherein an agent of a sender of the E-mail is displayed on a screen and the behavior of the agent of the sender is managed by agent parameters;

and wherein on accepting a sending command for commanding sending of an E-mail, agent parameters determining the behavior of the agent of the sender are annexed to the main text of the mail having an appended mail header for sending the E-mail;

and wherein after the E-mail is sent, the agent of the sender is not displayed on the screen and the agent parameters determining the behavior of the agent of the sender is not appended to the E-mail, so that the agent of the sender is set to be absent until the agent parameters are sent back from a recipient of the E-mail.

10. The method for sending an E-mail as claimed in claim 9 wherein the agent parameters sent are changed and the agent parameters thus changed are sent back from the recipient.

11. The method for sending an E-mail as claimed in claim 9 wherein an absent state of the agent of the sender is set by a flag showing the agent of the sender is absent or not.

12. The method for sending an E-mail as claimed in claim 9 wherein a sending command for designating sending an E-mail by a single agent of the sender and a sending command for designating sending plural E-mails by a single second agent of the sender are selectively accepted; and wherein on accepting the sending command for designating sending an E-mail by a single agent of the sender, the agent parameters determining the agent behavior are annexed to the main text of the E-mail for sending the E-mail.

13. The method for sending an E-mail as claimed in claim 12 wherein when the agent of the sender whose behavior is determined by the agent parameters is absent, the E-mail is sent by the second agent of the sender which can be designated sending plural E-mails.

14. An E-mail sending method wherein an agent of a sender of the E-mail is displayed on a screen and the behavior of the agent is managed by agent parameters;

and wherein on accepting a sending command for commanding sending of an E-mail, agent parameters determining the behavior of the agent of the sender are annexed to the main text of the mail having an appended mail header for sending the E-mail;

and wherein if the agent parameters are not sent back within a pre-set time, the agent parameters are automatically generated, and the agent of the sender is not displayed on the screen and the agent parameters determining the behavior of the agent of the sender is not appended to the E-mail, so that the agent of the sender is set to be absent after the E-mail is sent until the agent parameters are automatically generated; if the agent parameters are sent back within the pre-set time, the agent of the sender is not displayed on the screen and the agent parameters determining the behavior of the agent of the sender is not appended to the E-mail, so that the agent of the sender is set to be absent after the E-mail is sent until the agent parameters are sent back from a recipient of the E-mail;

and wherein a single E-mail is sent by a single agent of the sender.

15. The method for sending an E-mail as claimed in claim 14 wherein the agent parameters sent are changed and the agent parameters thus changed are sent back from the recipient.

16. The method for sending an E-mail as claimed in claim 15 wherein the agent parameters are changed by learning function.

17. The method for sending an E-mail as claimed in claim 14 wherein an absent state of the agent of the sender is set by a flag showing the agent of the sender is absent or not.

18. A method for sending an E-mail wherein an agent of a sender of the E-mail is displayed on a screen and the behavior of the agent is managed by agent parameters;
and wherein on accepting a sending command for commanding sending of an E-mail, agent parameters determining the behavior of the agent of the sender are annexed to the main text of the mail having an appended mail header for sending the E-mail;
and wherein after the E-mail is sent, the agent of the sender is made not to send the E-mail;
and wherein a single E-mail is sent by a single agent of the sender.

19. The method for sending an E-mail as claimed in claim 18 wherein a sending command for designating sending an E-mail by a single agent of the sender and a sending command for designating sending plural E-mails by a single second agent of the sender are selectively accepted; and wherein on accepting the sending command for designating sending an E-mail by a single agent of the sender, the agent parameters determining the agent behavior are annexed to the main text of the E-mail for sending the E-mail.

20. An apparatus for sending an E-mail, comprising:
an agent manager for displaying an agent of a sender of the E-mail on a screen and for managing the behavior of the agent of the sender depending on agent parameters;
a sending command accepting means for accepting a sending command designating sending an E-mail; and
a mail sending means which, on accepting a sending command designating sending an E-mail by said sending command accepting means, is controlled by said agent manager for appending the agent parameters determining the behavior of the agent of the sender to the mail header or to an annexed main text of the E-mail for sending the E-mail,
wherein said agent manager does not display the agent of the sender on the screen and does not control said mail sending means for appending the agent parameters determining the behavior of the agent of the sender, so that sets the agent of the sender is set to be absent after sending the E-mail until a pre-set time elapses.

21. The apparatus for sending an E-mail as claimed in claim 20 wherein said agent manager automatically generates the agent parameters determining the behavior of the agent of the sender after lapse of the pre-set time.

22. The apparatus for sending an E-mail as claimed in claim 20 wherein said agent manager sends an E-mail by the single agent of the sender from said mail sending means.

23. The apparatus for sending an E-mail as claimed in claim 21 wherein said agent parameters determining the behavior of the agent of the sender includes the sending date and time information; and wherein said agent manager can append the agent parameters to the main text of an E-mail sent next by said mail sending means after lapse of the pre-set time from the sending date and time based on the sending date and time information.

24. The apparatus for sending an E-mail as claimed in claim 20 wherein the agent parameters are changed by learning function.

25. The apparatus for sending an E-mail as claimed in claim 20 wherein said agent manager manages the behavior of the agent of the sender by the agent parameters including an environmental information.

26. The apparatus for sending an E-mail as claimed in claim 20 wherein said sending command accepting means selectively accepts a sending command for designating sending of a single E-mail by a single agent of the sender or a sending command for designating sending of a plurality of E-mails by a single second agent of the sender and wherein on accepting the sending command for designating sending an E-mail by a single agent of the sender, said agent manager annexes the agent parameters determining the agent behavior to the main text of the E-mail by said mail sending means for sending the E-mail.

27. The apparatus for sending an E-mail as claimed in claim 26 wherein when the agent of the sender whose behavior is determined by the agent parameters is absent, said agent manager makes the second agent of the sender which can be designated sending plural E-mails send the E-mail.

28. An apparatus for sending an E-mail, comprising:
an agent manager for displaying an agent of a sender of the E-mail on a screen and for managing the behavior of the agent of the sender depending on agent parameters;
a sending command accepting means for accepting a sending command designating sending an E-mail; and
a mail sending means which, on accepting a sending command designating sending an E-mail by said sending command accepting means, is controlled by said agent manager for appending the agent parameters determining the behavior of the agent of the sender to the mail header or to an annexed main text of the E-mail for sending the E-mail,
wherein said agent manager does not display the agent of the sender on the screen and does not control said mail sending means for appending the agent parameters determining the behavior of the agent of the sender, so that the agent of the sender is set to be absent after sending the E-mail until the agent parameters are sent back from a recipient of the E-mail.

29. The apparatus for sending an E-mail as claimed in claim 28 further comprising an agent parameters receiving means for receiving the agent parameters changed and sent back from the recipient of the E-mail.

30. The apparatus for sending an E-mail as claimed in claim 29 wherein said agent manager manages an absent state or the agent of the sender by a flag showing the agent of the sender is absent or not.

31. The apparatus for sending an E-mail as claimed in claim 28 wherein said sending command accepting means selectively accepts a sending command for designating sending of a single E-mail by a single agent of the sender or a sending command for designating sending of a plurality of E-mails by a single second agent of the sender and wherein on accepting the sending command for designating sending an E-mail by a single agent of the sender, said agent manager annexes the agent parameters determining the agent behavior to the main text of the E-mail by said mail sending means for sending the E-mail.

32. The apparatus for sending an E-mail as claimed in claim 31 wherein when the agent of the sender whose behavior is determined by the agent parameters is absent, said agent manager makes the second agent of the sender which can be designated sending plural E-mails send the E-mail.

33. An apparatus for sending an E-mail, comprising:
  an agent manager for displaying an agent of a sender of the E-mail on a screen and for managing the behavior of the agent of the sender depending on agent parameters;
  a sending command accepting means for accepting a sending command designating sending an E-mail; and
  a mail sending means which, on accepting a sending command designating sending an E-mail by said sending command accepting means, is controlled by said agent manager for appending the agent parameters determining the behavior of the agent of the sender to the mail header or to an annexed main text of the E-mail for sending the E-mail,
  wherein if the agent parameters are not sent back within a pre-set time, said agent manager automatically generates the agent parameters, and said agent manager does not display the agent of the sender of the screen and does not control said mail sending means for appending the agent parameters determining the behavior of the agent of the sender, so that the agent of the sender is set to be absent after the E-mail is sent until said agent manager automatically generates the agent parameters, if the agent parameters are sent back within the pre-set time, said agent manager does not display the agent of the sender on the screen and does not control said mail sending means for appending the agent parameters determining the behavior of the agent of the sender, so that the agent of the sender is set to be absent after the E-mail is sent until the agent parameters are sent back from a recipient of the E-mail;
  and wherein a single E-mail is sent by a single agent of the sender.

34. The apparatus for sending an E-mail as claimed in claim 33 further comprising an agent parameters receiving means for receiving the agent parameters changed and sent back from the recipient of the E-mail.

35. The apparatus for sending an E-mail as claimed in claim 33 wherein the agent parameters are changed by learning function.

36. The apparatus for sending an E-mail as claimed in claim 33 wherein said agent manager manages an absent state of the agent of the sender by a flag showing the agent of the sender is absent or not.

37. An E-mail sending program product that can be computer including:
  a program code module which displays an agent of a sender of the E-mail on a screen and manages the behavior of the agent of the sender by agent parameters; and
  a program code module which annexes, on accepting a sending command for commanding sending of an E-mail, agent parameters determining the behavior of the agent of the sender to the main text of the mail having an appended mail header for sending the E-mail;
  and wherein after the E-mail is sent, the agent of the sender is not displayed on the screen and the agent parameters determining the behavior of the agent of the sender is not appended to the E-mail, so that the agent of the sender is set to be absent until a pre-set time elapses.

38. The program product of claim 37 wherein the agent parameters determining the behavior of the agent of the sender are automatically generated after lapse of the pre-set time.

39. The program product of claim 37 wherein a single E-mail is sent by a single agent of the sender.

40. The program product of claim 38 wherein the agent parameters determining the behavior of the agent of the sender include the sending date and time information and can be annexed to the main text of an E-mail sent next after lapse of the pre-set time based on the sending date and time information.

41. The program product of claim 37 wherein the agent parameters are changed by learning function.

42. The program product of claim 37 wherein the behavior of the agent of the sender is managed by the agent parameters including environmental information.

43. The program product of claim 37 wherein a sending command for designating sending an E-mail by a single agent of the sender and a sending command for designating sending plural E-mails by a single second agent of the sender are selectively accepted; and wherein on accepting the sending command for designating sending an E-mail by a single agent of the sender, the agent parameters determining the agent behavior are annexed to the main text of the E-mail for sending the E-mail.

44. The program product of claim 43 wherein when the agent of the sender whose behavior is determined by the agent parameters is absent, the E-mail is sent by the second agent of the sender which can be designated sending plural E-mails.

45. An E-mail sending program products that can be executed by a computer including:
  a program code module which displays an agent of a sender of the E-mail on a screen and manages the behavior of the agent of the sender by agent parameters; and
  a program code module which annexes, on accepting a sending command for commanding sending of an E-mail, agent parameters determining the behavior of the agent of the sender to the main text of the mail having an appended mail header for sending the E-mail;
  and wherein after the E-mail is sent, the agent of the sender is not displayed on the secreen and the agent parameters determining the behavior of the agent of the sender is not appended to the E-mail, so that the agent of the sender is set to be absent until the agent parameters are sent back from a recipient of the E-mail.

46. The program product of claim 45 wherein the agent parameters sent are changed and the agent parameters thus changed are sent back from the recipient.

47. The program product of claim 45 wherein an absent state of the agent of the sender is set by a flag showing the agent of the sender is absent or not.

48. The program product of claim 45 wherein a sending command for designating sending an E-mail by a single agent of the sender and a sending command for designating sending plural E-mails by a single second agent of the sender are selectively accepted; and wherein on accepting the sending command for designating sending an E-mail by a single agent of the sender, the agent parameters determining the agent behavior are annexed to the main text of the E-mail for sending the E-mail.

49. The program product of claim 48 wherein when the agent of the sender whose behavior is determined by the agent parameters is absent, the E-mail is sent by the second agent of the sender which can be designated sending plural E-mails.

50. An E-mail sending program product that can be executed by a computer including:
- a program code module which annexes, an agent of a sender of the E-mail on a screen and manages the behavior of the agent of the sender agent parameters; and
- a program code module which annexes, on accepting a sending command for commanding sending of an E-mail, agent parameters determining the behavior of the agent of the sender to the main text of the mail having an appended mail header for sending the E-mail;
- and wherein if the agent parameters are not sent back within a pre-set time, the agent parameters are automatically generated, and the agent of the sender is not displayed on the screen and the agent parameters determining the behavior of the agent of the sender is not appended to the E-mail, so that the agent of the sender is set to be absent after the E-mail is sent until the agent parameters are automatically generated, if the agent parameters are sent back within the pre-set time, the agent of the sender is not displayed on the screen and the agent parameters determining the behavior of the agent of the sender is not appended to the E-mail, so that the agent of the sender is set to be absent after the E-mail is sent until the agent parameters are sent back from a recipient of the E-mail;
- and wherein a single E-mail is sent by a single agent of the sender.

51. The program product of claim 50 wherein the agent parameters sent are changed and the agent parameters thus changed are sent back from the recipient.

52. The program product of claim 50 wherein the agent parameters are changed by learning function.

53. The program product of claim 50 wherein an absent state of the agent of the sender is set by a flag showing the agent of the sender is absent or not.

54. An E-mail sending program product that can be executed by a computer including:
- a program code module which displays an agent of a sender of the E-mail on a screen and manages the behavior of the agent of the sender agent parameters; and
- a program code module which annexes, on accepting a sending command for commanding sending of an E-mail, agent parameters determining the behavior of the agent of the sender to the main text of the mail having an appended mail header for sending the E-mail;
- and wherein after the E-mail is sent, the agent of the sender is made not to send the E-mail;
- and wherein a single E-mail is sent by a single agent of the sender.

55. The program product of claim 54 wherein a sending command for designating sending an E-mail by a single agent of the sender and a sending command for designating sending plural E-mails by a single second agent of the sender are selectively accepted; and wherein on accepting the sending command for designating sending an E-mail by a single agent of the sender, the agent parameters determining the agent behavior are annexed to the main text of the E-mail for sending the E-mail.

56. A method for receiving an E-mail wherein on accepting a receiving command for commanding receiving of an E-mail, the E-mail with which agent parameters for managing a behavior of an agent of a sender of the E-mail are annexed is received;
- and wherein the agent of the sender is displayed on a screen, the behavior of the agent of the sender is controlled according to the agent parameters annexed to the main text of the E-mail;
- and wherein the agent parameters are automatically sent back to a sender of the E-mail.

57. The method for receiving an E-mail as claimed in claim 56 wherein the agent parameters annexed to the main text of the E-mail received are changed and automatically sent back to the sender of the E-mail.

58. The method for receiving an E-mail as claimed in claim 57 wherein the agent parameters annexed to the main text of the E-mail received are changed based on an event generated and automatically sent back to the sender of the E-mail.

59. The method for receiving an E-mail as claimed in claim 56 wherein the agent parameters are changed based on an interaction with an agent of the recipient and automatically sent back to the sender of the E-mail.

60. The method for receiving an E-mail as claimed in claim 56 wherein the agent parameters are changed by learning function.

61. The method for receiving an E-mail as claimed in claim 56 wherein a receiving date and time of the E-mail is checked and it is judged whether it is within a lifetime period of the E-mail or not based on a sending date and time information and a mail lifetime information included in the agent parameters annexed to the E-mail;
- and wherein if it is within the lifetime period of the E-mail, the agent parameters changed is automatically sent back to the sender of the E-mail.

62. The method for receiving an E-mail as claimed in claim 56 wherein a message showing that the E-mail, with which the agent parameters for managing the behavior of the agent of the sender is annexed, is received is further automatically sent to the sender of the E-mail.

63. The method for receiving an E-mail as claimed in claim 56 wherein agent parameters of a recipient is changed based on an interaction with the agent of a sender.

64. The method for receiving an E-mail as claimed in claim 56 wherein when the agent of the sender is displayed on the screen and the behavior of the agent of the sender is controlled according to the agent parameters annexed to the main text of the E-mail, if image data of the agent of the sender corresponding to the agent parameters is not stored at a recipient side, a pre-set character is displayed in place of the agent of the sender.

65. An apparatus for receiving an E-mail comprising:
- a reception command accepting means for accepting a command for receiving an E-mail;
- a reception means for receiving an E-mail with which agent parameters for managing a behavior of an agent of a sender of the E-mail are annexed on accepting the reception command commanding reception of the E-mail by said reception command accepting means;
- an agent manager for controlling the behavior of the agent of the sender according to the agent parameters annexed to the main text of the E-mail received by said reception means for displaying the agent of the sender on a screen; and
- an agent parameters replying means for automatically sending back the agent parameters to a sender of the E-mail.

66. The apparatus for receiving an E-mail as claimed in claim 65 further comprising:
 an operation input means for inputting an operation to the agent of the sender displayed on the screen by a user; and
 an agent parameters changing means for changing the agent parameters annexed to the main text of the E-mail received by said reception means according to the user operation by said operation input means;
 wherein said agent parameters replying means automatically sends back the agent parameters changed by said agent parameters changing means to the sender of the E-mail.

67. The apparatus for receiving an E-mail as claimed in claim 66 wherein said agent parameters changing means changes the agent parameters annexed to the main text of the E-mail received based on an event generated.

68. The apparatus for receiving an E-mail as claimed in claim 67 wherein said agent manager changes the agent parameters by said agent parameters changing means based on an interaction with an agent of the recipient displayed on the screen and the agent of the sender whose behavior is controlled according to the agent parameters.

69. The apparatus for receiving an E-mail as claimed in claim 68 wherein the agent parameters are changed by learning function.

70. The apparatus for receiving an E-mail as claimed in claim 68 wherein said agent parameters replying means checks a receiving date and time of the E-mail and judges whether it is within a lifetime period of the E-mail or not based on a sending date and time information and a mail lifetime information included in the agent parameters annexed to the E-mail;
 and wherein if it is within the lifetime period of the E-mail, said agent parameters replying means automatically sends back the agent parameters changed to the sender of the E-mail.

71. The apparatus for receiving an E-mail as claimed in claim 65 further comprising a confirmation message replying means for automatically sending back a message showing that the E-mail, with which the agent parameters for managing the behavior of the agent of the sender is annexed, is received to the sender of the E-mail.

72. The apparatus for receiving an E-mail as claimed in claim 65 wherein said agent manager changes the agent parameters of a recipient based on an interaction with the agent of a sender.

73. The apparatus for receiving an E-mail as claimed in claim 65 wherein said agent manager, when displaying the agent of the sender on the screen and controlling the behavior of the agent of the sender according to the agent parameters annexed to the main text of the E-mail, if image data of the agent of the sender corresponding to the agent parameters is not stored at a recipient side, displays a pre-set character in place of the agent of the sender.

74. An E-mail receiving program product that can be executed by a computer including:
 a program code module which receives, on accepting a receiving command for commanding receiving of an E-mail, the E-mail with which agent parameters for managing a behavior of an agent of the sender are annexed
 a program code module which displays the agent of the sender on a screen, and controls the behavior of the agent of the sender according to the agent parameters annexed to the main text of the E-mail;
 a program code module which automatically sends and wherein the agent parameters are automatically sent back to a sender of the E-mail.

75. The program product of claim 74 wherein the agent parameters annexed to the main text of the E-mail received are changed and automatically sent back to the sender of the E-mail.

76. The program product of claim 75 wherein the agent parameters annexed to the main text of the E-mail received are changed based on an event generated and automatically sent back to the sender of the E-mail.

77. The program product of claim 74 wherein the agent parameters are changed based on an interaction with an agent of the recipient and automatically sent back to the sender of the E-mail.

78. The program product of claim 75 wherein the agent parameters are changed by learning function.

79. The program product of claim 75 wherein a receiving date and time of the E-mail is checked and it is judged whether it is within a lifetime period of the E-mail or not based on a sending date and time information and a mail lifetime information included in the agent parameters annexed to the E-mail;
 and wherein if it is within the lifetime, period of the E-mail, the agent parameters changed is automatically sent back to the sender of the E-mail.

80. The program product of claim 74 wherein a message showing that the E-mail, with which the agent parameters for managing the behavior of the agent of the sender is annexed, is received is further automatically sent to the sender of the E-mail.

81. The program product of claim 74 wherein agent parameters of a recipient is changed based on an interaction with the agent of a sender.

82. The program product of claim 74 wherein when the agent of the sender is displayed on the screen and the behavior of the agent of the sender is controlled according to the agent parameters annexed to the main text of the E-mail, if image data of the agent of the sender corresponding to the agent parameters is not stored at a recipient side, a pre-set character is displayed in place of the agent of the sender.

* * * * *